(12) United States Patent
Zhang et al.

(10) Patent No.: US 12,314,655 B2
(45) Date of Patent: May 27, 2025

(54) ANNOTATION METHOD BASED ON SLIDING OPERATION

(71) Applicant: HUAWEI TECHNOLOGIES CO., LTD., Guangdong (CN)

(72) Inventors: Yanan Zhang, Shenzhen (CN); Huaqi Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 17/922,251

(22) PCT Filed: Mar. 2, 2021

(86) PCT No.: PCT/CN2021/078789
§ 371 (c)(1),
(2) Date: Oct. 28, 2022

(87) PCT Pub. No.: WO2021/218365
PCT Pub. Date: Nov. 4, 2021

(65) Prior Publication Data
US 2023/0186013 A1    Jun. 15, 2023

(30) Foreign Application Priority Data
Apr. 30, 2020   (CN) .......................... 202010366858.5

(51) Int. Cl.
*G06F 3/04845* (2022.01)
*G06F 3/04847* (2022.01)
*G06F 40/109* (2020.01)

(52) U.S. Cl.
CPC ........ *G06F 40/109* (2020.01); *G06F 3/04845* (2013.01); *G06F 3/04847* (2013.01)

(58) Field of Classification Search
None
See application file for complete search history.

(56) References Cited

U.S. PATENT DOCUMENTS

| 6,230,170 B1 * | 5/2001 | Zellweger ............. G06F 40/131 345/646 |
| 9,430,141 B1 | 8/2016 | Lu et al. |
| 11,397,848 B1 * | 7/2022 | Vagell ................... G06F 40/103 |
| 2002/0010707 A1 * | 1/2002 | Chang .................. G06F 40/103 715/205 |

(Continued)

FOREIGN PATENT DOCUMENTS

| CN | 104360808 A | 2/2015 | |
| CN | 106528937 A * | 3/2017 | ............. G06F 30/00 |
| CN | 108804002 A | 11/2018 | |

*Primary Examiner* — Henry Orr
(74) *Attorney, Agent, or Firm* — WOMBLE BOND DICKINSON (US) LLP

(57) ABSTRACT

An annotation method and an electronic device are provided. The method includes: An electronic device displays content of a first file in a first interface. The electronic device detects a preset operation in the first interface, and displays the second interface including a first region and a second region. The first region is used to display the content of the first file, the second region is used to display annotation content. A font format and/or a paragraph format of at least a part of words in the first region are/is different from a font format and/or a paragraph format of words in the first file in the first interface.

16 Claims, 43 Drawing Sheets

(56) References Cited

U.S. PATENT DOCUMENTS

| | | | | |
|---|---|---|---|---|
| 2012/0110431 A1* | 5/2012 | Rosenfeld | ............. | G06F 40/169 |
| | | | | 715/230 |
| 2014/0075281 A1* | 3/2014 | Rubin | ................... | G06F 40/169 |
| | | | | 715/230 |
| 2015/0121183 A1* | 4/2015 | Saund | ................... | G06F 40/103 |
| | | | | 715/205 |
| 2016/0070688 A1* | 3/2016 | Yao | ....................... | G06F 40/169 |
| | | | | 715/232 |
| 2017/0329756 A1 | 11/2017 | Lee et al. | | |

\* cited by examiner

Electronic device 100　　　　　Stylus 200

ANNOTATION METHOD BASED ON SLIDING OPERATION

CROSS-REFERENCE TO RELATED APPLICATIONS

This application is a national stage of International Application No. PCT/CN2021/078789, filed on Mar. 2, 2021, which claims priority to Chinese Patent 202010366858.5, filed on Apr. 30, 2020. The disclosures of the aforementioned applications are hereby incorporated by reference in their entireties.

TECHNICAL FIELD

Embodiments of this application relate to the field of terminal technologies, and in particular, to an annotation method and an electronic device.

BACKGROUND

Currently, an annotation function of a document file (for example, a word file or a PDF file) is configured in an electronic device such as a mobile phone or a tablet computer. A user can add annotation content such as a word or a pattern to a blank region of the document file. Because a size of a display of the electronic device such as the mobile phone or the tablet computer is limited, the blank region of the document file is also limited. If there is too much annotation content, the annotation content covers original content of the document file, resulting in poor reading experience of the user.

SUMMARY

According to an annotation method and an electronic device that are provided in this application, a font format and/or a paragraph format of at least a part of content in a document file can be adjusted, to reserve more blank regions for annotation, so that annotation content does not overlap the content of the document file, thereby improving reading experience of a user.

To achieve the foregoing objective, the following technical solutions are used in this application.

According to a first aspect, this application provides an annotation method. The method may include: An electronic device displays a first interface, where the first interface displays content of a first file; and the electronic device displays a second interface in response to detecting a preset operation in the first interface, where the second interface includes a first region and a second region, the first region is used to display the content of the first file, the second region is used to display annotation content, and a font format and/or a paragraph format of at least a part of words in the first region are/is different from a font format and/or a paragraph format of words in the first file in the first interface.

The first interface is an interface of a first application, and the first application is an application that can edit or display a document file. The first interface may be used to display content of a document file, that is, the first file is a document file (for example, a word file, a PDF file, or a web page). For example, the first interface is an interface displayed after an operation that a user enters an annotation mode is detected, or the first interface is a read interface of the document file. The second interface is an interface displayed by the electronic device (e.g., a mobile phone) in the annotation mode, and the electronic device detects the annotation content in the second interface. The operation of entering the annotation mode may include, for example, an operation of tapping a stylus button, an operation of the user in the read interface of the document file (for example, control manipulation, touching and holding, or double tapping), a speech command, or a floating gesture.

In this way, the electronic device can adjust a font format and/or a paragraph format of at least a part of the content in the document file, to reserve more blank regions for annotation, so that annotation content does not overlap the content of the document file, thereby improving reading experience of the user.

In addition, because the font format and/or the paragraph format of at least the part of the content in the document file are/is adjusted to implement a larger blank region for annotation, displayed content of the document file on a current page is not reduced, so that no inconvenience is caused for the user in reading the original document file although the annotation content is added.

In an embodiment, the preset operation is that the user performs a sliding operation of a preset track, and the preset track includes one or several of the following: an oblique line segment, a closed graphic, and a preset symbol.

The sliding operation of the preset track may be sliding of a finger of the user on a screen of the mobile phone, or may be sliding of the user with a stylus on the screen of the mobile phone.

In this way, the electronic device can determine, based on different sliding tracks of detected preset operations, corresponding parts that are of the words in the first file and that need to be compressed and corresponding compression policies. Subsequently, the parts that are of the words in the first file and that need to be compressed are compressed by using the compression policies, to obtain corresponding second regions.

In an embodiment, the font format of the word includes one or several of the following content: a character height, a character width, and a character weight; and the paragraph format of the word includes a character spacing and/or a line spacing.

The compression policy may include a policy for adjusting a font format and/or a paragraph format of a part of the words in the first file. Different compression policies corresponding to different sliding tracks of preset operations may be preconfigured in the electronic device, and after the electronic device detects different sliding tracks, the sliding tracks adaptively match different compression policies.

In an embodiment, that the electronic device displays a second interface in response to detecting a preset operation in the first interface includes: in response to detecting the preset operation in the first interface, the electronic device compresses at least a part of the words in the first file by using a compression policy corresponding to the sliding track of the preset operation, to obtain the second region; and the electronic device displays the second interface that includes the second region.

In this way, the electronic device adjusts the font format and/or the paragraph format of the part of the words in the first file, to obtain the second region near an adjusted word. For example, if the electronic device downward compresses a character height and a line spacing of the part of the words in the first file, the electronic device may obtain a corresponding second region above this compressed word part.

In an embodiment, that the electronic device compresses at least a part of the words in the first file by using a compression policy corresponding to the sliding track of the preset operation, to obtain the second region includes: when the sliding track of the preset operation is an oblique line segment and a width of the oblique line segment is greater than a first threshold, the electronic device compresses a character height and/or a line spacing of a line in which words covered by the oblique line segment are located, to obtain the second region; or when the sliding track of the preset operation is an oblique line segment and a width of the oblique line segment is less than or equal to the first threshold, the electronic device compresses a character width and/or a character spacing of a line in which words covered by the oblique line segment are located, or compresses a character width and/or a character spacing of the words covered by the oblique line segment, to obtain the second region.

The width of the oblique line segment is a width of text content that is displayed on a second display page and that is covered by the oblique line segment. The mobile phone may determine, based on the width, partial word content that needs to be compressed. The first threshold may be a customized threshold. For example, the first threshold is 50% of a width of text content displayed in the first interface. Oblique line segments may be classified into a long oblique line segment and a short oblique line segment, and the electronic device may determine, by using the first threshold, whether a currently detected oblique line segment is a long oblique line segment. For example, when a width of the oblique line segment is greater than the first threshold, the oblique line segment is a long oblique line segment.

In some embodiments, different compression policies may be separately configured for the long oblique line segment and the short oblique line segment, and different parts that are of the content in the first text and that need to be compressed may be made separately corresponding to the long oblique line segment and the short oblique line segment. In this case, the electronic device may obtain different second regions based on the width of the oblique line segment.

For example, if the electronic device detects an oblique line segment that is entered in the first interface and whose coverage width exceeds a preset width, and an oblique angle of the current oblique line segment exceeds a preset oblique angle, the electronic device may determine that the current oblique line segment is the sliding track corresponding to the preset operation. The preset width and the preset angle may be preconfigured in the electronic device after being set by a manufacturer based on empirical values or a user habit. Alternatively, the mobile phone may directly receive customized values set by the user.

Then, the electronic device determines, based on the first threshold, that a currently detected preset operation whose sliding track is an oblique line segment corresponds to a long oblique line segment or a short oblique line segment. Further, parts that are of the content in the first file and that correspond to different sliding tracks are compressed by using corresponding compression policies, to obtain second regions.

In an embodiment, when the width of the oblique line segment is greater than the first threshold and the oblique line segment is upward inclined, compressed words are located above or below the second region; when the width of the oblique line segment is greater than the first threshold and the oblique line segment is downward inclined, compressed words are located below or above the second region; when the width of the oblique line segment is less than or equal to the first threshold and the oblique line segment is upward inclined, compressed words are located on a left side or a right side of the second region; or when the width of the oblique line segment is less than or equal to the first threshold and the oblique line segment is downward inclined, compressed words are located on a right side or a left side of the second region.

The mobile phone may determine an oblique direction of the current oblique line segment based on positions of a left end point and a right end point of the detected oblique line segment. For example, if a position of the left end point is higher than a position of the right end point, the oblique direction of the oblique line segment is downward; or if a position of the left end point is lower than a position of the right end point, the oblique direction of the oblique line segment is upward. Alternatively, the mobile phone determines an oblique direction of the current oblique line segment based on an oblique angle of the oblique line segment. For example, if the oblique angle is less than 90 degrees, the oblique direction of the oblique line segment is upward; or if the oblique angle is greater than 90 degrees, the oblique direction of the oblique line segment is downward.

For example, the electronic device may compress at least the part of the words in the first file based on the oblique direction of the oblique line segment.

When the width of the oblique line segment is greater than the first threshold, a compression direction of a part that is of the content in the first file and that needs to be compressed is determined based on the oblique direction of the oblique line segment. For example, if the oblique direction of the oblique line segment is downward, words in a line in which words covered by the oblique line segment are located are downward compressed, where a correspondingly obtained second region is located above compressed words. For another example, if an oblique direction of a short oblique line segment is upward, words in a line in which words covered by the short oblique line segment are located are upward compressed, where a correspondingly obtained second region is located below compressed words. For another example, if compression directions of an upward-inclined short oblique line segment and a downward-inclined short oblique line segment are preconfigured to be the same, for example, both the compression directions are upward or downward, a correspondingly obtained second region is located below or above compressed words.

When the width of the oblique line segment is less than or equal to the first threshold, a part that is of the content in the first file and that needs to be compressed and a corresponding compression direction are determined based on an oblique direction of the oblique line segment and a position of a left end point and/or a position of a right end point. For example, if the oblique direction of the oblique line segment is downward, words on a right side of the left end point in a line in which words covered by the oblique line segment are located are rightward compressed, where a correspondingly obtained second region is located on a left side of compressed words. For another example, if the oblique direction of the oblique line segment is upward, words on a left side of the right end point in a line in which words covered by the oblique line segment are located are leftward compressed, where a correspondingly obtained second region is located on a right side of compressed words. For another example, compression directions of an upward-inclined oblique line segment and a downward-inclined oblique line segment are preconfigured to be the same, for example, both the compression directions are leftward or rightward, words that need to be compressed are words on a left side of the right end point or words on a right side of the left end point in a line in which words covered by the oblique line segment are located, and a correspondingly obtained second region is located on a right side or a left side of compressed words.

In an embodiment, that the electronic device compresses at least a part of the words in the first file by using a compression policy corresponding to the sliding track of the preset operation, to obtain the second region includes: when the sliding track of the preset operation is a closed graphic, the electronic device compresses a character width and/or a character spacing of a line in which words covered by the closed graphic are located, to obtain the second region.

The closed graphic may include, for example, a completely closed graphic or a graphic closed with an edge of a display page. The completely closed graphic indicates that a start position and an end position of the preset operation overlap. The graphic closed with the edge of the display page indicates that the sliding track of the preset operation is not closed, but forms a closed graphic with an edge of a text displayed by the electronic device. A position of the closed graphic corresponds to a position of the second region, and a size of the closed graphic may correspond to a size of the second region.

For example, when the sliding track of the preset operation is a closed graphic, a part that is of the content in the first text and that needs to be compressed is words around the closed graphic or words in a line in which words covered by the closed graphic are located. For example, the part that is of the content in the first text and that needs to be compressed is words on a left side of the closed graphic, a corresponding compression manner is character width compression and/or character spacing compression, and a compression direction is leftward. For another example, the part that is of the content in the first text and that needs to be compressed is words on a right side of the closed graphic, a corresponding compression manner is character width compression and/or character spacing compression, and a compression direction is rightward. For another example, the part that is of the content in the first text and that needs to be compressed is words, for example, one line of words, above the closed graphic, a corresponding compression manner is character height compression and/or line spacing compression, and a compression direction is upward. For another example, the part that is of the content in the first text and that needs to be compressed is words, for example, one line of words, below the closed graphic, a corresponding compression manner is character height compression and/or line spacing compression, and a compression direction is downward.

It should be noted that a shape of the closed graphic is not limited in embodiments of this application. The closed graphic may be in a regular closed shape, or may be in an irregular closed shape.

In an embodiment, that the electronic device compresses at least a part of the words in the first file by using a compression policy corresponding to the sliding track of the preset operation, to obtain the second region includes: when the sliding track of the preset operation is a preset symbol, the electronic device compresses a character height and/or a line spacing of a line in which words covered by the preset symbol are located and/or a character height and/or a line spacing of a neighboring line, to obtain the second region; or the electronic device compresses a character width and/or a character spacing of a line in which words covered by the preset symbol are located and/or a character width and/or a character spacing of a neighboring line, to obtain the second region.

The preset symbol may include a preset symbol without a direction and a preset symbol with a direction. A shape of the preset symbol may be a shape preconfigured by the manufacturer or a shape customized by the user.

For example, if the preset symbol is a preset symbol without a direction, a part that is of the content in the first text and that needs to be compressed is a line in which words covered by the preset symbol are located and/or a neighboring line. If the part that is of the content in the first text and that needs to be compressed is words on a left side and a right side of the preset symbol, a compression manner is character width compression and/or character spacing compression, and a compression direction is leftward and rightward. If the part that is of the content in the first text and that needs to be compressed is words above and below the preset symbol, a compression manner is character height compression and/or line spacing compression, and a compression direction is upward and downward.

In an embodiment, when the preset symbol is a preset symbol with a direction, the electronic device compresses a line in which words covered by the preset symbol with the direction are located, to obtain the second region, where the second region is located in a first direction of the preset symbol with the direction, and the first direction is a direction indicated by the preset symbol with the direction.

For example, if the preset symbol is a preset symbol with a direction, a part that is of the content in the first text and that needs to be compressed is words in a direction indicated by the preset symbol with the direction; a compression direction is the direction indicated by the annotation symbol with the direction, that is, a second region obtained by the mobile phone after the mobile phone compresses the to-be-compressed content is located in the direction indicated by the preset symbol; and a compression manner is a compression manner corresponding to the direction indicated by the preset symbol with the direction.

In an embodiment, the electronic device receives the annotation content entered by the user in the second interface, and adjusts a size of the second region based on a word quantity and/or a font size of the annotation content.

In an embodiment, the mobile phone displays the second interface, and detects, in the second interface, annotation content entered by the user by using a stylus, a finger, or a keyboard. The mobile phone may detect annotation content entered by the user in the second interface, or detect annotation content entered by the user in the second region. Then, the mobile phone displays the received annotation content in the second region in the second interface.

In an embodiment, it is possible that an area of the second region obtained by the mobile phone based on the preset operation cannot meet an area requirement of the annotation content, for example, is less than or exceeds the area requirement of the annotation content. In this case, the size of the second region may be adjusted based on the word quantity and/or the font size of the annotation content, for example, the second region is expanded or narrowed, so that the second region meets the area requirement of the annotation content.

In some embodiments, the mobile phone continues to compress compressed words based on the word quantity and/or the font size of the annotation content by using the compression policy corresponding to the sliding track of the preset operation, to expand the second region; and stops compression until a compression upper limit of the compressed words is reached. The compression upper limit includes one or several of the following content: a minimum character height, a minimum character width, a minimum character weight, a minimum character spacing, and a minimum line spacing. A compression upper threshold may be determined based on an empirical value, or may be determined based on a size of a display interface. Alternatively, if the compressed words have been compressed to the compression upper limit, but the electronic device still detects, in the second interface, annotation content that needs to be displayed in the current second region, the electronic device may compress words near the second region to expand the second region, to display more received annotation content. For example, the electronic device compresses near M lines of uncompressed words, and stops compression after the near M lines are also compressed to the compression upper limit.

In some other embodiments, the electronic device does not receive, within a preset time period after receiving and displaying the annotation content, more annotation content that needs to be displayed in the current second region, that is, does not update the annotation content displayed in the second region. In addition, a corresponding blank region part further exists in the current second region, and an area of the blank region is greater than a first threshold. In this case, the electronic device may narrow the current second region, to implement a better display effect. The first threshold may be a preconfigured empirical value.

In some other embodiments, if the electronic device detects that original annotation content increases or decreases because the saved annotation content is modified, the electronic device correspondingly expands or narrows an original second region, to obtain a size that is of the second region and that matches current annotation content. Therefore, interface display is optimized, to further improve user experience.

In an embodiment, after the electronic device displays the second interface in response to detecting the preset operation in the first interface, the method further includes: the electronic device displays the first interface when receiving, within a preset time period after detecting the preset operation, no annotation content entered by the user, or when detecting that the user performs an annotation deletion operation or an annotation mode exit operation.

For example, if the mobile phone displays the second region due to a misoperation of the user, the user currently has no annotation requirement. Alternatively, an action position of the preset operation of the user is wrong, and consequently the second region is a non-ideal annotation region. Alternatively, after performing the preset operation, the user has no annotation requirement. In this case, the electronic device may receive no annotation content within the preset time period. Therefore, the electronic device determines that the second region needs to be deleted, and automatically recovers compressed words to an initial state, that is, displays a display interface that exists before the current preset operation is obtained, to ensure normal display of the electronic device.

In an embodiment, the compression policy includes one or more of a compression manner, a compression direction, and a compression ratio. The compression manner includes one or several of the following: character height compression, character width compression, character weight compression, character spacing compression, and line spacing compression. The compression direction includes one or several of the following: upward, downward, leftward, and rightward. The compression ratio is determined by the electronic device based on a coverage width and/or length of the sliding track of the preset operation or based on execution time of the preset operation, or is a default value.

Compression in each direction may be compression in an upright direction, or may be compression in an oblique direction. For example, upward compression may be upright upward compression or obliquely upward compression. An angle in the oblique direction may be determined based on an empirical value or a size of a display of the electronic device.

For example, the electronic device may detect pressing time during which the stylus or the finger finally stays at the end of the sliding track when performing the preset operation, to determine the compression ratio. This process may be a dynamic process. In a process in which the user performs the preset operation and finally stays at a current interface, an annotation region change may be seen. For example, after detecting a long oblique line segment, the electronic device displays the second interface that includes the second region. If the electronic device currently detects that the stylus or the finger of the user does not leave the second interface and keeps touching and holding at the end of the long oblique line segment, the electronic device persistently compresses, according to a corresponding compression policy, words that need to be compressed, until the stylus or the finger of the user leaves the second interface, or the words that need to be compressed are compressed to the compression upper limit. In this way, the user may expand, by touching and holding the display, the area of the second region based on the size of the second region displayed in the second interface, until the user considers that a size of a currently displayed second region meets a requirement, thereby improving user experience.

In an embodiment, in response to a detected erase operation, the electronic device does not display the sliding track of the preset operation, or does not display the sliding track of the preset operation and the annotation content.

If a part of compressed words are covered because the electronic device displays the sliding track of the preset operation, affecting the user in viewing the part of the words, the user may delete or hide the sliding track of the current preset operation by using an erase operation. Alternatively, if the user does not want to retain the annotation content in the current second region, the user may also delete or hide the current annotation content by using an erase operation. Alternatively, the user deletes or hides the sliding track of the current preset operation and the annotation content by using an erase operation.

For example, the electronic device deletes or hides the sliding track and the annotation content in response to a detected sliding track erase operation.

According to a second aspect, this application provides an electronic device. The electronic device includes a display unit and a detection unit. The display unit is configured to display a first interface, where the first interface displays content of a first file. The detection unit is configured to detect a preset operation in the first interface. The display unit is further configured to display a second interface in response to detecting, by the detection unit, the preset operation in the first interface, where the second interface includes a first region and a second region, the first region is used to display the content of the first file, the second region is used to display annotation content, and a font format and/or a paragraph format of at least a part of words in the first region are/is different from a font format and/or a paragraph format of words in the first file in the first interface.

In an embodiment, the preset operation is that the user performs a sliding operation of a preset track, and the preset track includes one or several of the following: an oblique line segment, a closed graphic, and a preset symbol.

In an embodiment, the font format of the word includes one or several of the following content: a character height, a character width, and a character weight; and the paragraph format of the word includes a character spacing and/or a line spacing.

In an embodiment, the electronic device further includes a processing unit. The processing unit is configured to: in response to detecting, by the detection unit, the preset operation in the first interface, compress at least a part of the words in the first file by using a compression policy corresponding to the sliding track of the preset operation, to obtain the second region. The detection unit is configured to display the second interface that includes the second region.

In an embodiment, the processing unit is configured to: when the sliding track of the preset operation is an oblique line segment and a width of the oblique line segment is greater than a first threshold, compress a character height and/or a line spacing of a line in which words covered by the oblique line segment are located, to obtain the second region; or when the sliding track of the preset operation is an oblique line segment and a width of the oblique line segment is less than or equal to the first threshold, compress a character width and/or a character spacing of a line in which words covered by the oblique line segment are located, or compress a character width and/or a character spacing of the words covered by the oblique line segment, to obtain the second region.

In an embodiment, when the width of the oblique line segment is greater than the first threshold and the oblique line segment is upward inclined, compressed words are located above or below the second region; when the width of the oblique line segment is greater than the first threshold and the oblique line segment is downward inclined, compressed words are located below or above the second region; when the width of the oblique line segment is less than or equal to the first threshold and the oblique line segment is upward inclined, compressed words are located on a left side or a right side of the second region; or when the width of the oblique line segment is less than or equal to the first threshold and the oblique line segment is downward inclined, compressed words are located on a right side or a left side of the second region.

In an embodiment, the processing unit is configured to: when the sliding track of the preset operation is a closed graphic, compress a character width and/or a character spacing of a line in which words covered by the closed graphic are located, to obtain the second region.

In an embodiment, the processing unit is configured to: when the sliding track of the preset operation is a preset symbol, compress a character height and/or a line spacing of a line in which words covered by the preset symbol are located and/or a character height and/or a line spacing of a neighboring line, to obtain the second region; or compress a character width and/or a character spacing of a line in which words covered by the preset symbol are located and/or a character width and/or a character spacing of a neighboring line, to obtain the second region.

In an embodiment, the processing unit is configured to: when the preset symbol is a preset symbol with a direction, compress a line in which words covered by the preset symbol with the direction are located, to obtain the second region, where the second region is located in a first direction of the preset symbol with the direction, and the first direction is a direction indicated by the preset symbol with the direction.

In an embodiment, the processing unit is further configured to: receive the annotation content entered by the user in the second interface, and adjust a size of the second region based on a word quantity and/or a font size of the annotation content.

In an embodiment, the detection unit is further configured to detect that the user performs an annotation deletion operation or an annotation mode exit operation. The display unit is further configured to display the first interface when the processing unit receives, within a preset time period after the detection unit detects the preset operation, no annotation content entered by the user, or when the detection unit detects that the user performs the annotation deletion operation or the annotation mode exit operation.

In addition, for technical effects of the electronic device according to the second aspect, refer to the technical effects of the annotation method according to the first aspect. Details are not described herein again.

According to a third aspect, this application provides an electronic device, including a processor, a memory, and a touchscreen. The memory and the touchscreen are coupled to the processor. The memory is configured to store computer program code. The computer program code includes computer instructions. When the processor reads the computer instructions from the memory, the electronic device is enabled to perform the following operations: displaying a first interface, where the first interface displays content of a first file; and displaying a second interface in response to detecting a preset operation in the first interface, where the second interface includes a first region and a second region, the first region is used to display the content of the first file, the second region is used to display annotation content, and a font format and/or a paragraph format of at least a part of words in the first region are/is different from a font format and/or a paragraph format of words in the first file in the first interface.

In an embodiment, the preset operation is that the user performs a sliding operation of a preset track, and the preset track includes one or several of the following: an oblique line segment, a closed graphic, and a preset symbol.

In an embodiment, the font format of the word includes one or several of the following content: a character height, a character width, and a character weight; and the paragraph format of the word includes a character spacing and/or a line spacing.

In an embodiment, the electronic device performs the following operations: in response to detecting the preset operation in the first interface, compressing at least a part of the words in the first file by using a compression policy corresponding to the sliding track of the preset operation, to obtain the second region; and displaying the second interface that includes the second region.

In an embodiment, the electronic device performs the following operation: when the sliding track of the preset operation is an oblique line segment and a width of the oblique line segment is greater than a first threshold, compressing a character height and/or a line spacing of a line in which words covered by the oblique line segment are located, to obtain the second region; or when the sliding track of the preset operation is an oblique line segment and a width of the oblique line segment is less than or equal to the first threshold, compressing a character width and/or a character spacing of a line in which words covered by the oblique line segment are located, or compressing a character width and/or a character spacing of the words covered by the oblique line segment, to obtain the second region.

In an embodiment, when the width of the oblique line segment is greater than the first threshold and the oblique line segment is upward inclined, compressed words are located above or below the second region; when the width of the oblique line segment is greater than the first threshold and the oblique line segment is downward inclined, compressed words are located below or above the second region; when the width of the oblique line segment is less than or equal to the first threshold and the oblique line segment is upward inclined, compressed words are located on a left side or a right side of the second region; or when the width of the oblique line segment is less than or equal to the first threshold and the oblique line segment is downward inclined, compressed words are located on a right side or a left side of the second region.

In an embodiment, the electronic device performs the following operation: when the sliding track of the preset operation is a closed graphic, compressing a character width and/or a character spacing of a line in which words covered by the closed graphic are located, to obtain the second region.

In an embodiment, the electronic device performs the following operation: when the sliding track of the preset operation is a preset symbol, compressing a character height and/or a line spacing of a line in which words covered by the preset symbol are located and/or a character height and/or a line spacing of a neighboring line, to obtain the second region; or compressing a character width and/or a character spacing of a line in which words covered by the preset symbol are located and/or a character width and/or a character spacing of a neighboring line, to obtain the second region.

In an embodiment, the electronic device further performs the following operation: when the preset symbol is a preset symbol with a direction, compressing a line in which words covered by the preset symbol with the direction are located, to obtain the second region, where the second region is located in a first direction of the preset symbol with the direction, and the first direction is a direction indicated by the preset symbol with the direction.

In an embodiment, the electronic device further performs the following operations: receiving the annotation content entered by the user in the second interface, and adjusting a size of the second region based on a word quantity and/or a font size of the annotation content.

In an embodiment, after the displaying a second interface in response to detecting a preset operation in the first interface, the electronic device further performs the following operation: displaying the first interface when receiving, within a preset time period after detecting the preset operation, no annotation content entered by the user, or when detecting that the user performs an annotation deletion operation or an annotation mode exit operation.

In an embodiment, the electronic device further includes a stylus. The stylus is configured to enter the preset operation and the annotation content to the touchscreen.

In addition, for technical effects of the electronic device according to the third aspect, refer to the technical effects of the annotation method according to the first aspect. Details are not described herein again.

According to a fourth aspect, this application provides a terminal device. The terminal device has a function of implementing the annotation method according to any one of the first aspect and the possible implementations of the first aspect. The function may be implemented by hardware, or may be implemented by hardware executing corresponding software. The hardware or the software includes one or more modules corresponding to the function.

According to a fifth aspect, this application provides a computer storage medium, including computer instructions. When the computer instructions are run on an electronic device, the electronic device is enabled to perform the annotation method according to any one of the first aspect and the possible implementations of the first aspect.

According to a sixth aspect, this application provides a computer program product. When the computer program product is run on an electronic device, the electronic device is enabled to perform the annotation method according to any one of the first aspect and the possible implementations of the first aspect.

According to a seventh aspect, a circuit system is provided. The circuit system includes a processing circuit, and the processing circuit is configured to perform the annotation method according to any one of the first aspect and the possible implementations of the first aspect.

According to an eighth aspect, an embodiment of this application provides a chip system, including at least one processor and at least one interface circuit. The at least one interface circuit is configured to: perform a sending/receiving function, and send instructions to the at least one processor. When the at least one processor executes the instructions, the at least one processor performs the annotation method according to any one of the first aspect and the possible implementations of the first aspect.

DESCRIPTION OF EMBODIMENTS

The following describes, in detail with reference to the accompanying drawings, an annotation method and an electronic device that are provided in embodiments of this application.

The terms "including", "having", or any other variant thereof in descriptions of this application are intended to cover a non-exclusive inclusion. For example, a process, a method, a system, a product, or a device that includes a series of operations or units is not limited to the listed operations or units, but optionally further includes other unlisted operations or units, or optionally further includes other inherent operations or units of the process, the method, the product, or the device.

It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a manner.

In the descriptions of this application, unless otherwise stated, "a plurality of" means two or more than two. The term "and/or" in this specification describes only an association relationship for describing associated objects and represents that three relationships may exist. For example, A and/or B may represent the following three cases: Only A exists, both A and B exist, and only B exists.

Figure 1:
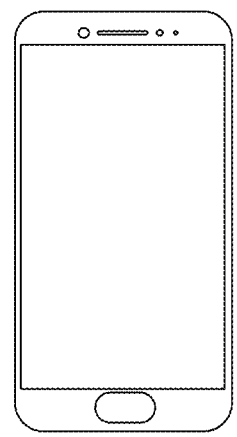
FIG. 1 is a schematic diagram of an application scenario according to an embodiment of this application.
Figure 1:
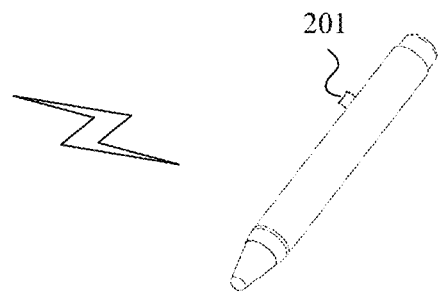

FIG. 1 is a schematic diagram of an application scenario according to an embodiment of this application. As shown in FIG. 1, the annotation method provided in embodiments of this application may be applied to an electronic device 100 in which a first application is installed. The first application is an application that can edit or display a document file, and includes but is not limited to a PowerPoint (PPT) application, a portable document format (PDF) application, word processing software (such as Word or WPS), Notebook, Browser (that can display a web page), Reader, Ebook, Email, or the like. The document file in the document application is editable or non-editable. For example, a PDF file, a web page, or an ebook is non-editable, and a PPT file, a Word file, or a notebook is editable. In some examples, a Word or PPT file in a read-only mode is non-editable.

In some embodiments, a display of the electronic device 100 is a touchscreen, and a user may slide on the display of the electronic device 100 with a finger, to enter a word, a pattern, or the like.

In some other embodiments, as shown in FIG. 1, a stylus 200 may be further attached onto the electronic device 100. For example, the stylus 200 may establish communication with the electronic device 100 in a wired or wireless manner (for example, by using Bluetooth or Wi-Fi). The user may use the stylus 200 to write information such as a word on the display of the electronic device 100. The electronic device 100 may display a movement track formed by the stylus 200 on the display. In addition, the electronic device 100 may record the movement track formed by the stylus 200 on the display, and then identify corresponding words.

In an embodiment, as shown in FIG. 1, one or more buttons 201 may be disposed on the stylus 200, and the button 201 may be a physical button or a virtual button. In some examples, each button 201 corresponds to one key. When the user operates a button 201, the stylus 200 may send a key corresponding to the button 201 to the electronic device 100 in a wireless manner, for example, by using Bluetooth. The electronic device 100 performs a corresponding operation based on the received key. In some other examples, different keys are set for different operations of each button 201. When detecting different operations performed by the user on the button 201, the stylus 200 sends keys corresponding to the operations to the electronic device 100, and the electronic device 100 performs corresponding operations based on the received keys.

For example, it is assumed that a button 201 is preconfigured to correspond to a key 001 in the stylus 200, and the key 001 is preconfigured to correspond to starting an annotation mode in the electronic device 100. If the stylus 200 detects that the user performs a tap operation on the button 201, the stylus 200 may send the key 001 corresponding to the tapping of the button 201 to the electronic device 100. After receiving the key 001, the electronic device 100 starts the annotation mode. In this case, an application currently displayed by the electronic device 100 enters a handwriting mode. In the handwriting mode, the user may use the stylus 200 to handwrite content on a display interface. For example, in the annotation mode, the electronic device 100 may identify, based on a movement track of the stylus 200 in the display interface, annotation content handwritten by the user.

The stylus 200 may be a resistive stylus, an electromagnetic stylus, or a capacitive stylus. This is not limited in embodiments of this application.

For example, the electronic device 100 may be an electronic device that has a touchable display, such as a mobile phone, a tablet computer, a personal computer (PC), a personal digital assistant (PDA), a smart TV, a netbook, a wearable electronic device, a vehicle-mounted device, or an artificial intelligence terminal. A form of the electronic device is not specially limited in this application.

Figure 2A:
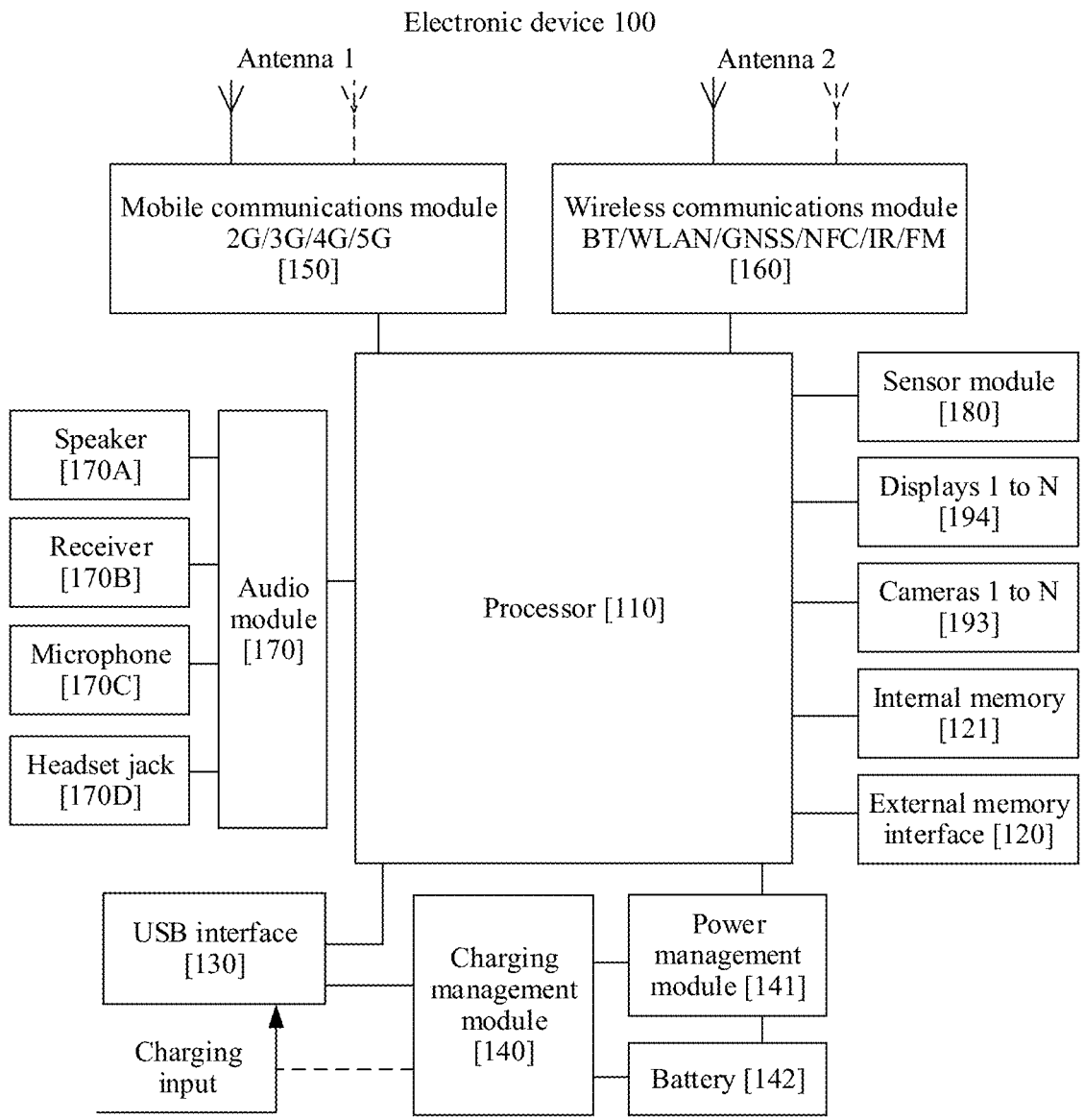
FIG. 2A is a schematic diagram 1 of a structure of an electronic device according to an embodiment of this application.

FIG. 2A is a schematic diagram of a structure of an electronic device according to an embodiment of this application.

An electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a camera 193, a display 194, and the like.

It may be understood that the structure shown in embodiments of this application does not constitute a limitation on the electronic device 100. In some other embodiments of this application, the electronic device 100 may include more or fewer components than those shown in the figure, or some components may be combined, or some components may be split, or there may be a different component arrangement. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to be connected to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. In some other embodiments, the power management module 141 may alternatively be disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication that includes 2G/3G/4G/5G or the like and that is applied to the electronic device 100. The mobile communication module 150 may include one or more filters, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components into which one or more communication processing modules are integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. In some embodiments, the electronic device 100 may include one or N cameras, where N is a positive integer greater than 1. The camera 193 may be a front-facing camera, or may be a rear-facing camera.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store one or more computer programs. The one or more computer programs include instructions. The processor 110 may run the instructions stored in the internal memory 121, to enable the electronic device 100 to perform an intelligent contact recommendation method, various types of functional application, data processing, and the like provided in some embodiments of this application. The internal memory 121 may include a program storage region and a data storage region. The program storage region may store an operating system. The program storage region may further store one or more applications (such as Gallery or Contacts). The data storage region may store data (such as a photo or a contact) or the like created in a process of using the electronic device 100. In addition, the internal memory 121 may include a high-speed random access memory, and may further include a nonvolatile memory, for example, at least one magnetic disk storage device, a flash storage device, or a universal flash storage (UFS). In some other embodiments, the processor 110 runs the instructions stored in the internal memory 121 and/or the instructions stored in the memory disposed in the processor, to enable the electronic device 100 to perform the annotation method, various types of functional application, and data processing provided in embodiments of this application.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may make a sound near the microphone 170C through the mouth, to enter a sound signal to the microphone 170C. One or more microphones 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, or the like. This is not limited in embodiments of this application.

Certainly, the electronic device 100 provided in embodiments of this application may further include one or more components such as a button, a motor, an indicator, and an SIM card interface. This is not limited in embodiments of this application.

A software system of the electronic device 100 may use a layered architecture, an event-driven architecture, a micro-kernel architecture, a micro service architecture, or a cloud architecture. In embodiments of this application, an Android system of a layered architecture is used as an example to illustrate the software structure of the electronic device 100.

Figure 2B:
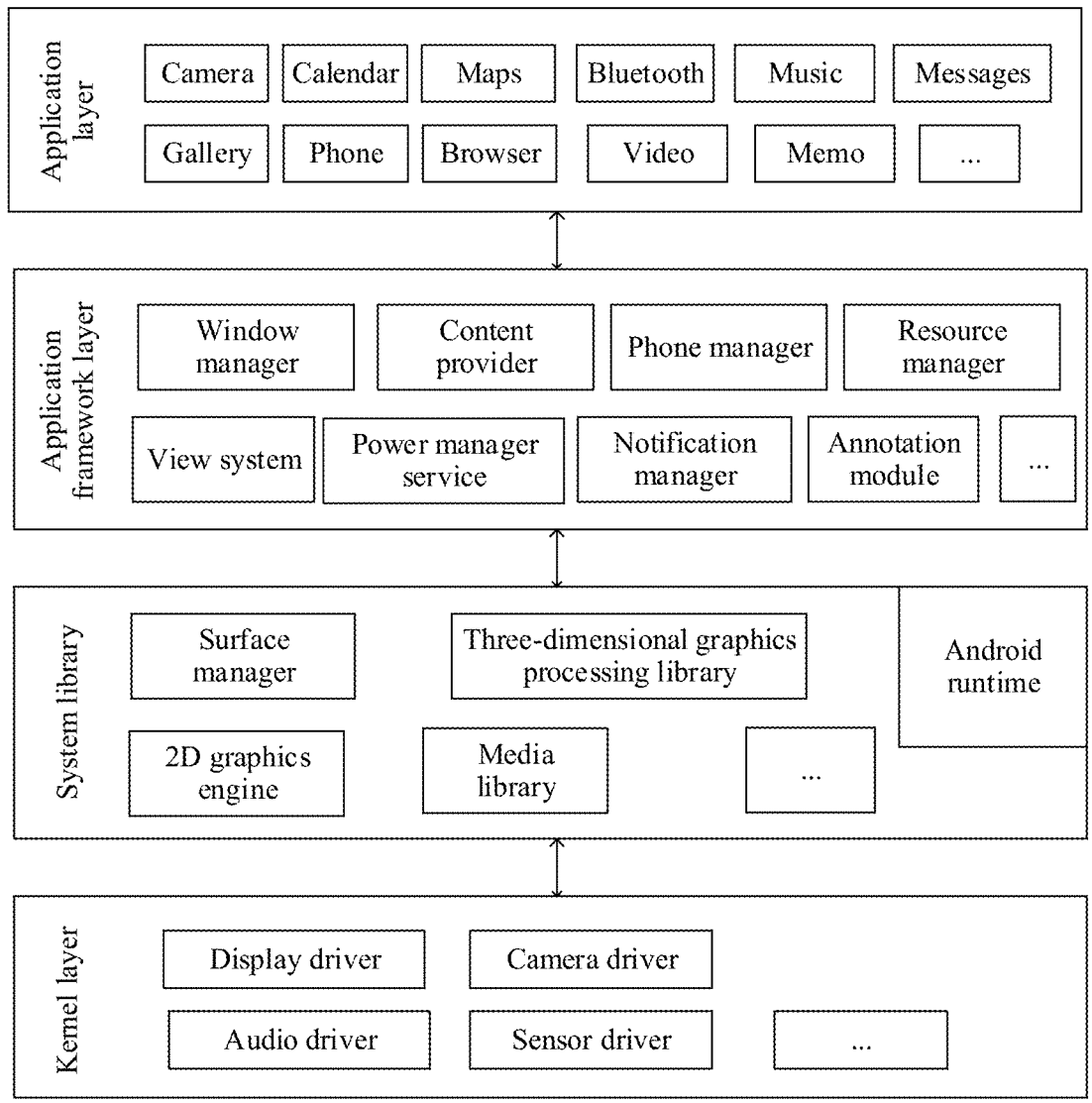
FIG. 2B is a schematic block diagram of a software structure of an electronic device according to an embodiment of this application.

FIG. 2B is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of applications.

As shown in FIG. 2B, the applications may include APPs (application) such as Phone, Memo, Browser, Contacts, Camera, Gallery, Calendar, Maps, Bluetooth, Music, Video, and Messages. These applications may be pre-installed at delivery of the electronic device 100, or may be downloaded from an application market and installed when a user uses the electronic device 100. This is not limited in embodiments of this application.

In embodiments of this application, the applications include a first application. The first application is an application that can edit or display a document file, and includes but is not limited to a PowerPoint (PPT) application, a portable document format (PDF) application, word processing software (such as Word or WPS), Notebook, Browser (that can display a web page), Reader, Ebook, Email, or the like.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and bookmarks, a phone book, and the like. The view system includes visual controls, such as a control for displaying a text and a control for displaying an image. The view system may be configured to construct an application. A display interface may include one or more views. The resource manager provides, for an application, various resources such as a localized character string, an icon, a picture, a layout file, and a video file. The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

In some embodiments of this application, the frame layer may further include an annotation module. The annotation module may be configured to: identify a sliding track obtained when the user performs a preset operation, and determine a corresponding compression policy based on the sliding track and a document file currently displayed by the electronic device. For example, the corresponding compression policy is reducing a character height of all words in a line in which words covered by the sliding track of the preset operation are located. For another example, the corresponding compression policy is reducing a line spacing of all words in a line in which words covered by the sliding track of the preset operation are located.

The system library may include a plurality of functional modules, such as a surface manager, a media library, a three-dimensional graphics processing library (for example, OpenGL ES), and a 2D graphics engine (for example, an SGL).

The surface manager is configured to manage a display subsystem and provide fusion of 2D and 3D layers for a plurality of applications. The media library supports playing and recording of a plurality of commonly used audio and video formats, static image files, and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The kernel layer is a layer between hardware and software. The kernel layer includes at least a display drive, a camera drive, an audio drive, a sensor drive, and the like. This is not limited in an embodiment of the application.

All technical solutions provided in the following embodiments are applicable to the electronic device of the structure shown in FIG. 2A, and/or the electronic device of the structure shown in FIG. 2B.

The annotation method provided in embodiments of this application is described with reference to the accompanying drawings by using an example in which a mobile phone is used as the electronic device 100.

Figure 3A:
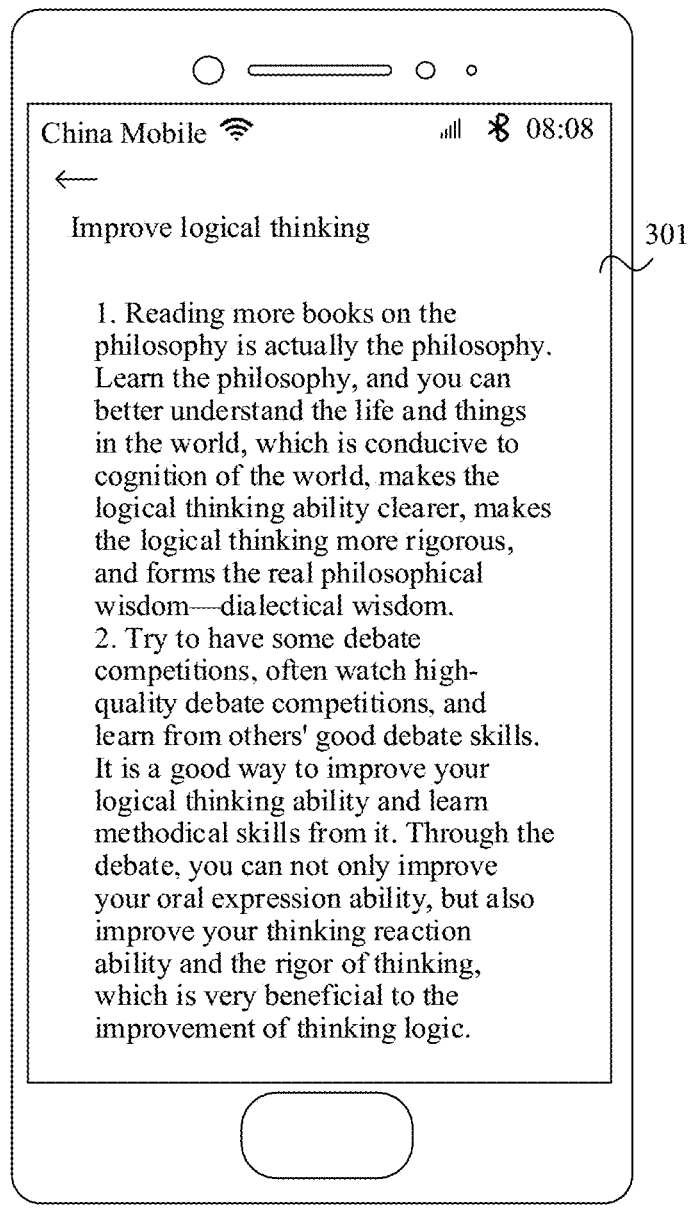
FIG. 3(a) and FIG. 3(b) are a schematic diagram of an application scenario of an annotation method in the conventional technology according to an embodiment of this application.
Figure 3B:
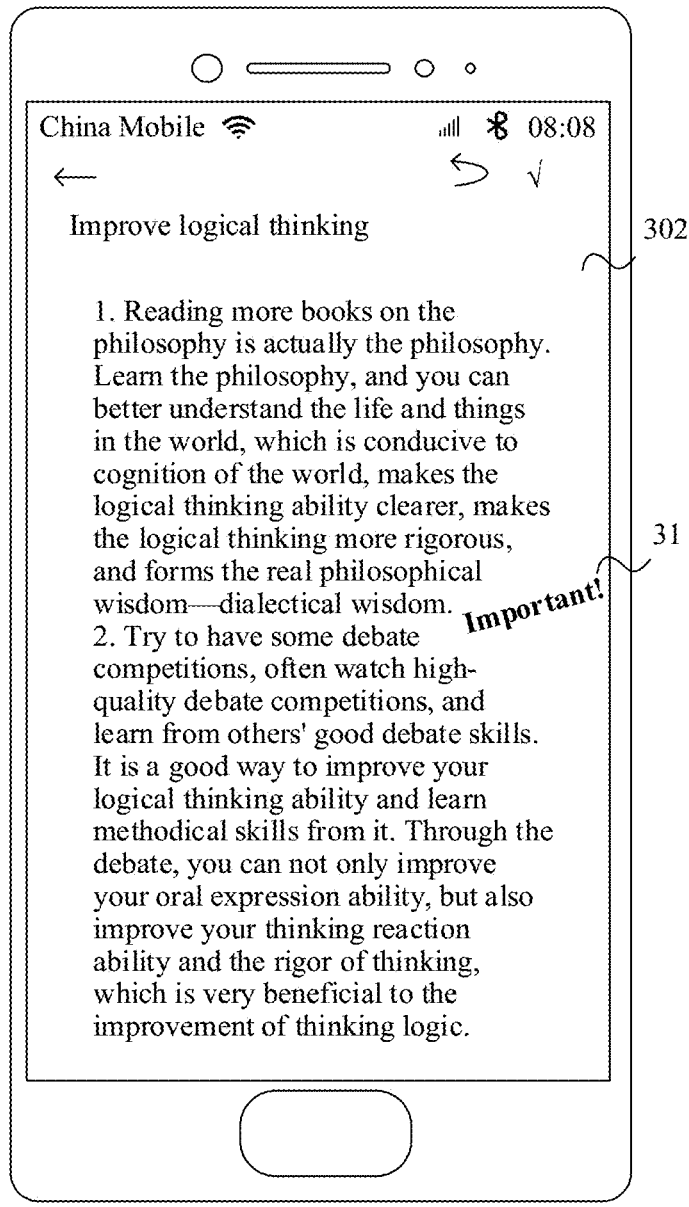

In the conventional technology, an annotation is usually added to a blank position in a document in a mobile phone. For example, as shown in FIG. 3(a), text content is displayed in an interface 301. When detecting an operation that a user adds annotation content, a mobile phone can select only a blank region in the interface 301 to display the annotation content. As shown in FIG. 3(b), when the user adds too much annotation content, or the interface of the mobile phone has a relatively small quantity of blank regions, an annotation 31 is extremely likely to cover the original document file content, causing a reading difficulty for the user.

In view of this, embodiments of this application provide an annotation adding method. A blank region in an interface of a mobile phone may be adaptively adjusted based on annotation content, to prevent an annotation from overlapping original document content, thereby improving reading experience of a user.

In some of embodiments of this application, the annotation method may be applied to an annotation scenario for an editable document file. In this scenario, when a mobile phone is in an annotation mode, the mobile phone may change a font format and/or a paragraph format of words in an editable document file, to adjust a size of a blank region in the document file, that is, adjust a region used to display an annotation.

In an embodiment, a variable font may be used. A font format of the variable font is adjusted to adjust a size of a blank region in a document file, and an adjusted blank region is used as an annotation region. The variable font is different from an originally stereotyped, static, and invariable font form, and allows a degree of randomness and user input in a flexible format, to obtain a final presentation result. The variable font includes typesetting and printing design space including one or more design axes. For example, the variable font may include two variables: a character height and a character width. For another example, the variable font may include two variables: a character weight and a character width. The character weight is a font thickness degree. For another example, the variable font may include a plurality of variables such as a character height, a character weight, and a character width. These variables are controlled by using coordinates in two-dimensional space, and different typesetting and printing experience is presented due to a change of any coordinate in the space.

In this way, font variability can be implemented by changing values of one or more variables, to reserve more blank regions for annotation. For example, if a character height of words in some lines in a document file is reduced, more blank regions for annotation may be obtained above or below these lines of variable fonts. For another example, if a character width of words in some lines in a document file is reduced, more blank regions for annotation may be obtained on a left side or a right side of these lines of variable fonts.

Figure 4A:
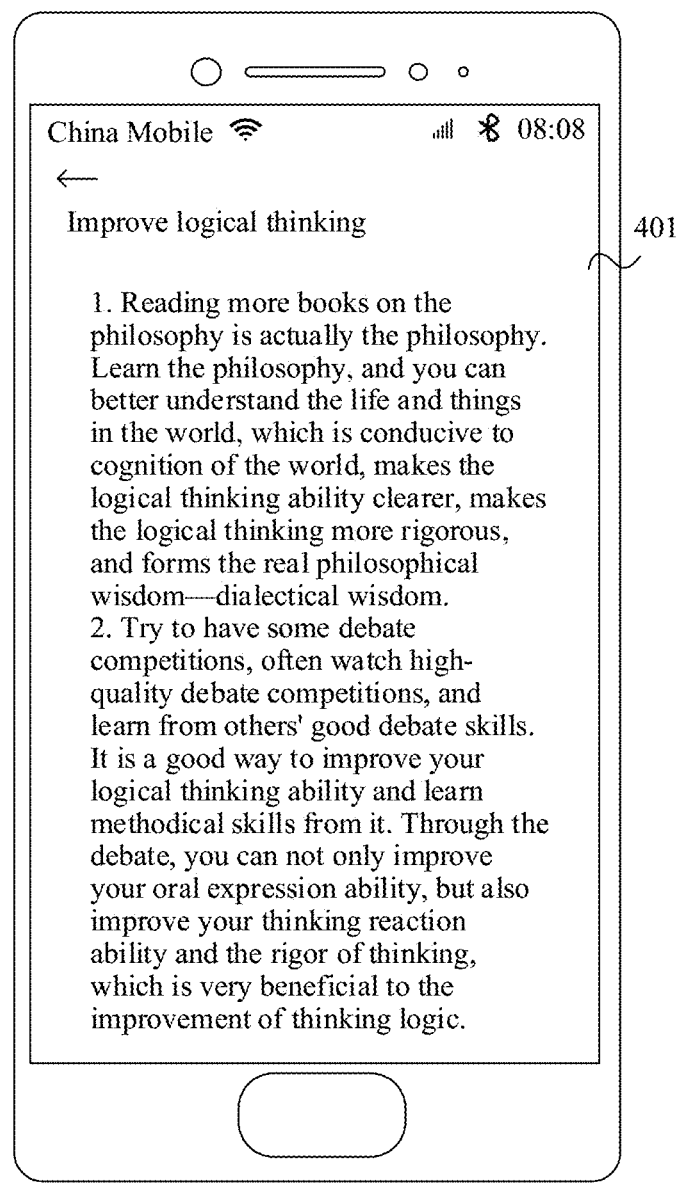
FIG. 4(a) to FIG. 4(d) are a schematic diagram 1 of an interface of an electronic device according to an embodiment of this application.
Figure 4B:
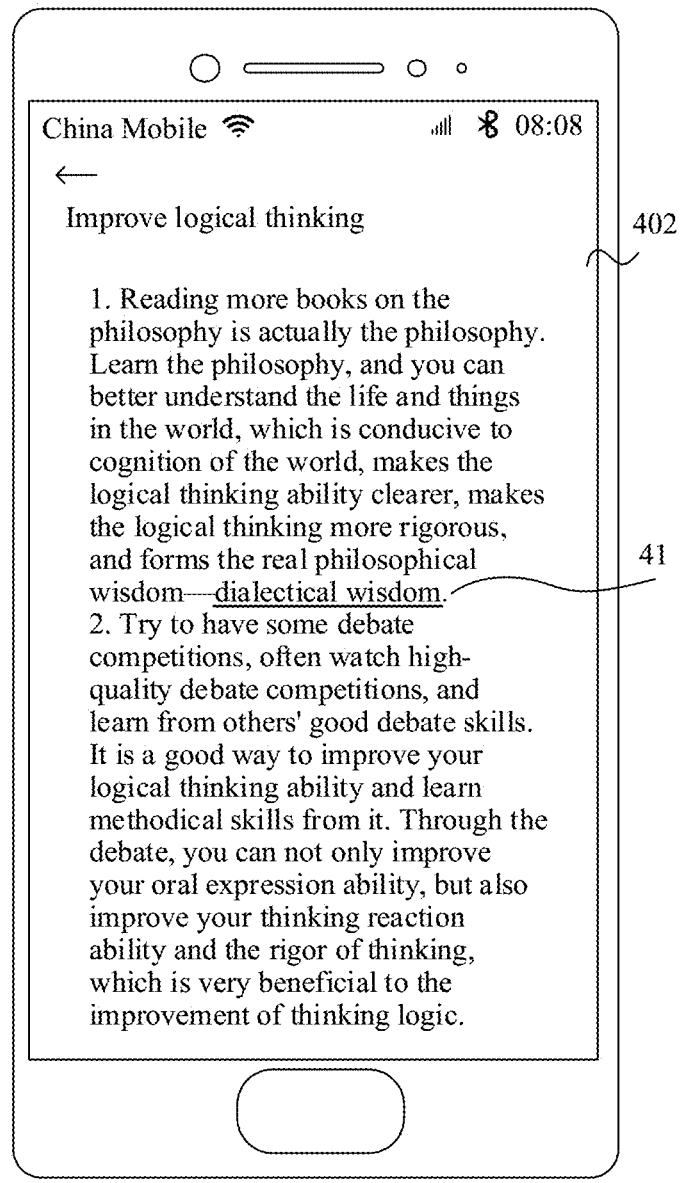
Figure 4C:
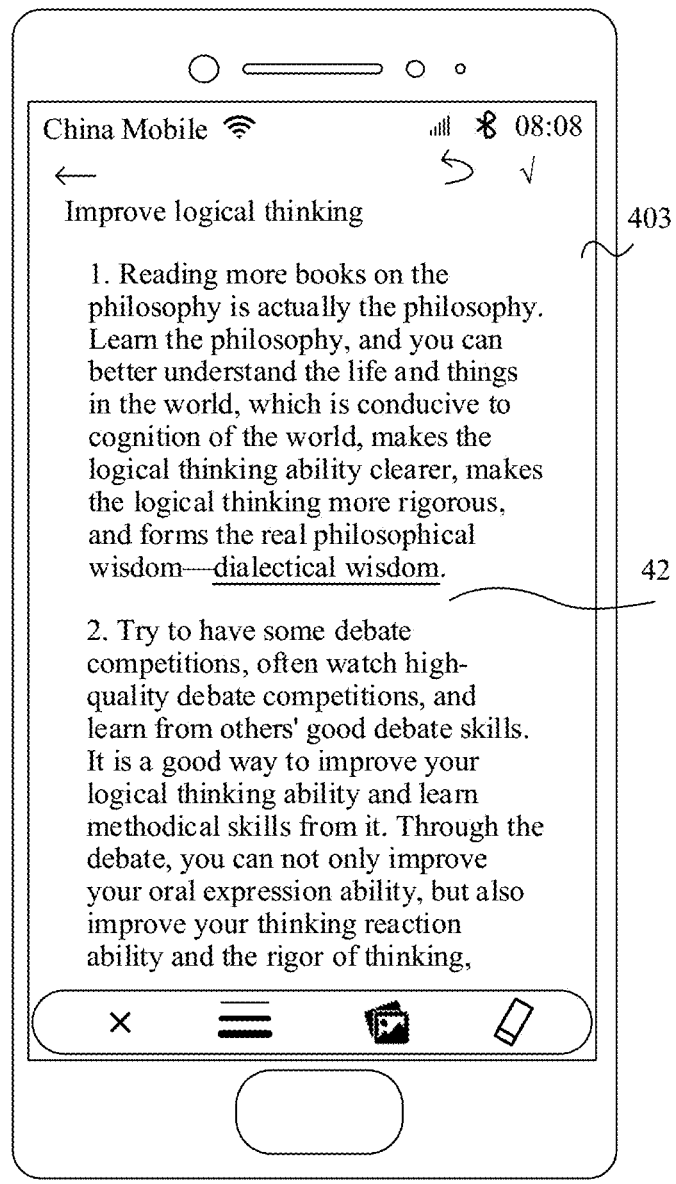
Figure 4D:
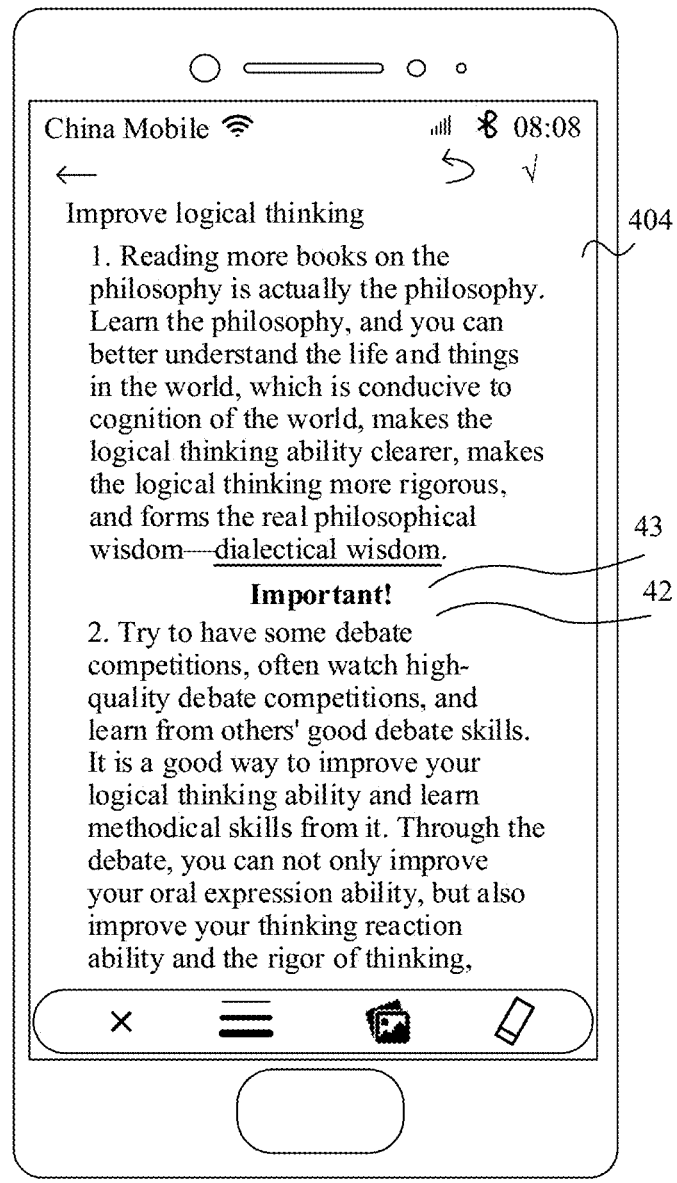

In an embodiment, a paragraph format or the like may be adjusted to adjust a size of a blank region in a document file, and an adjusted blank region is used as an annotation region. For example, the mobile phone may reduce a line spacing, a character spacing, and/or the like to obtain more blank regions for annotation. For another example, the mobile phone may move partial displayed content in a document file to obtain more blank regions for annotation. For example, as shown in FIG. 4(a), a mobile phone displays an interface 401, and displayed content in the interface 401 is content of a document file. If the mobile phone detects an operation that a user selects some words by using a stylus or a finger, the mobile phone displays an interface 402 shown in FIG. 4(b). An identifier 41, for example, a horizontal line identifier, is displayed below selected words displayed in the interface 402. The user determines, by using the identifier 41, whether the currently selected words are correct. If the mobile phone receives no word reselection operation within a preset time period, the mobile phone moves displayed content below the identifier 41 down by a preset length to display an interface 403 shown in FIG. 4(c). The interface 403 includes an annotation region 42 obtained after the displayed content is moved down. If the mobile phone detects an operation that the user adds an annotation, the mobile phone displays an interface 404 shown in FIG. 4(d). An annotation region 42 in the interface 404 displays annotation content 43.

Certainly, the foregoing two implementations may be alternatively combined to reserve more annotation regions. This is not limited in an embodiment of the application.

In some other embodiments of this application, the annotation method is applied to an annotation scenario for a non-editable document file. In this scenario, when a mobile phone is in an annotation mode, the mobile phone may convert a part of content in a document file into a picture format, and compress a converted picture to adjust a size of a blank region in the document file, that is, adjust a region used to display an annotation.

In an embodiment, in the foregoing annotation scenario for the editable document file or the annotation scenario for the non-editable document file, after an interface of a mobile phone displays an annotation region, annotation content entered by a user through handwriting by using a stylus or a finger may be detected, or annotation content entered by a user by using a keyboard may be received. The mobile phone displays the corresponding annotation content in the annotation region. If handwritten input is used, the mobile phone may further display annotation content of handwriting of the user.

Certainly, the method used in an embodiment is also applicable to an annotation scenario for an editable document file. That is, instead of changing a font format and a paragraph format of an original file, to-be-adjusted word content is directly compressed as a whole. This is not limited in an embodiment of the application.

The following describes, in detail with reference to the accompanying drawings, the annotation method provided in embodiments of this application.

Figure 5:
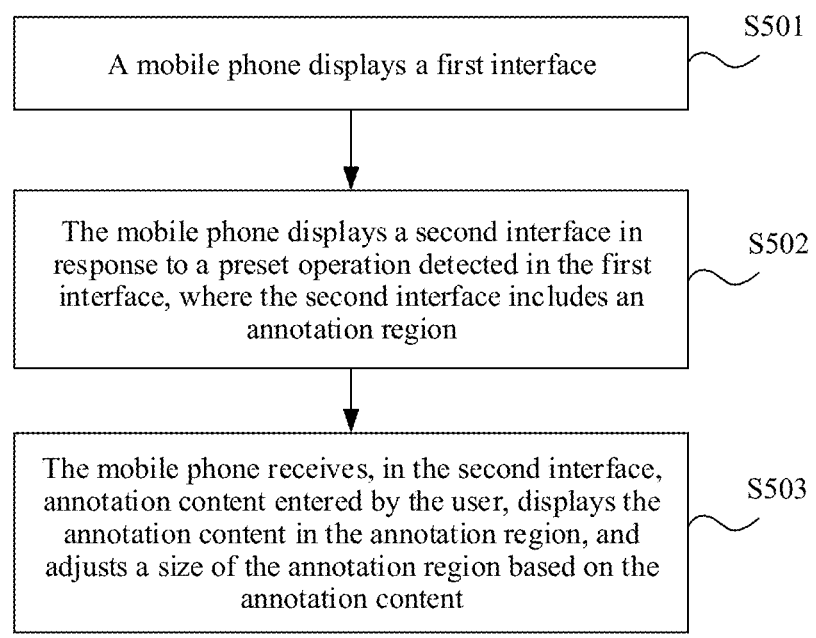
FIG. 5 is a schematic flowchart 1 of an annotation method according to an embodiment of this application.

FIG. 5 is a schematic flowchart of an annotation method according to an embodiment of this application. The method may include S501 to S503.

S501: A mobile phone displays a first interface.

S502: The mobile phone displays a second interface in response to a preset operation detected in the first interface, where the second interface includes an annotation region.

The first interface is an interface of a first application, and the first application can be used to display content of a document file. For example, the first interface is an interface displayed after an operation that a user enters an annotation mode is detected, or the first interface is a read interface of the document file. The document file in the first interface is an editable file or a non-editable file. If the document file in the first interface is an editable file, the annotation region may be obtained by compressing text content displayed in the first interface; or the annotation region may be obtained after a part or all of text content in the first interface is converted into a picture and the picture is compressed. If the document file in the first interface is a non-editable file, the annotation region may be obtained after a part or all of text content in the first interface is converted into a picture and the picture is compressed.

The preset operation is that the user performs a sliding operation of a preset track, and the preset track may include, for example, an oblique line segment, a closed graphic, or a preset symbol. The sliding operation of the preset track may be sliding of a finger of the user on a screen of the mobile phone, or may be sliding of the user with a stylus on the screen of the mobile phone. The mobile phone displays the second interface after detecting the sliding operation of the preset track in the first interface. The second interface is an interface displayed by the mobile phone in the annotation mode, the second interface includes a first region and a second region, the first region is used to display content of a first document file, and the second region is used to display annotation content. The mobile phone may receive, in the second interface, annotation content entered by the user, and display the annotation content in the annotation region of the second interface. The annotation region is the second region. A font format and/or a paragraph format of at least a part of words in the first region are/is different from a font format and/or a paragraph format of words in the document file in the first interface.

In some embodiments of this application, the first interface is the interface displayed after the operation that the user enters the annotation mode is detected. After detecting, in the read interface of the document file, the operation that the user enters the annotation mode, the mobile phone enters the annotation mode and displays the first interface. Then, after detecting, in the first interface, that the user performs the preset sliding operation, the mobile phone determines, based on a sliding pattern and action position, content that needs to be compressed. Finally, after compressing the content that needs to be compressed, the mobile phone reserves a blank region at a corresponding position as the annotation region. The operation of entering the annotation mode may include, for example, an operation of tapping a stylus button, an operation of the user in the read interface of the document file (for example, control manipulation, touching and holding, or double tapping), a speech command, or a floating gesture.

Figure 6A:
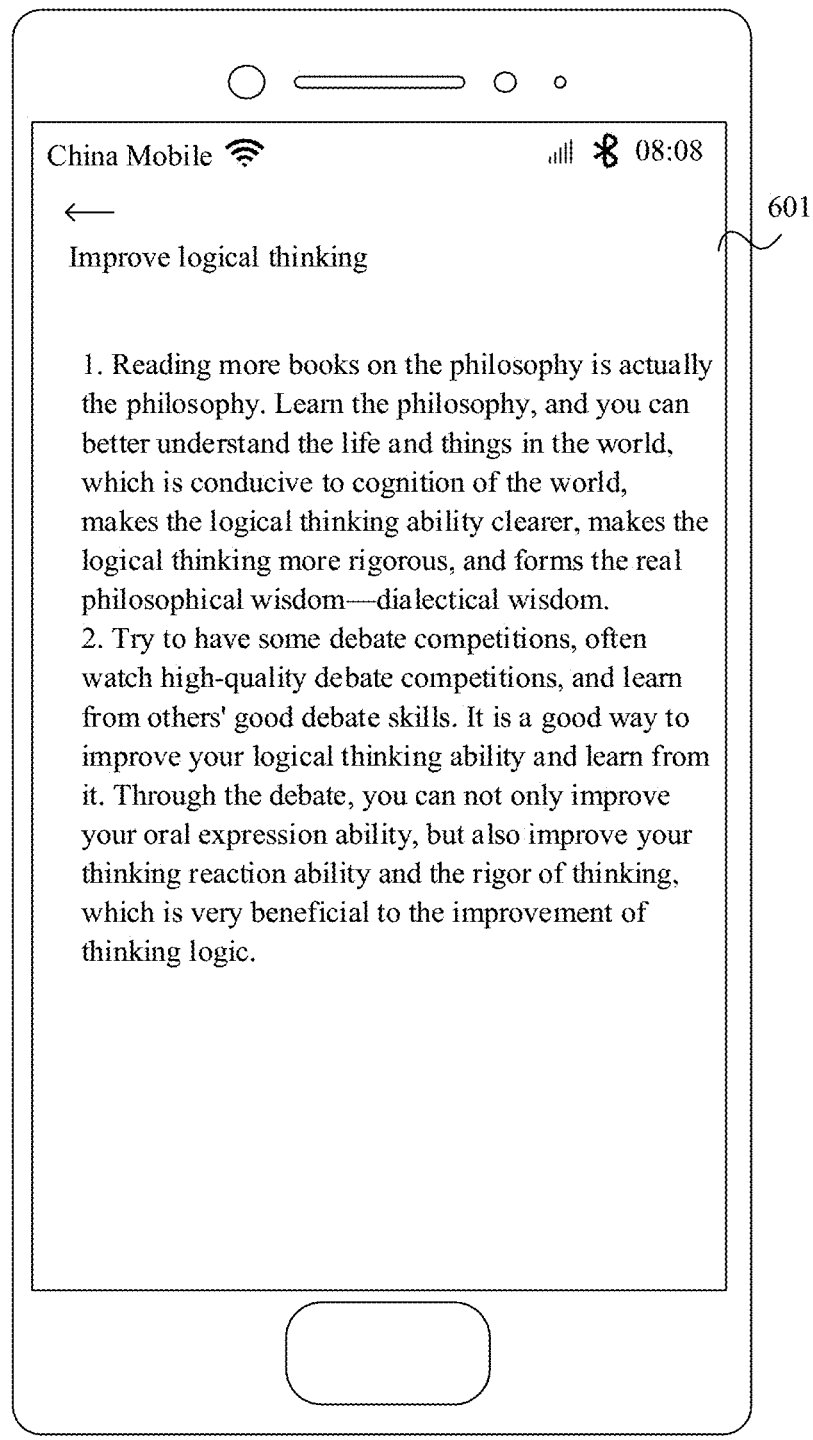
FIG. 6(a) to FIG. 6(f) are a schematic diagram 2 of an interface of an electronic device according to an embodiment of this application.
Figure 6B:
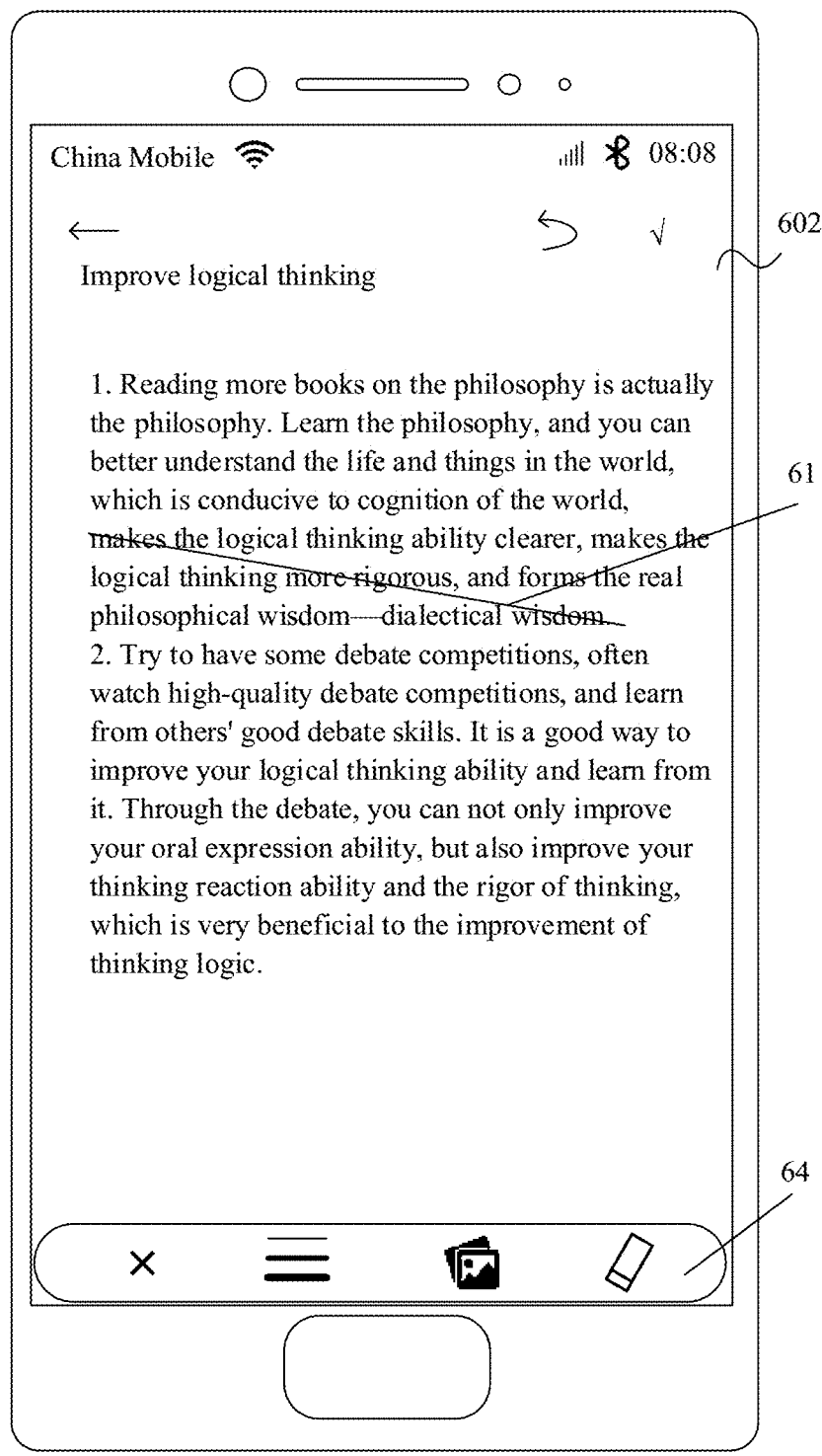

For example, an interface 601 shown in FIG. 6(a) is the read interface of the document file. After detecting, in the interface 601, the operation that the user enters the annotation mode, the mobile phone enters the annotation mode, and displays an interface 602 shown in FIG. 6(b). The interface 602 is the first interface.

Figure 6C:
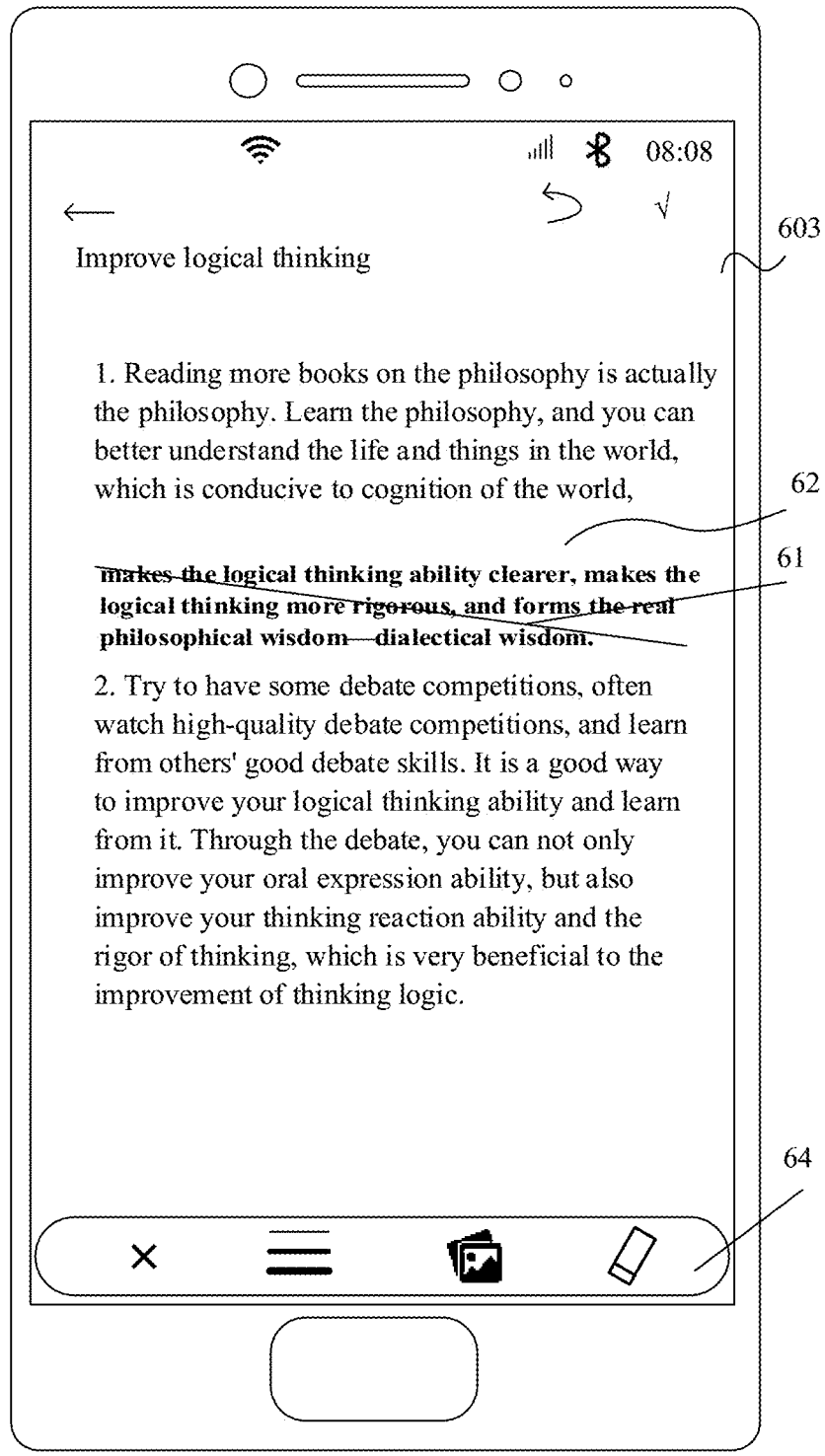
Figure 6D:
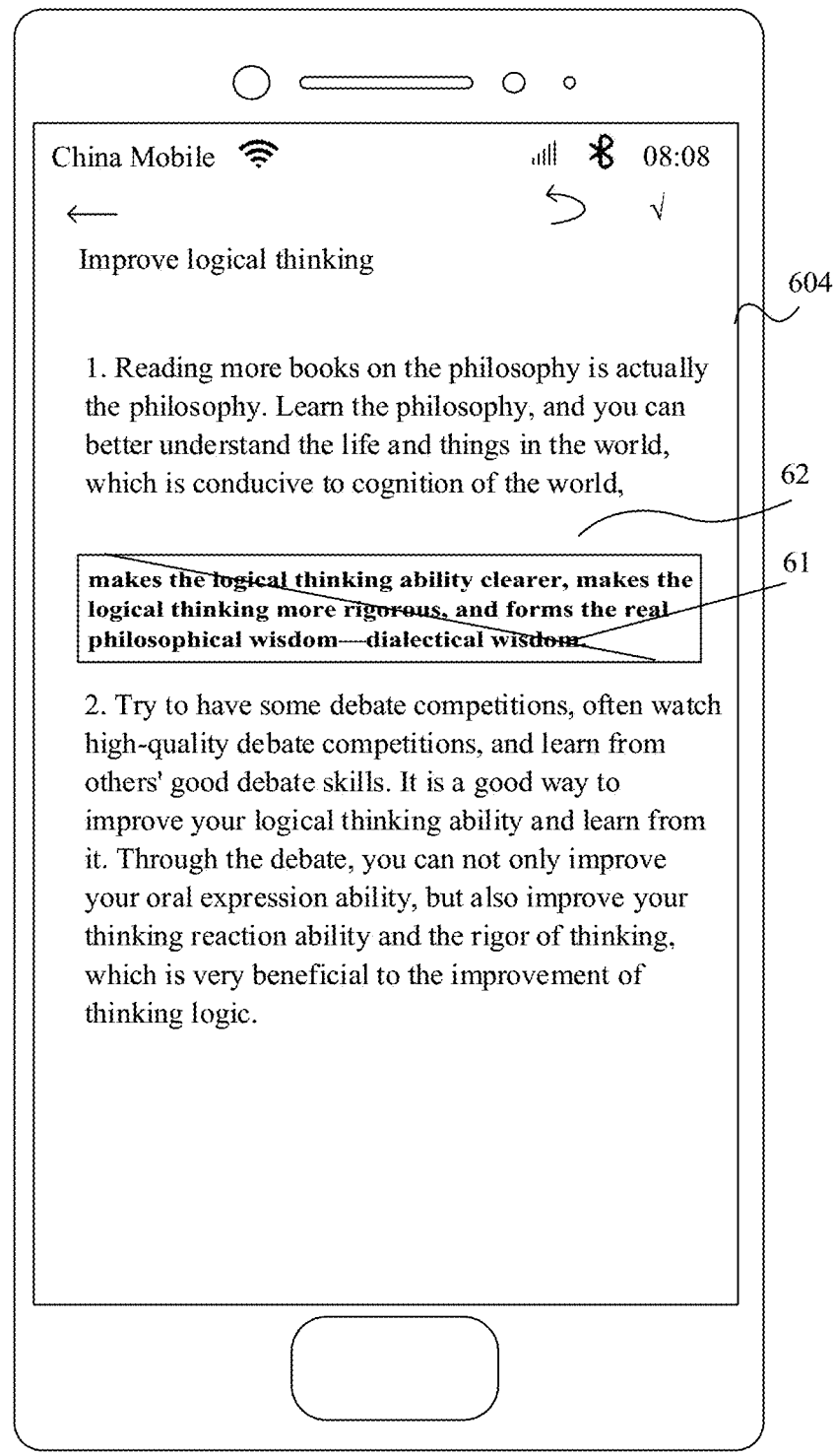

The mobile phone detects, in the interface 602, the preset operation performed by the user. For example, a mark 61 is the sliding track corresponding to the preset operation. Then, after determining, based on the preset operation, content that needs to be compressed and compressing the content that needs to be compressed, the mobile phone displays an interface 603 shown in FIG. 6(c). The interface 603 is the second interface, and the interface 603 includes an annotation region 62.

In some other embodiments of this application, the first interface is the read interface of the document file. After detecting the preset operation performed by the user in the first interface, the mobile phone enters the annotation mode, determines, based on a sliding pattern and action position, content that needs to be compressed, and after compressing the content that needs to be compressed, reserves a blank region at a corresponding position as the annotation region.

For example, an interface 601 shown in FIG. 6(a) is the first interface. After detecting, in the interface 601, the preset operation performed by the user, the mobile phone enters the annotation mode. Then, after determining, based on the preset operation, content that needs to be compressed and compressing the content that needs to be compressed, the mobile phone displays an interface 603 shown in FIG. 6(c). The interface 603 is the second interface, and the interface 603 includes an annotation region 62.

In an embodiment, the interface displayed by the mobile phone after the mobile phone detects the operation that the user enters the annotation mode, for example, the interface 602, may display a toolbar 64. The mobile phone detects that the user operates a tool in the toolbar, to edit the annotation content. For example, if the mobile phone detects that the user taps a picture option in the toolbar 64, the mobile phone can insert a picture in the annotation region. For another example, if the mobile phone detects that the user taps an eraser option in the toolbar 64, the mobile phone determines, in response to an erase operation of the user, whether to delete the annotation content and/or the sliding track of the preset operation.

In an embodiment, in response to detecting the preset operation in the first interface, the mobile phone may determine a compression object and a compression policy based on a pattern (such as an oblique line segment, a closed graphic, or a preset symbol) and action position of the sliding track of the preset operation. The compression object is to-be-compressed content. The compression policy may include a compression manner, a compression direction, and a compression ratio. Then, the mobile phone compresses the compression object by using the determined compression policy, to obtain the second region. That is, after compressing the to-be-compressed content according to the compression manner, the compression direction, and the compression ratio, the mobile phone may obtain the corresponding annotation region, and display the second interface that includes the annotation region. The second interface may not display the sliding track of the preset operation, or may display the sliding track of the preset operation. If the second interface displays the sliding track, a preset time period may be configured. After the preset time period, the sliding track automatically disappears. Alternatively, after annotation ends, the sliding track automatically disappears. Alternatively, the sliding track is not displayed in response to an operation that the user deletes the sliding track.

The to-be-compressed content is partial displayed content that can be weakened and that is determined by the user. The mobile phone determines, based on the sliding track of the preset operation, the partial displayed content that needs to be compressed. After compressing the partial displayed content, the mobile phone may obtain the annotation region. If displayed content of the mobile phone is in a variable font, the compression manner includes one or several of the following: character height compression, character width compression, character weight compression, character spacing compression, and line spacing compression. If displayed content of the mobile phone is in a non-variable font, the compression manner is character spacing compression and/or line spacing compression. The compression direction includes one or several of the following: upward, downward, leftward, and rightward. The compression ratio is a ratio at which the mobile phone compresses the to-be-compressed content for the first time when detecting the preset operation. For example, a character height of words of the to-be-compressed content is compressed at 20%.

In an embodiment, the compression ratio at which the mobile phone compresses the to-be-compressed content may be preconfigured in the mobile phone, and set to a default value; may be determined based on a coverage width and/or length of the sliding track of a preset operation; or may be determined based on execution time of the preset operation. After detecting the preset operation, the mobile phone compresses the to-be-compressed content at the compression ratio corresponding to the preset operation, to obtain the annotation region.

In some examples, the compression ratio is preconfigured in the mobile phone, and a same compression ratio or different compression ratios may be set for preset operations of different sliding tracks. After detecting a preset operation, the mobile phone determines a corresponding compression ratio based on a sliding track, and compresses to-be-compressed content at the compression ratio.

In some other examples, the mobile phone may determine the compression ratio based on the coverage width and/or length of the sliding track. For example, compression ratios corresponding to sliding tracks of different lengths are preconfigured in the mobile phone. The compression ratio may correspond to an area of the annotation region. For example, a larger compression ratio indicates a larger annotation region obtained after the to-be-compressed content is compressed for the first time.

For example, the sliding track of the preset operation is a long oblique line segment. In the following Table 1, a correspondence between a ratio of a coverage width of a long oblique line segment to a width of displayed content in an interface and a compression ratio is set. In this way, if the mobile phone detects long oblique line segments of different coverage widths, the mobile phone compresses to-be-compressed content based on corresponding compression ratios. It can be learned that a larger coverage width of a long oblique line segment indicates a larger compression ratio. In this case, a corresponding annotation region is larger.

TABLE 1

| Sequence number | Ratio of a coverage width of a long oblique line segment to a width of displayed content in an interface | Compression ratio |
| --- | --- | --- |
| 1 | 50% to 60% | 10% |
| 2 | 60% to 70% | 20% |
| 3 | 70% to 80% | 30% |
| 4 | 80% to 90% | 40% |
| 5 | 90% to 100% | 50% |

In some other examples, the mobile phone may detect pressing time during which the stylus or the finger finally stays at the end of the sliding track when performing the preset operation, to determine the compression ratio. This process may be a dynamic process. In a process in which the user performs the preset operation and finally stays at a current interface, an annotation region change may be seen. For example, after detecting a long oblique line segment, the mobile phone displays the second interface that includes the annotation region. If the mobile phone currently detects that the stylus or the finger of the user does not leave the second interface and keeps touching and holding at the end of the long oblique line segment, the mobile phone may persistently compress to-be-compressed content according to a corresponding compression manner and compression direction, until the stylus or the finger of the user leaves the second interface, or the to-be-compressed content is compressed to a compression upper limit.

In this way, the user may expand, by touching and holding the display, the area of the annotation region based on a size of the annotation region displayed in the second interface, until the user considers that a size of a currently displayed annotation region meets a requirement, thereby improving user experience.

In an embodiment, the sliding track of the preset operation is an oblique line segment. For example, the oblique line segment may include a long oblique line segment, a short oblique line segment, or the like. If the mobile phone detects an oblique line segment that is entered in the first interface and whose coverage width exceeds a preset width, and an oblique angle of the current oblique line segment exceeds a preset oblique angle, the mobile phone may determine that the current oblique line segment is the sliding track corresponding to the preset operation. The preset width and the preset angle may be preconfigured in the mobile phone after being set by a manufacturer based on empirical values or a user habit. Alternatively, the mobile phone may directly receive customized values set by the user.

For example, it is assumed that the preset width is 30% of a width of a displayed text on a current page, and the preset oblique angle is 10 degrees. In this case, if the mobile phone detects, in the first interface, an oblique line segment whose coverage width is greater than or equal to 30% of the width of the displayed text on the current page and oblique angle is greater than or equal to 10 degrees, the mobile phone determines that an operation corresponding to the oblique line segment is the preset operation. After determining to-be-compressed content based on the oblique line segment and compressing the to-be-compressed content, the mobile phone displays the second interface. That is, the mobile phone determines, based on the coverage width and the oblique angle of the detected oblique line segment, whether the current oblique line segment is the sliding track corresponding to the preset operation. For example, if the mobile phone detects that a coverage width of an oblique line segment is equal to the width of the displayed text on the current page, and an oblique angle of the oblique line segment is 30 degrees, the mobile phone determines that the current oblique line segment is the sliding track of the preset operation, and displays the second interface through switching. For another example, if the mobile phone detects an oblique line segment whose oblique angle is less than 10 degrees, the mobile phone determines that the mobile phone currently detects no preset operation, and still displays displayed content in an original interface, in other words, displays the first interface.

The mobile phone may determine, based on whether a ratio of a coverage width of an oblique line segment for a displayed text in the first interface to a width of the displayed text is greater than a first threshold, that the current oblique line segment is a long oblique line segment or a short oblique line segment. It is assumed that the first threshold is 50% of the width of the displayed text in the first interface. If the coverage width of the oblique line segment is greater than 50% of the width of the displayed text on the current page, the oblique line segment is a long oblique line segment; or if the coverage width of the oblique line segment is less than or equal to 50% of the width of the displayed text on the current page, the oblique line segment is a short oblique line segment. For example, it may be learned, from a sliding track 61 that is of a preset operation and that is displayed in an interface 602 in FIG. 6(*b*), that the sliding track corresponding to the current preset operation is a long oblique line segment. It may be learned, from a sliding track 91 that is of a preset operation and that is displayed in an interface 901 in FIG. 9(*a*), it may be learned that the sliding track corresponding to the current preset operation is a short oblique line segment.

The mobile phone may determine an oblique direction of the current oblique line segment based on positions of a left end point and a right end point of the detected oblique line segment. For example, if a position of the left end point is higher than a position of the right end point, the oblique direction of the oblique line segment is downward; or if a position of the left end point is lower than a position of the right end point, the oblique direction of the oblique line segment is upward. Alternatively, the mobile phone determines an oblique direction of the current oblique line segment based on an oblique angle of the oblique line segment. For example, if the oblique angle is less than 90 degrees, the oblique direction of the oblique line segment is upward; or if the oblique angle is greater than 90 degrees, the oblique direction of the oblique line segment is downward.

In an embodiment, if the sliding track corresponding to the preset operation is a long oblique line segment, to-be-compressed content is displayed content covered by the long oblique line segment, a compression manner is character height compression and/or line spacing compression, and a compression direction corresponds to an oblique direction of the long oblique line segment. If the mobile phone detects a downward-inclined long oblique line segment, a compression direction is downward, that is, to-be-compressed content is downward compressed. If the mobile phone detects an upward-inclined long oblique line segment, a compression direction is upward, that is, to-be-compressed content is upward compressed. Alternatively, a compression direction is preconfigured in the mobile phone, and after detecting a preset operation whose sliding track is a long oblique line segment, the mobile phone determines that a compression direction is upward or downward. Further, after compressing to-be-compressed content, the mobile phone reserves an annotation region above or below the to-be-compressed content covered by the long oblique line operation.

For example, an interface 602 shown in FIG. 6(*b*) is the interface displayed after the operation that the user enters the annotation mode is detected, and the mobile phone detects, in the interface 602, a preset operation whose sliding track is a long oblique line segment. The mobile phone determines, based on a sliding track 61, that to-be-compressed content is three lines of displayed content that are covered by the long oblique line segment, namely, three lines of words that are covered by the sliding track 61. The sliding track 61 is a downward-inclined long oblique line segment, and therefore a compression direction is downward. In this case, if text content displayed in the interface 602 is editable, after downward compressing a character height and/or a line spacing of the to-be-compressed content, the mobile phone displays an interface 603 shown in FIG. 6(*c*). The interface 603 is the second interface. As shown in the interface 603, an annotation region 62 is displayed above compressed to-be-compressed content. The sliding track 61 may be further displayed in the interface 603.

In addition, if text content displayed in the interface 602 is non-editable, the to-be-compressed content may be converted into a picture, and the converted picture is downward compressed, to display an interface 604 shown in FIG. 6(*d*). The interface 604 is the second interface and includes an annotation region 62, and displayed content covered by the sliding track 61 is in a picture format.

It should be noted that in the following examples in which the mobile phone compresses to-be-compressed content based on different sliding tracks, an example in which text content displayed in the first interface is editable text content is used for description. For a scenario of compressing to-be-compressed content in non-editable text content, refer to the foregoing examples. Details are not described in the following again.

Figure 7A:
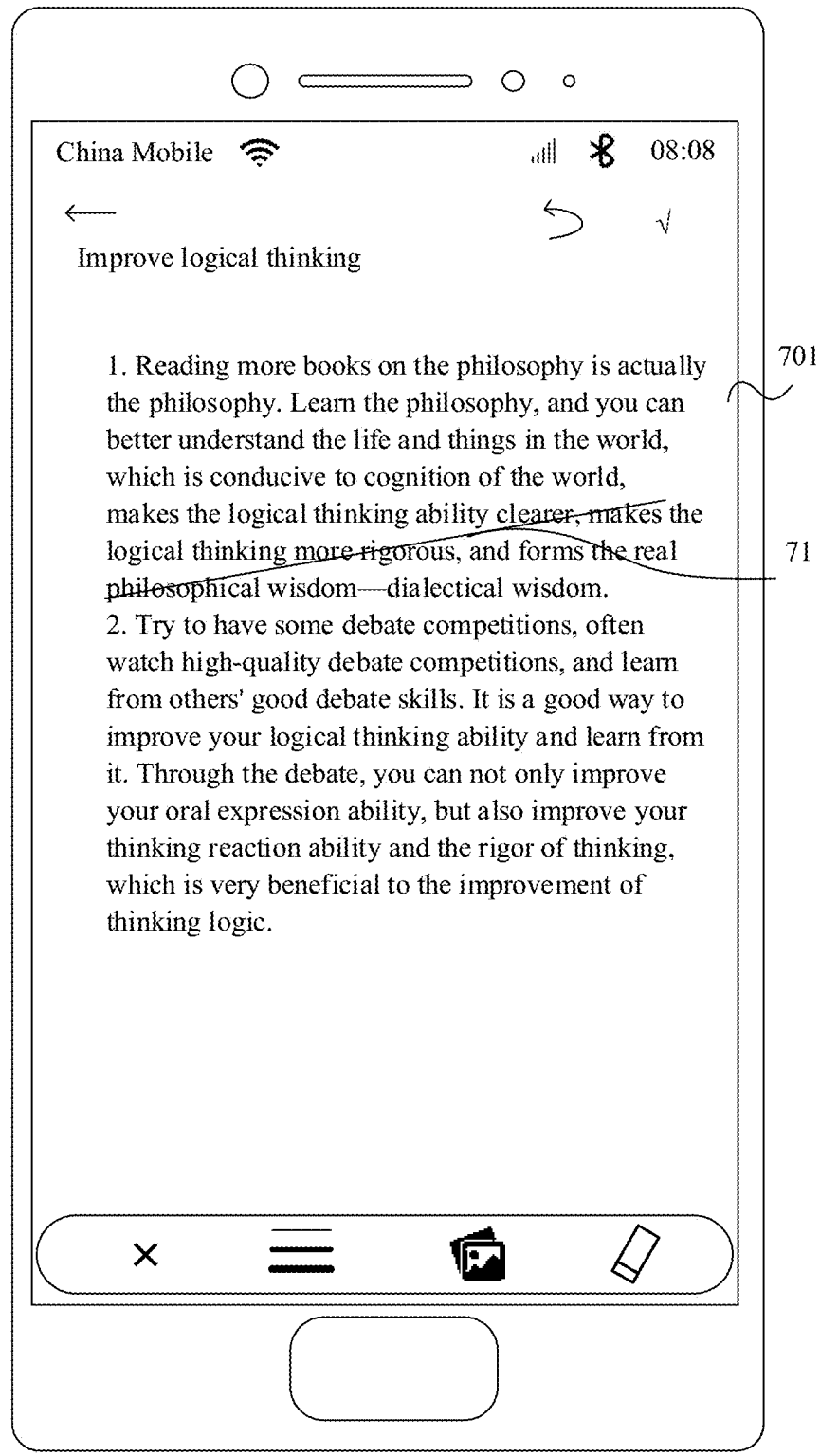
FIG. 7(a) and FIG. 7(b) are a schematic diagram 3 of an interface of an electronic device according to an embodiment of this application.
Figure 7B:
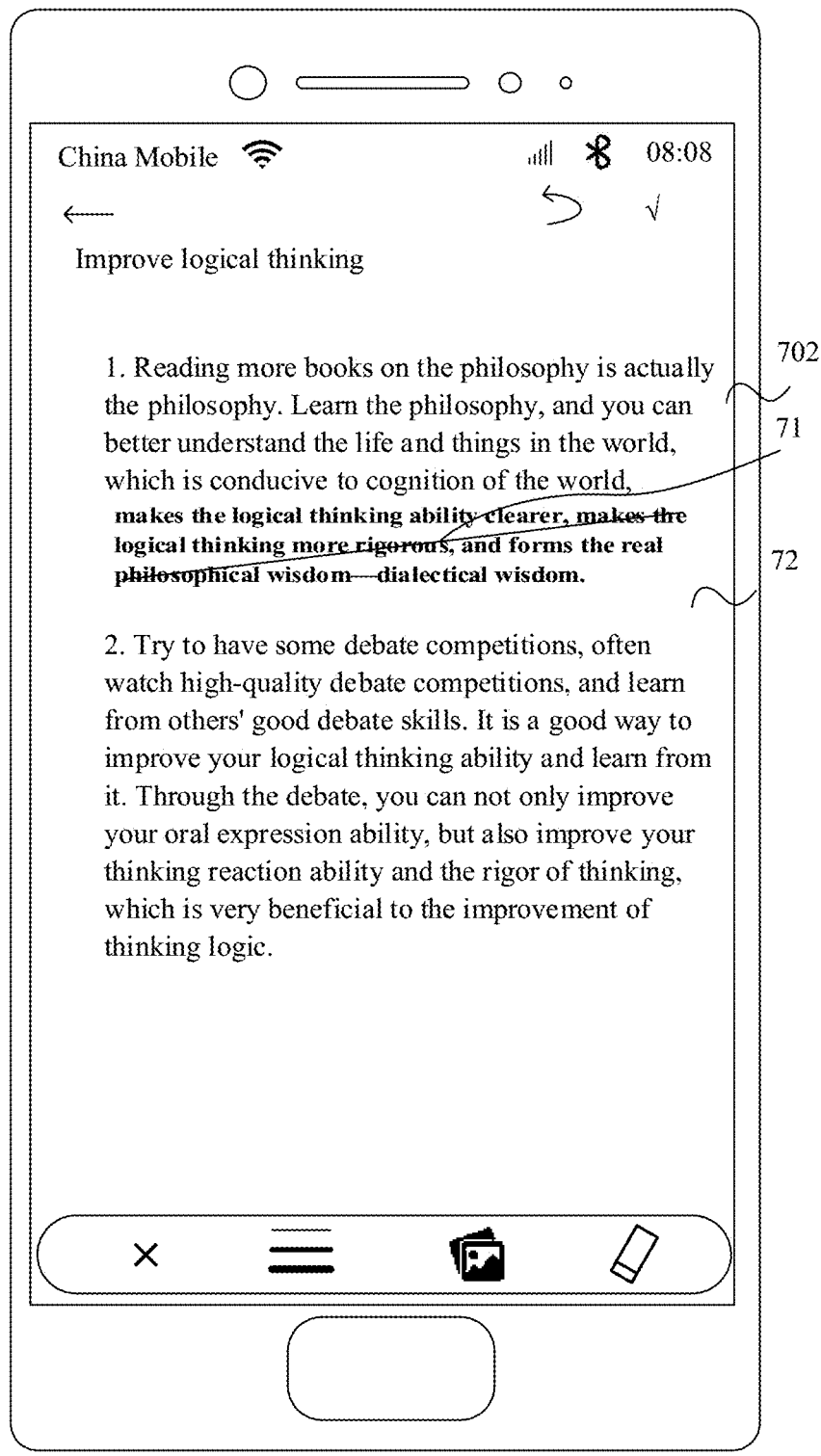

For another example, the mobile phone detects, in an interface 701 shown in FIG. 7(*a*), a preset operation whose sliding track is a long oblique line segment. The mobile phone determines, based on a sliding track 71, that to-be-compressed content is three lines of displayed content that are covered by the long oblique line segment, namely, three lines of words that are covered by the sliding track 71. The sliding track 71 is an upward-inclined long oblique line segment, and therefore a compression direction is upward. After upward compressing a character height and/or a line spacing of the to-be-compressed content, the mobile phone displays an interface 702 shown in FIG. 7(*b*). The interface 702 is the second interface. As shown in the interface 702, an annotation region 72 is displayed below compressed to-be-compressed content.

In an embodiment, if the sliding track corresponding to the preset operation is a short oblique line segment, to-be-compressed content, a compression manner, and a compression direction are determined based on an oblique direction of the short oblique line segment and a position of a left end point and/or a position of a right end point.

For example, if the oblique direction of the short oblique line segment is downward, the to-be-compressed content is displayed content on a right side of the left end point in a line in which words covered by the short oblique line segment are located, the compression manner is character width compression and/or character spacing compression, and the compression direction is rightward. In this case, a correspondingly obtained annotation region is located on a left side of the to-be-compressed content. For a determining manner based on the oblique direction of the short oblique line segment, refer to the determining manner based on the oblique direction of the long oblique line segment. Details are not described herein.

For another example, if the oblique direction of the short oblique line segment is upward, the to-be-compressed content is displayed content on a left side of the right end point in a line in which words covered by the short oblique line segment are located, the compression manner is character width compression and/or character spacing compression, and the compression direction is leftward. In this case, a correspondingly obtained annotation region is located on a right side of the to-be-compressed content.

For another example, a compression manner is character width compression and/or character spacing compression, compression directions of an upward-inclined short oblique line segment and a downward-inclined short oblique line segment are the same, for example, both the compression directions are leftward or rightward, and to-be-compressed content is displayed content on a left side of a right end point or displayed content on a right side of a left end point in a line in which words covered by the short oblique line segment are located. In this case, a correspondingly obtained annotation region is located on a left side or a right side of the to-be-compressed content.

In an embodiment, if the sliding track corresponding to the preset operation is a short oblique line segment, to-be-compressed content, a compression manner, and a compression direction are determined based on a start position and/or an end position of the short oblique line segment. The start position of the short oblique line segment is located on a left side of the end position.

In an embodiment, if the start position of the short oblique line segment is at the beginning of a sentence, and an oblique direction of the short oblique line segment is downward, the to-be-compressed content is displayed content in a line in which words covered by the short oblique line segment are located, the compression manner is character width compression and/or character spacing compression, and the compression direction is rightward. For a determining manner based on the oblique direction of the short oblique line segment, refer to the determining manner based on the oblique direction of the long oblique line segment. Details are not described herein.

Figure 9A:
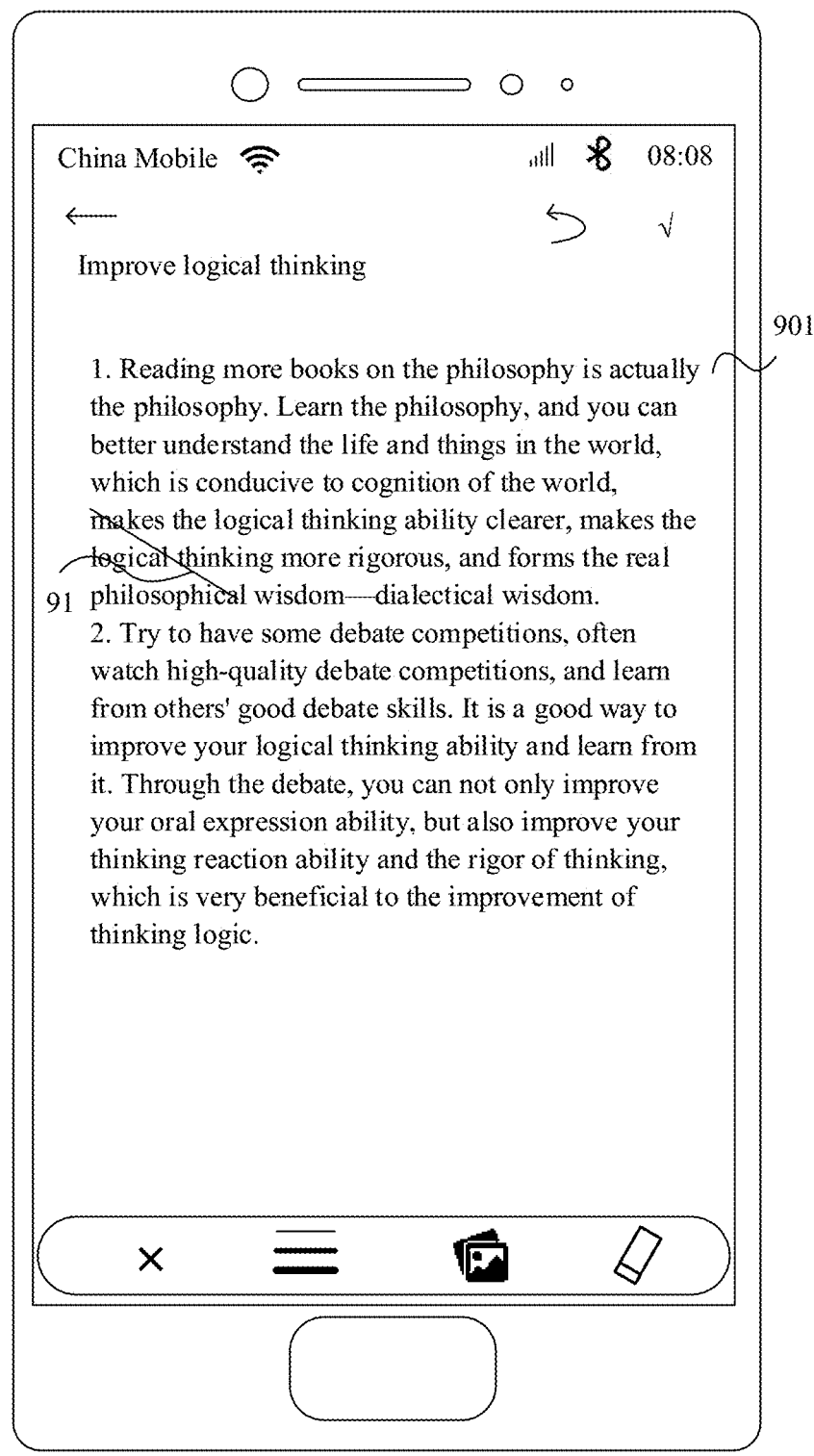
FIG. 9(a) to FIG. 9(f) are a schematic diagram 5 of an interface of an electronic device according to an embodiment of this application.
Figure 9B:
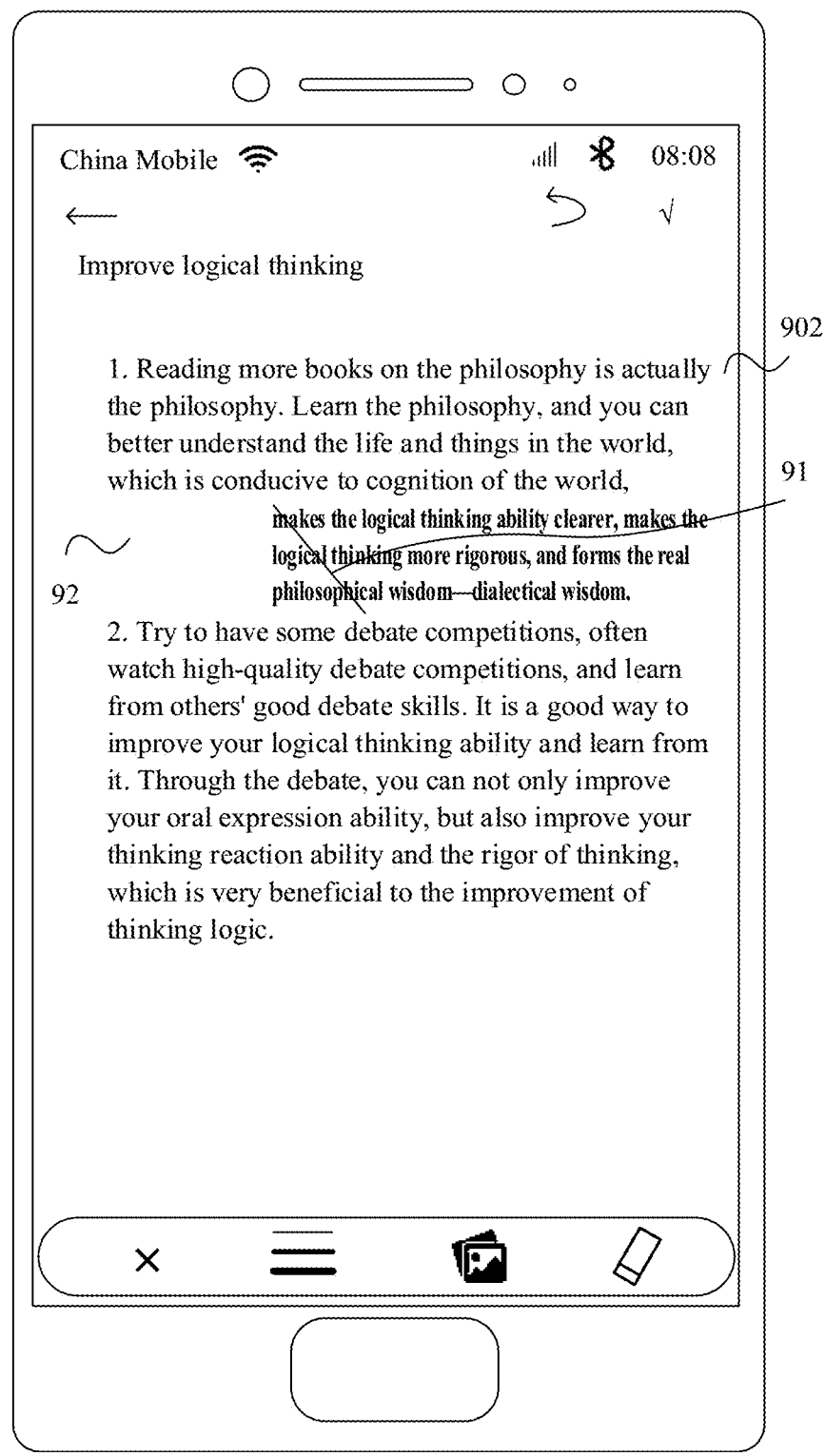

For example, the mobile phone detects, in an interface 901 shown in FIG. 9(a), a short oblique line segment slidably entered by the user by using the stylus or the finger, and displays a sliding track 91. An oblique direction of the short oblique line segment is downward, a start position of the short oblique line segment is at the beginning of a sentence, and the short oblique line segment covers three lines of words. In this case, to-be-compressed content is the three lines of covered words, a compression manner is character width compression and/or character spacing compression, and a compression direction is rightward. After compressing the to-be-compressed content, the mobile phone displays an interface 902 shown in FIG. 9(b). The interface 902 is the second interface, and an annotation region 92 is displayed on a left side of compressed to-be-compressed content in the interface 902.

In an embodiment, if the end position of the short oblique line segment is at the end of a sentence, and an oblique direction of the short oblique line segment is downward, the to-be-compressed content is displayed content on a right side of the start portion of the short oblique line segment in a line in which words covered by the short oblique line segment are located, the compression manner is character width compression and/or character spacing compression, and the compression direction is rightward.

For example, the sliding track of the preset operation is a downward-inclined short oblique line segment, an end position of the short oblique line segment is at the end of a sentence, and the short oblique line segment covers three lines of words. In this case, to-be-compressed content is the three lines of covered words on a right side of a start position, a compression manner is character width compression and/or character spacing compression, and a compression direction is rightward. After compressing the to-be-compressed content based on the preset operation, the mobile phone displays an interface 903 shown in FIG. 9(c). The interface 903 is a second interface displayed by the mobile phone after the mobile phone rightward compresses the to-be-compressed content in response to the operation whose sliding track is the short oblique line. The interface 903 includes an annotation region 92.

In an embodiment, if the end position of the short oblique line segment is at the end of a sentence, and an oblique direction of the short oblique line operation is upward, the to-be-compressed content is displayed content in a line in which words covered by the short oblique line segment are located, the compression manner is character width compression and/or character spacing compression, and the compression direction is leftward.

For example, the sliding track of the preset operation is an upward-inclined short oblique line segment, an end position of the short oblique line segment is at the end of a sentence, and the short oblique line segment covers three lines of words. In this case, to-be-compressed content is the three lines of words that are covered by the short oblique line segment, a compression manner is character width compression and/or character spacing compression, and a compression direction is leftward. After compressing the to-be-compressed content based on the preset operation, the mobile phone displays an interface 904 shown in FIG. 9(d), and an annotation region 92 is displayed in the interface 904.

In an embodiment, if the start position of the short oblique line segment is at the beginning of a sentence, and an oblique direction of the short oblique line segment is upward, the to-be-compressed content is displayed content on a left side of the end portion of the short oblique line segment in a line in which words covered by the short oblique line segment are located, the compression manner is character width compression and/or character spacing compression, and the compression direction is leftward.

For example, the sliding track of the preset operation is an upward-inclined short oblique line segment, a start position of the short oblique line segment is at the beginning of a sentence, and the short oblique line segment covers three lines of words. In this case, to-be-compressed content is the three lines of covered words on a left side of an end position of the short oblique line segment, a compression manner is character width compression and/or character spacing compression, and a compression direction is leftward. After compressing the to-be-compressed content based on the preset operation, the mobile phone displays an interface 905 shown in FIG. 9(e), and an annotation region 92 is displayed in the interface 905.

In an embodiment, if the start position and the end position of the short oblique line segment are in the middle of a sentence, and an oblique direction of the short oblique line segment is downward, the to-be-compressed content is partial content covered by the short oblique line segment in a line in which words covered by the short oblique line segment are located, the compression manner is character height compression and/or line spacing compression, and the compression direction is downward.

For example, the sliding track of the preset operation is a downward-inclined short oblique line segment, a start position and an end position of the short oblique line segment are both middle positions of a sentence, and the short oblique line segment covers three lines of words. In this case, to-be-compressed content is partial content covered by the short oblique line segment in three lines of words in which the short oblique line segment is located, a compression manner is character height compression and/or line spacing compression, and a compression direction is downward. After compressing the to-be-compressed content based on the preset operation, the mobile phone displays an interface 906 shown in FIG. 9(f), and an annotation region 92 is displayed in the interface 906.

In an embodiment, if the start position and the end position of the short oblique line segment are in the middle of a sentence, and an oblique direction of the short oblique line segment is upward, the to-be-compressed content is partial content covered by the short oblique line segment in a line in which words covered by the short oblique line segment are located, the compression manner is character height compression and/or line spacing compression, and the compression direction is upward.

In an embodiment, if the sliding track corresponding to the preset operation is a short oblique line segment, to-be-compressed content is displayed content in a line in which the short oblique line segment is located, a compression manner is character width compression and/or character spacing compression, and a compression direction is leftward or rightward. For example, a compression direction, for example, leftward or rightward, corresponding to a preset operation whose sliding track is a short oblique line segment is preconfigured in the mobile phone. After detecting, in the first interface, a preset operation whose sliding track is a short oblique line segment, the mobile phone leftward or rightward compresses displayed content in a line in which the short oblique line segment is located. For another example, a compression direction is determined based on an oblique direction of the short oblique line segment. For example, if the short oblique line segment is upward inclined, a corresponding compression direction is leftward; or if the short oblique line segment is downward inclined, a corresponding compression direction is rightward.

In an embodiment, the sliding track of the preset operation is a closed graphic. The closed graphic may include, for example, a completely closed graphic or a graphic closed with an edge of a display page. The completely closed graphic indicates that a start position and an end position of the preset operation overlap. The graphic closed with the edge of the display page indicates that the sliding track of the preset operation is not closed, but forms a closed graphic with an edge of content of a text document displayed by the mobile phone.

When the sliding track of the preset operation is a closed graphic, to-be-compressed content is displayed content around the closed graphic or displayed content in a line in which words covered by the closed graphic are located. That is, an annotation region obtained by the mobile phone after the mobile phone compresses the to-be-compressed content based on the closed graphic is a region in the corresponding closed graphic. A position of the closed graphic corresponds to a position of the annotation region, and a size of the closed graphic may correspond to a size of the annotation region. For example, the to-be-compressed content is displayed content on a left side of the closed graphic, a corresponding compression manner is character width compression and/or character spacing compression, and a compression direction is leftward. For another example, the to-be-compressed content is displayed content on a right side of the closed graphic, a corresponding compression manner is character width compression and/or character spacing compression, and a compression direction is rightward. For another example, the to-be-compressed content is displayed content, for example, one line of displayed content, above the closed graphic, a corresponding compression manner is character height compression and/or line spacing compression, and a compression direction is upward. For another example, the to-be-compressed content is displayed content, for example, one line of displayed content, below the closed graphic, a corresponding compression manner is character height compression and/or line spacing compression, and a compression direction is downward.

It should be noted that a shape of the closed graphic is not limited in an embodiment of the application. The closed graphic may be in a regular closed shape, or may be in an irregular closed shape.

Figure 10A:
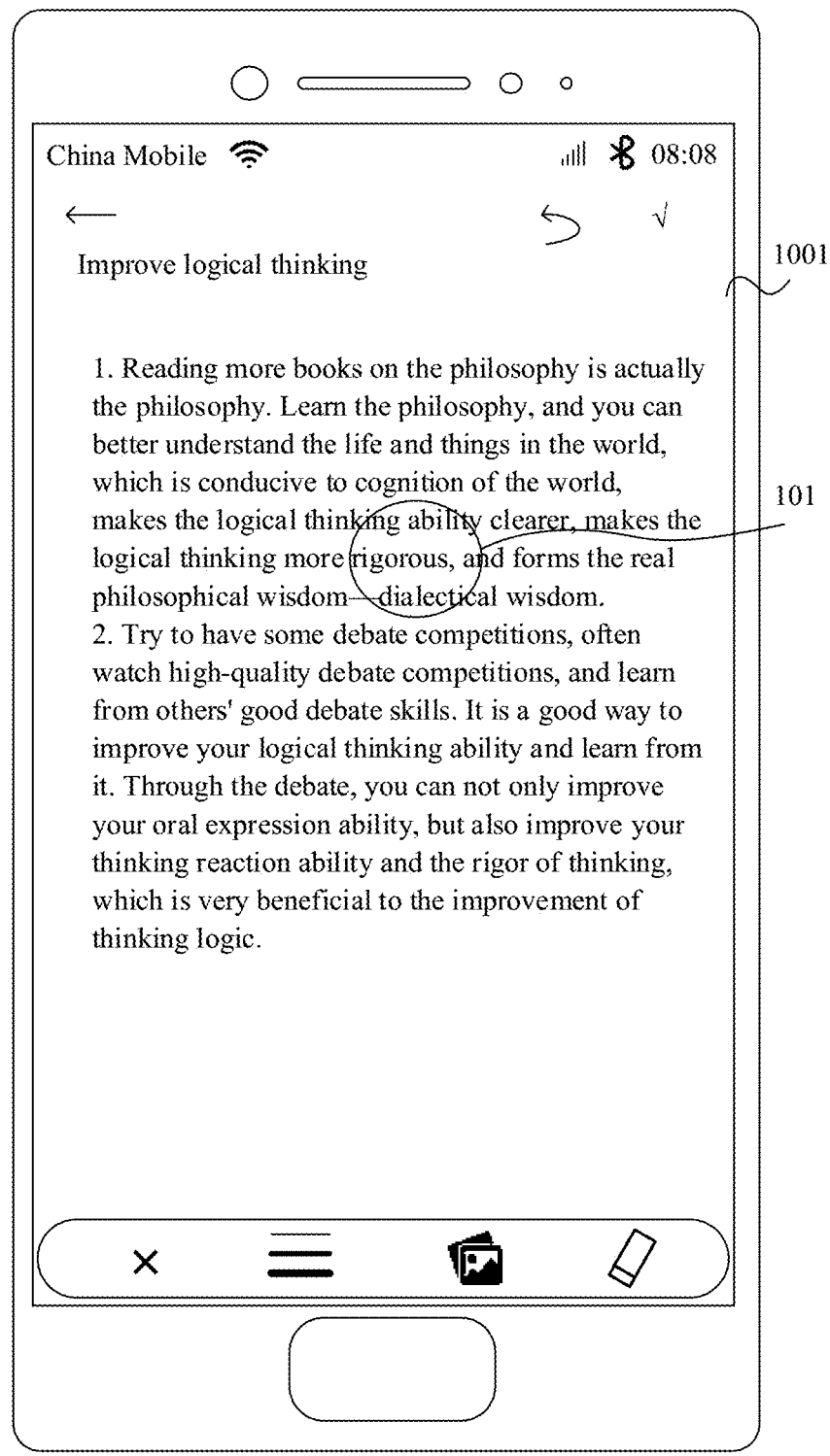
FIG. 10(a) and FIG. 10(b) are a schematic diagram 6 of an interface of an electronic device according to an embodiment of this application.
Figure 10B:
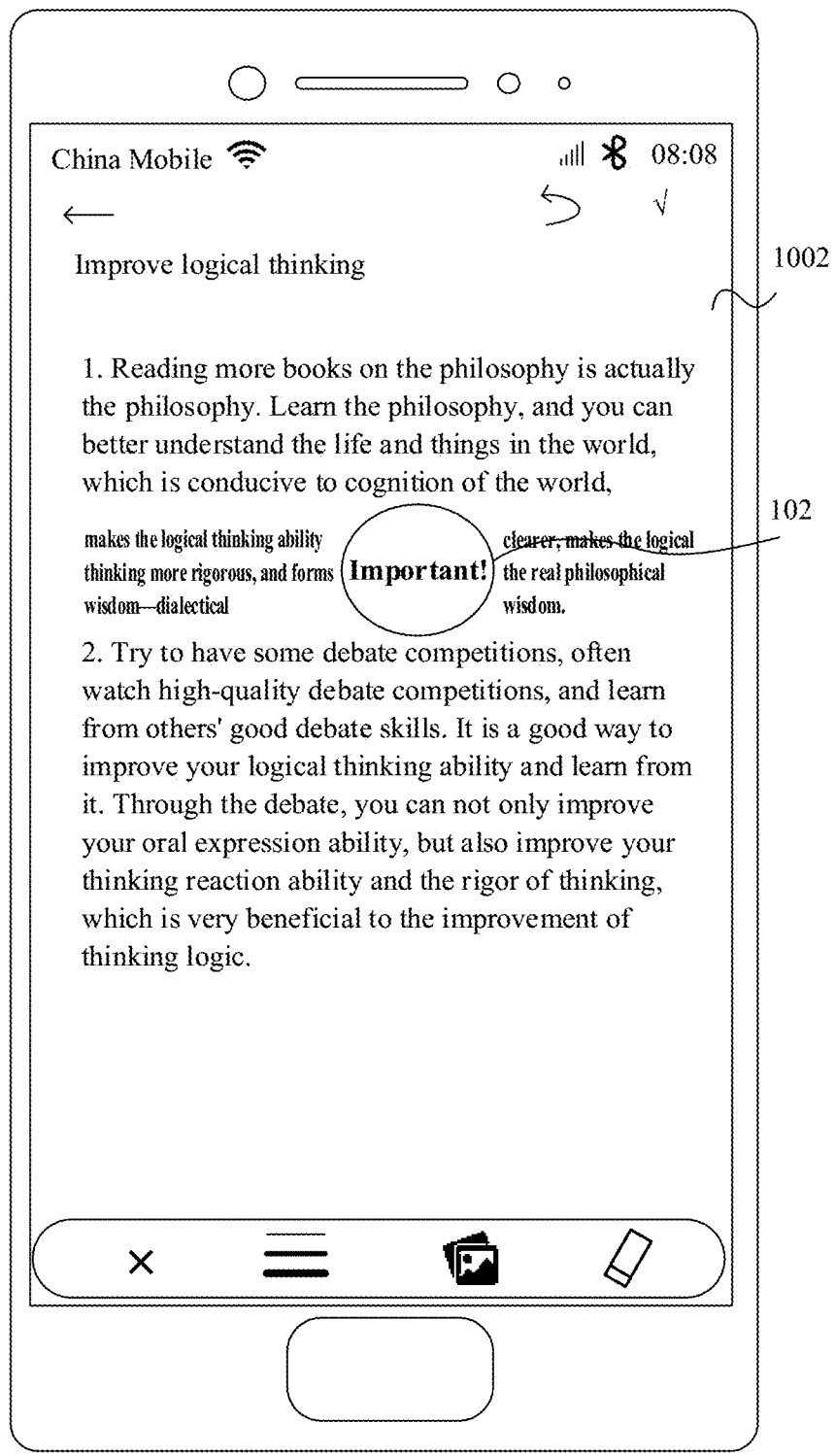

In an embodiment, the sliding track of the preset operation is a completely closed graphic. As shown in FIG. 10(a), the mobile phone detects, in an interface 1001, a preset operation whose sliding track is a completely closed graphic, displays a sliding track 101, and determines that to-be-compressed content is displayed content in lines in which the completely closed graphic is located, a compression manner is character width compression and/or character spacing compression, and a compression direction of displayed content on a left side of a midpoint position of the sliding track 101 is leftward and a compression direction of displayed content on a right side of the midpoint position of the sliding track 101 is rightward. After compressing the to-be-compressed content based on the preset operation, the mobile phone displays an interface 1002 shown in FIG. 10(b). The interface 1002 is the second interface and includes an annotation region 102.

Figure 11A:
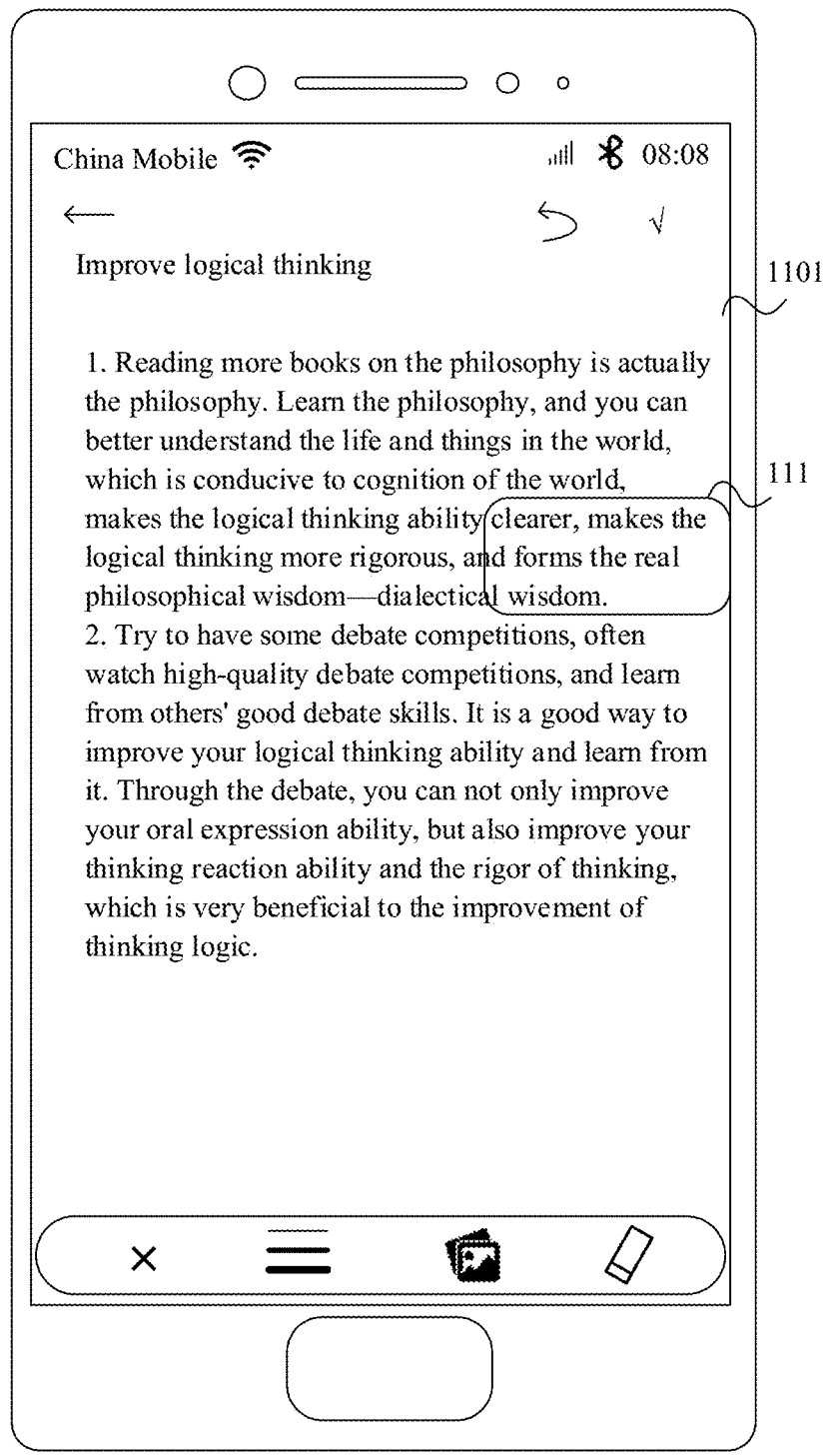
FIG. 11(a) to FIG. 11(d) are a schematic diagram 7 of an interface of an electronic device according to an embodiment of this application.

In an embodiment, the sliding track of the preset operation is a graphic closed with an edge of a display page. As shown in FIG. 11(a), the mobile phone detects, in an interface 1101, a preset operation whose sliding track is a graphic closed with an edge of a display page, displays a sliding track 111, and determines that to-be-compressed content is displayed content in lines in which the graphic closed with the edge of the display page is located, a compression manner is character width compression and/or character spacing compression, and a compression direction is leftward. After compressing the to-be-compressed content based on the preset operation, the mobile phone displays an interface 1102 shown in FIG. 11(b). The interface 1102 is the second interface and includes an annotation region 112.

In an embodiment, the sliding track of the preset operation is a preset symbol, for example, may include a preconfigured symbol. If the mobile phone detects, in the first interface, a preset symbol entered by the user, the mobile phone determines to display the second interface through switching. The preset symbol may include a preset symbol without a direction and a preset symbol with a direction. For example, in an interface 1201 shown in FIG. 12(a), a preset symbol is a V-shaped symbol, and corresponds to a sliding track 121.

In an embodiment, if the preset symbol is a preset symbol without a direction, to-be-compressed content is a line in which words covered by the preset symbol are located and/or a neighboring line. If the to-be-compressed content can be displayed content on a left side and a right side of the preset symbol, a compression manner is character width compression and/or character spacing compression, and a compression direction is leftward and rightward. If the to-be-compressed content can be displayed content above and below the preset symbol, a compression manner is character height compression and/or line spacing compression, and a compression direction is upward and downward.

Figure 12A:
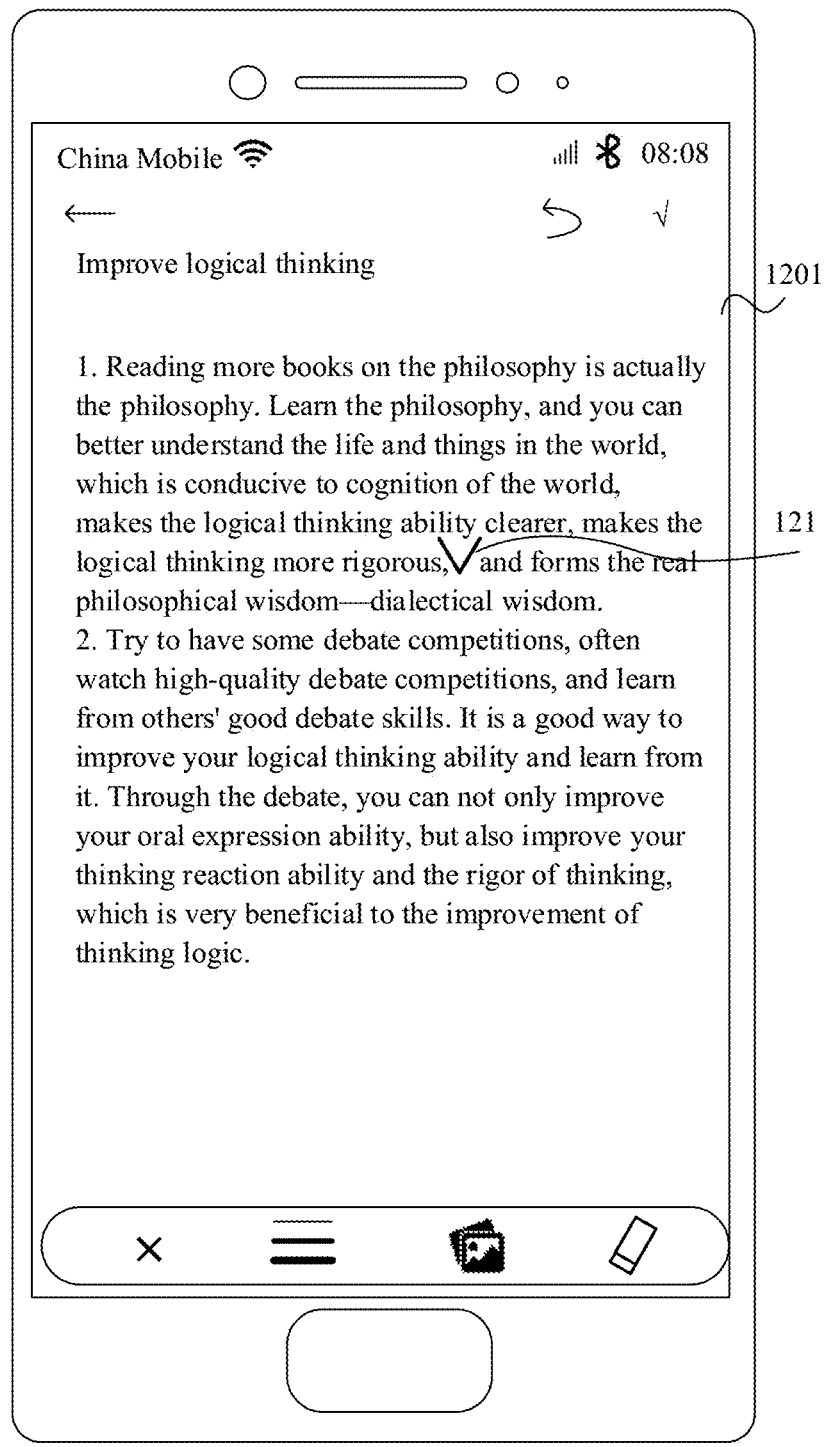
FIG. 12(a) to FIG. 12(d) are a schematic diagram 8 of an interface of an electronic device according to an embodiment of this application.
Figure 12B:
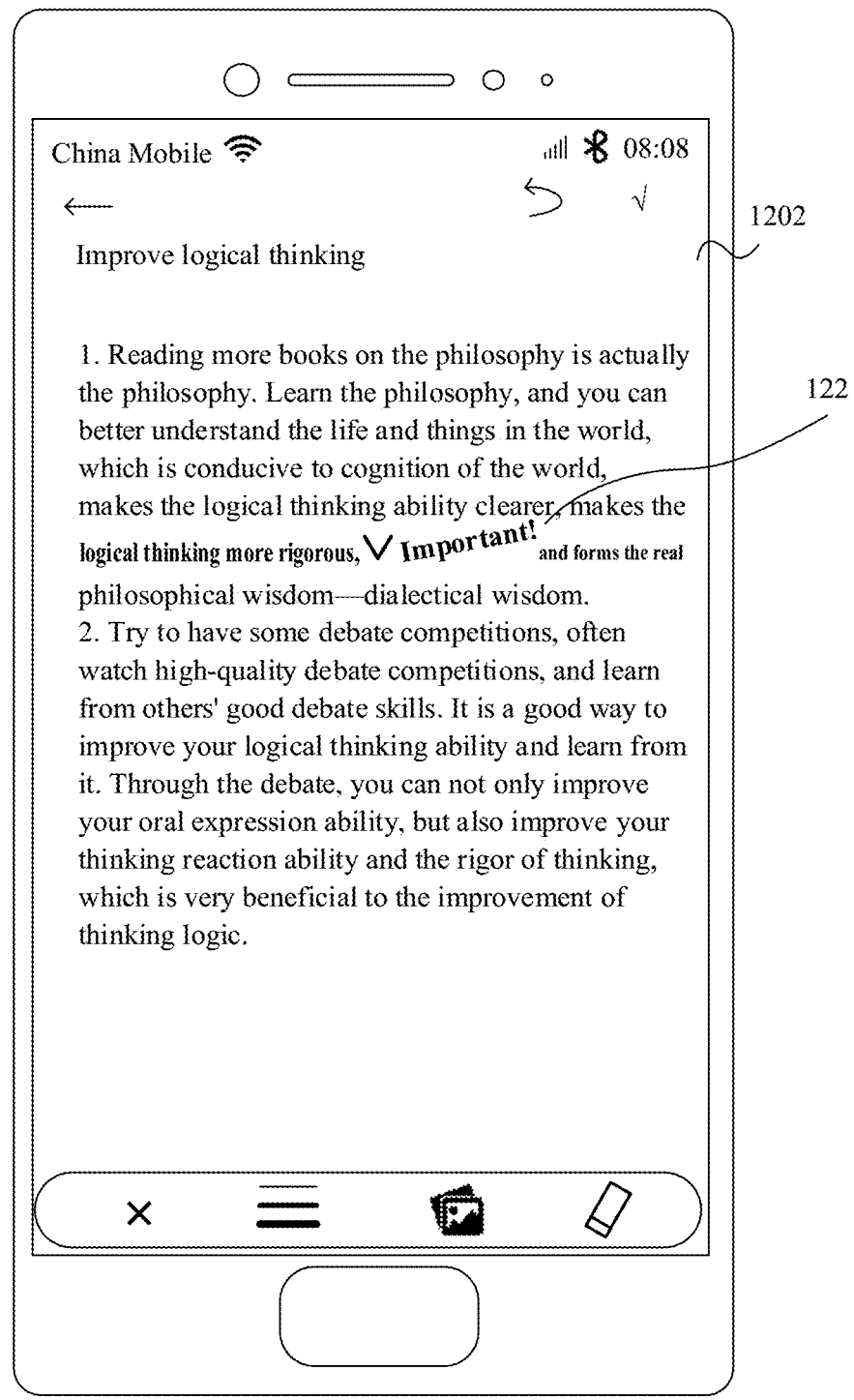
Figure 12C:
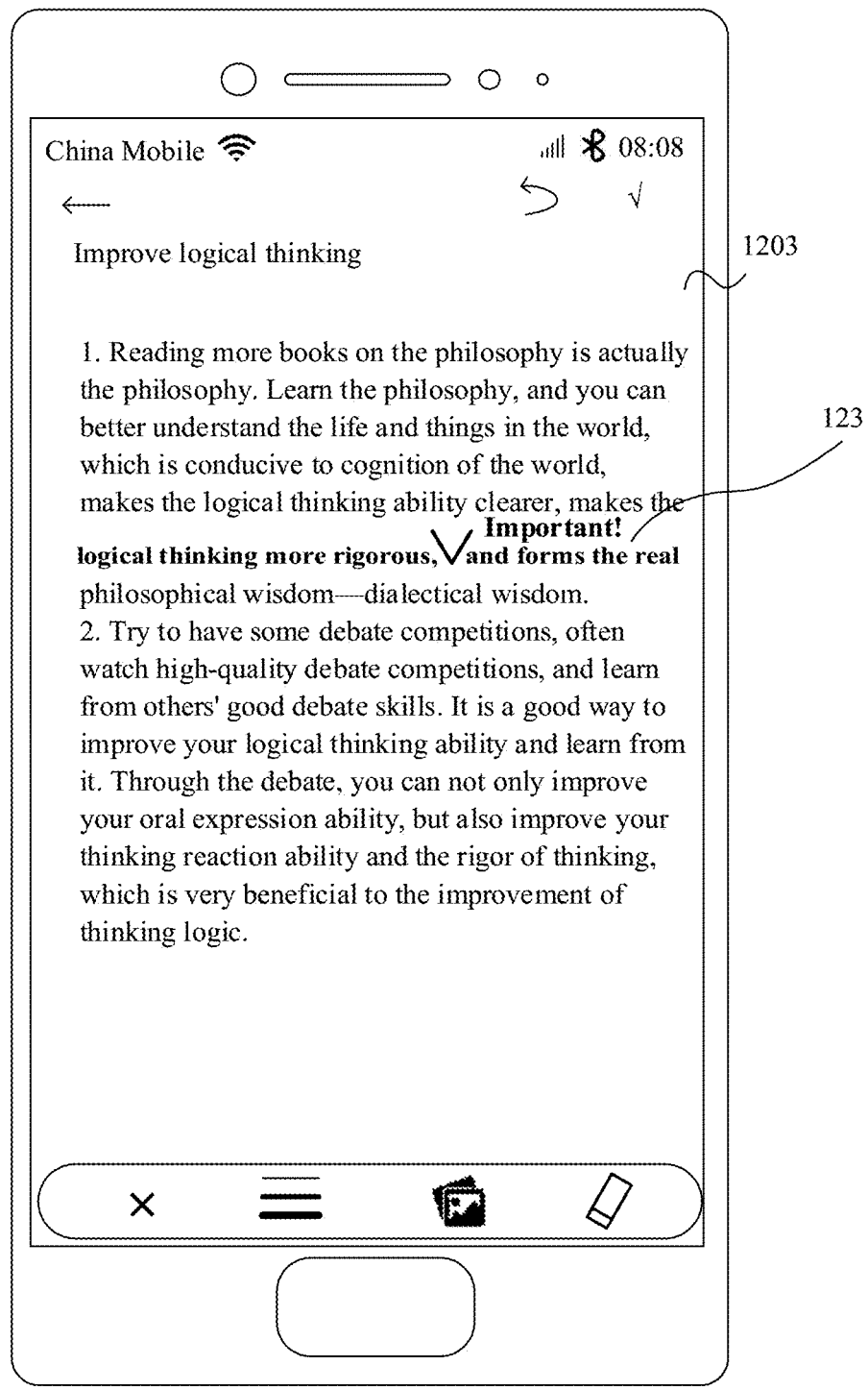
Figure 12D:
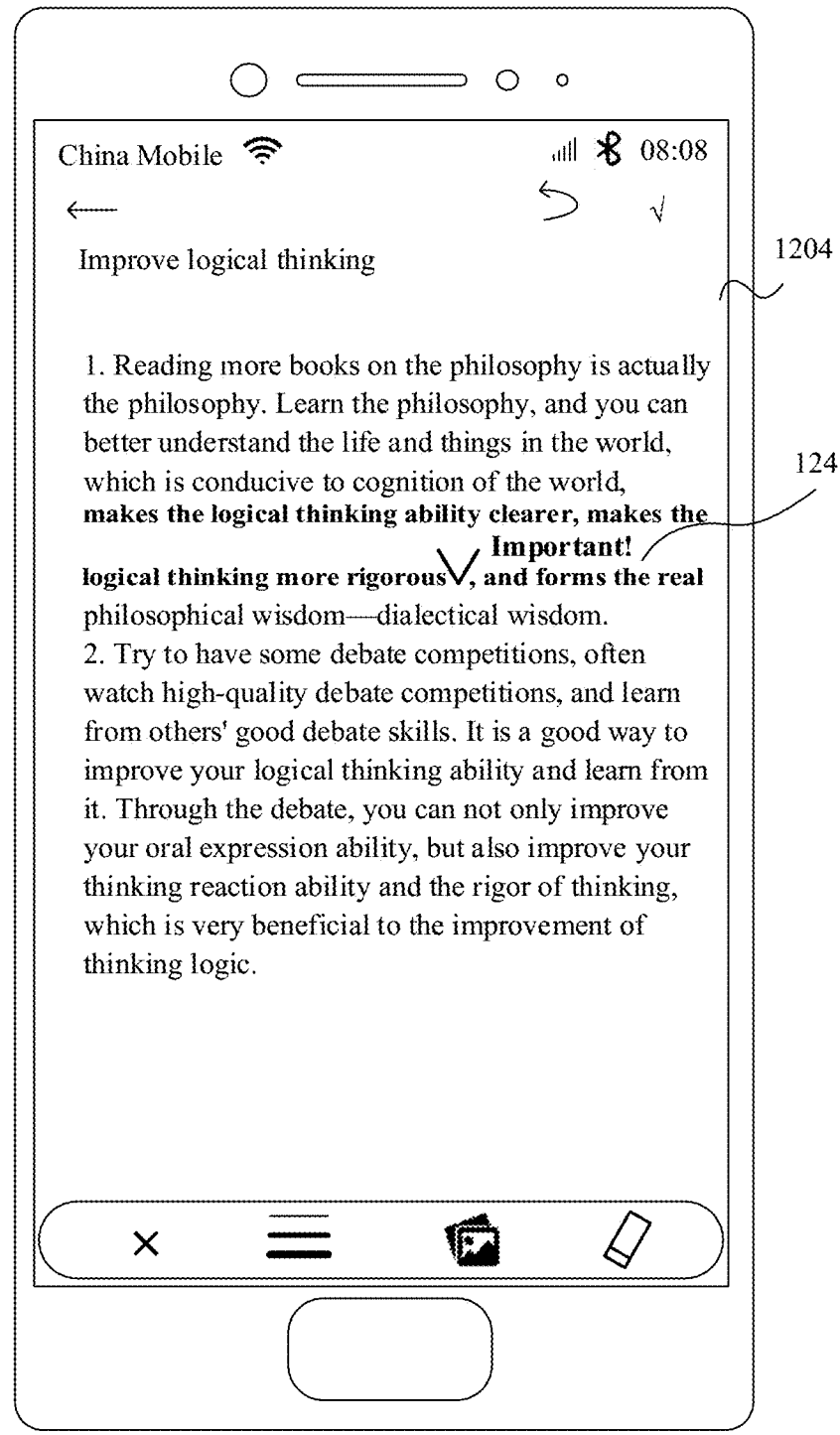

For example, as shown in FIG. 12(a), the mobile phone detects, in an interface 1201, a preset operation whose sliding track is a preset symbol without a direction, and displays a sliding track 121.

For example, the mobile phone determines, based on the sliding track 121, that to-be-compressed content is displayed content in a line in which words covered by the preset symbol are located, a compression manner is character width compression and/or character spacing compression, and a compression direction of content on a left side of the preset symbol is leftward and a compression direction of content on a right side of the preset symbol is rightward. After compressing the to-be-compressed content based on the preset operation, the mobile phone displays an interface

1202 shown in FIG. 12(*b*). The interface 1202 is the second interface and includes an annotation region 122.

For another example, the mobile phone determines, based on the sliding track 121, that to-be-compressed content is displayed content in a line in which words covered by the preset symbol are located, a compression manner is character height compression and/or line spacing compression, and a compression direction is downward. After compressing the to-be-compressed content based on the preset operation, the mobile phone displays an interface 1203 shown in FIG. 12(*c*). The interface 1203 is the second interface and includes an annotation region 123.

For another example, the mobile phone determines, based on the sliding track 121, that to-be-compressed content is displayed content in a line in which words covered by the preset symbol are located and a previous line, a compression manner is character height compression and/or line spacing compression, and a compression direction of the line in which the preset symbol is located is downward and a compression direction of displayed content in the previous line is upward. After compressing the to-be-compressed content based on the preset operation, the mobile phone displays an interface 1204 shown in FIG. 12(*d*). The interface 1204 is the second interface and includes an annotation region 124.

In an embodiment, if the preset symbol is a preset symbol with a direction, to-be-compressed content is displayed content in a direction indicated by the preset symbol with the direction; a compression direction is the direction indicated by the annotation symbol with the direction, that is, an annotation region obtained by the mobile phone after the mobile phone compresses the to-be-compressed content is located in the direction indicated by the preset symbol; and a compression manner is a compression manner corresponding to the direction indicated by the preset symbol with the direction.

For example, as shown in FIG. 13(*a*), the mobile phone detects, in an interface 1301, a preset operation whose sliding track is a preset symbol. It is assumed that a direction of the current preset symbol is rightward. The mobile phone determines that to-be-compressed content is displayed content on a right side of the preset symbol in a line in which words covered by the preset symbol are located or to-be-compressed content is displayed content in a line in which words covered by the preset symbol are located, a compression manner is character width compression and/or character spacing compression, and a compression direction is rightward. After compressing, based on the preset operation, the displayed content on the right side of the preset symbol in the line in which the words covered by the compression symbol are located, the mobile phone displays an interface 1302 shown in FIG. 13(*b*). The interface 1302 is the second interface, and includes an annotation region 132. Alternatively, as shown in FIG. 12(*a*), the mobile phone detects, in an interface 1201, a preset operation whose sliding track is a preset symbol. It is assumed that a direction of the current preset symbol is upward. The mobile phone determines that to-be-compressed content is displayed content in a line in which words covered by the preset symbol are located, a compression manner is character height compression and/or line spacing compression, and a compression direction is downward. After compressing the to-be-compressed content based on the preset operation, the mobile phone displays an interface 1303 shown in FIG. 13(*c*). The interface 1303 is the second interface and includes an annotation region 133.

In an embodiment, the foregoing compression manners corresponding to the sliding tracks of the different preset operations may further include character weight compression. An annotation region may be obtained in coordination with a font thickness change of to-be-compressed content through character weight compression.

In an embodiment, if the mobile phone detects a plurality of preset operations, and the plurality of preset operations correspond to a same annotation region, it indicates that the user expands or narrows a current annotation region by applying the plurality of preset operations, and the mobile phone may adjust the annotation region according to compression manners, compression directions, and compression ratios respectively corresponding to the plurality of preset operations.

For example, after detecting a preset operation whose sliding track is a preset symbol, the mobile phone determines that displayed content in a line in which the preset symbol is located is to-be-compressed content, a compression manner is character height compression and/or line spacing compression, and a compression direction is downward. After compressing the to-be-compressed content, the mobile phone displays an annotation region above the to-be-compressed content. Then, the mobile phone further detects a preset operation that is at displayed content above the annotation region and whose sliding track is a long oblique line segment, and the long oblique line segment is upward inclined. In this case, the mobile phone upward compresses the displayed content that is covered by the long oblique line segment and that is above the annotation region. Then, the mobile phone displays an expanded annotation region.

S503: The mobile phone receives, in the second interface, the annotation content entered by the user, displays the annotation content in the annotation region, and adjusts a size of the annotation region based on the annotation content.

In an embodiment, the mobile phone displays the second interface, and detects, in the second interface, annotation content entered by the user by using a stylus, a finger, or a keyboard. The mobile phone may detect annotation content entered by the user in the second interface, or detect annotation content entered by the user in the annotation region. Then, the mobile phone displays the received annotation content in the annotation region in the second interface.

For example, an interface 603 shown in FIG. 6(*c*) is the second interface that is displayed by the mobile phone after the mobile phone compresses the to-be-compressed content based on the preset operation. After detecting, in the interface 603, the annotation content entered by the user, the mobile phone displays an interface 605 shown in FIG. 6(*e*). The interface 605 displays an annotation region 62, and the annotation region 62 displays annotation content 63.

However, it is possible that an area of the annotation region obtained by the mobile phone based on the preset operation cannot meet an area requirement of the annotation content, for example, is less than or exceeds the area requirement of the annotation content. In this case, the size of the annotation region may be adjusted based on a word quantity and/or a font size of the annotation content, for example, the annotation region is expanded or narrowed, so that the annotation region meets the area requirement of the annotation content. The operation of expanding or narrowing the annotation region may be an automatic operation performed by the mobile phone based on the annotation content, or may be an operation performed in response to an operation performed by the user.

Figure 6E:
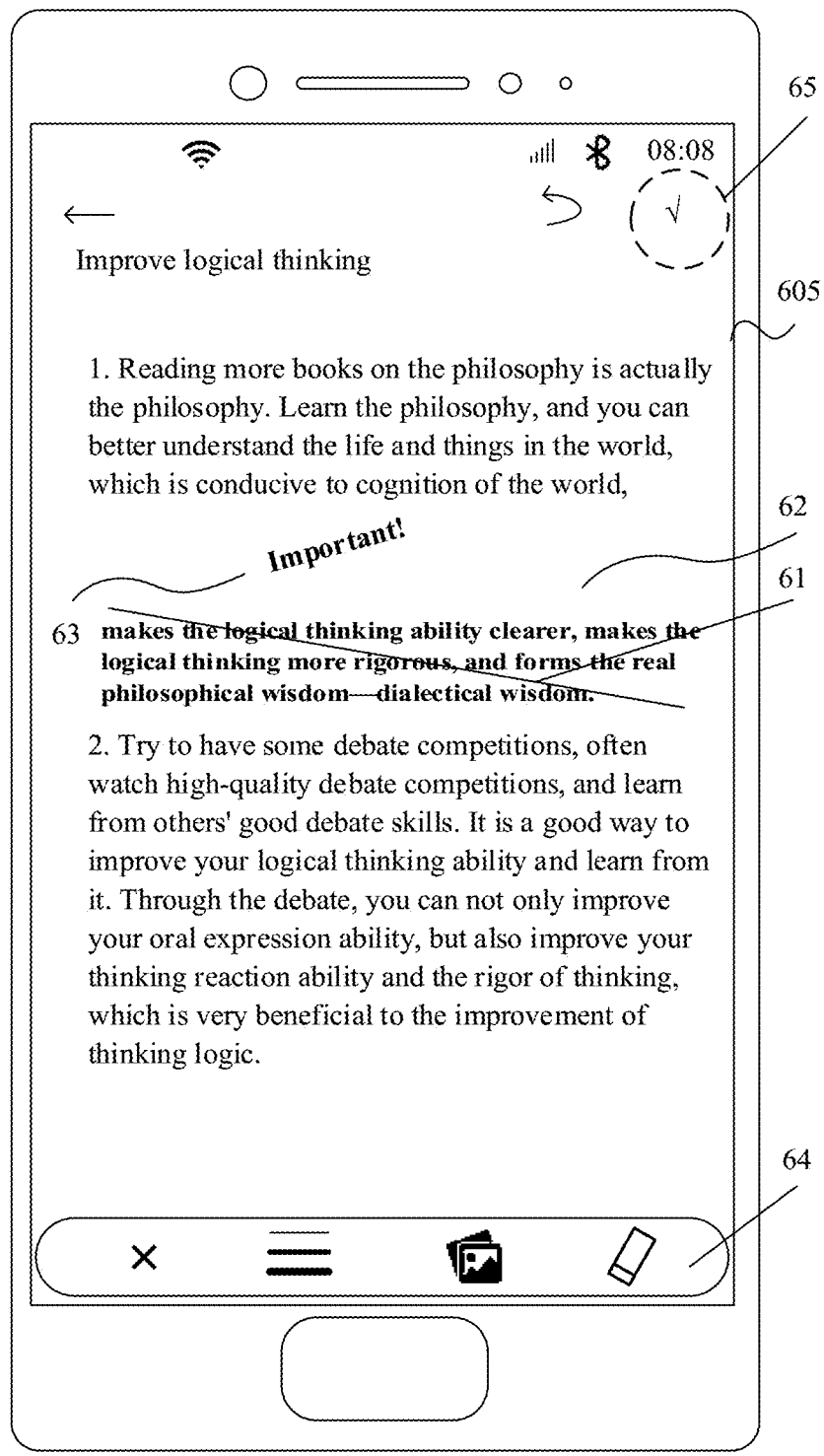
Figure 6F:
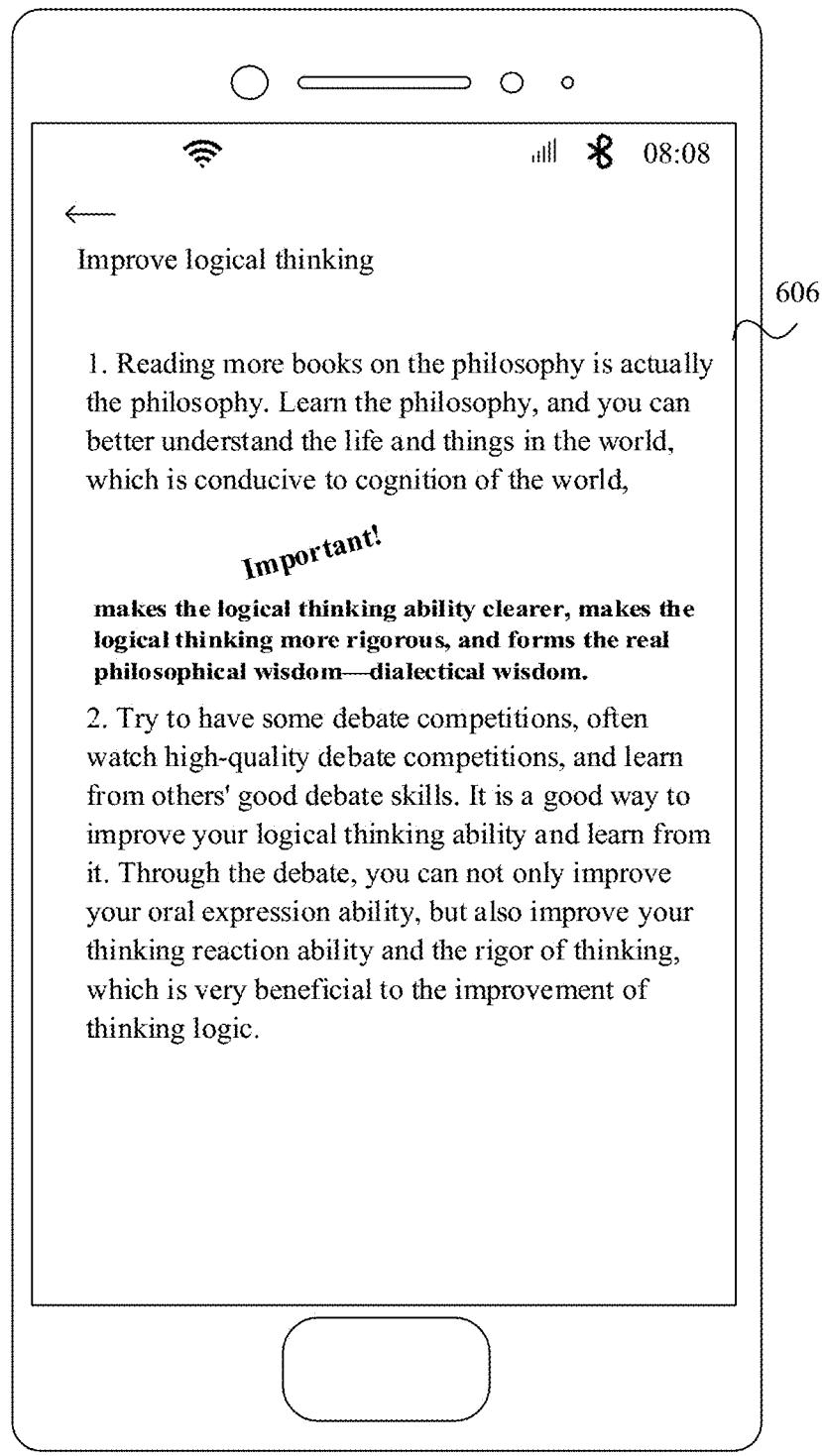
Figure 8A:
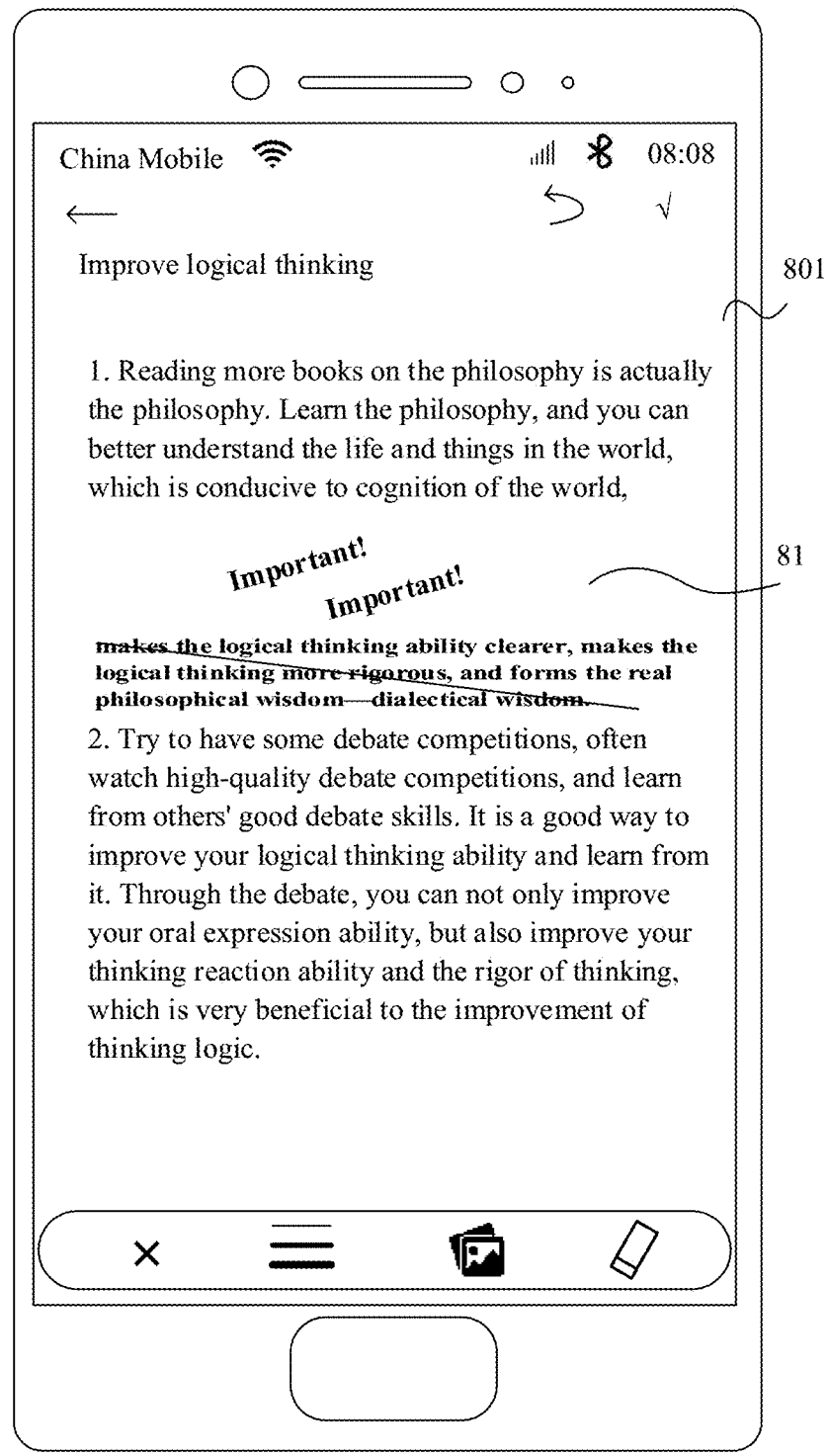
FIG. 8(a) and FIG. 8(b) are a schematic diagram 4 of an interface of an electronic device according to an embodiment of this application.

For example, annotation content 63, for example, "Important!", is displayed in an annotation region 62 in an interface 605 shown in FIG. 6(e). If the mobile phone subsequently detects more annotation content that needs to be displayed in the annotation region 62, or a font size of currently received annotation content exceeds a display upper limit of the annotation region 62, the annotation region 62 needs to be expanded. An interface 801 shown in FIG. 8(a) is an interface displayed by the mobile phone after the mobile phone detects that annotation content increases, and includes an expanded annotation region 81. If the mobile phone detects that the annotation content increases and a display upper limit of the current annotation region is exceeded, the mobile phone continues to automatically compress to-be-compressed content, for example, downward compress the to-be-compressed content downward, to expand an annotation region 81, thereby adding more annotation content. A compression upper limit of the to-be-compressed content may be preconfigured in the mobile phone, and the to-be-compressed content is not compressed anymore after reaching the compression upper limit. The compression upper limit includes one or several of the following content: a minimum character height, a minimum character width, a minimum character weight, a minimum character spacing, and a minimum line spacing. A compression upper threshold may be determined based on an empirical value, or may be determined based on a size of a display interface. This is not limited in an embodiment of the application.

In an embodiment, if the to-be-compressed content has been compressed to the compression upper limit and therefore the annotation region cannot continue to be expanded, the mobile phone may prompt the user, by using a prompt message or the like, that currently further entered annotation content is invalid content and cannot be displayed. The mobile phone may alternatively advise the user to create a new annotation region by performing a preset operation again, to display annotation content that cannot be displayed.

In an embodiment, if the mobile phone detects a repeated preset operation, the mobile phone repeatedly compresses the to-be-compressed content based on the preset operation, to expand the annotation region; and does not compress the to-be-compressed content anymore after the compression upper limit is reached.

Figure 8B:
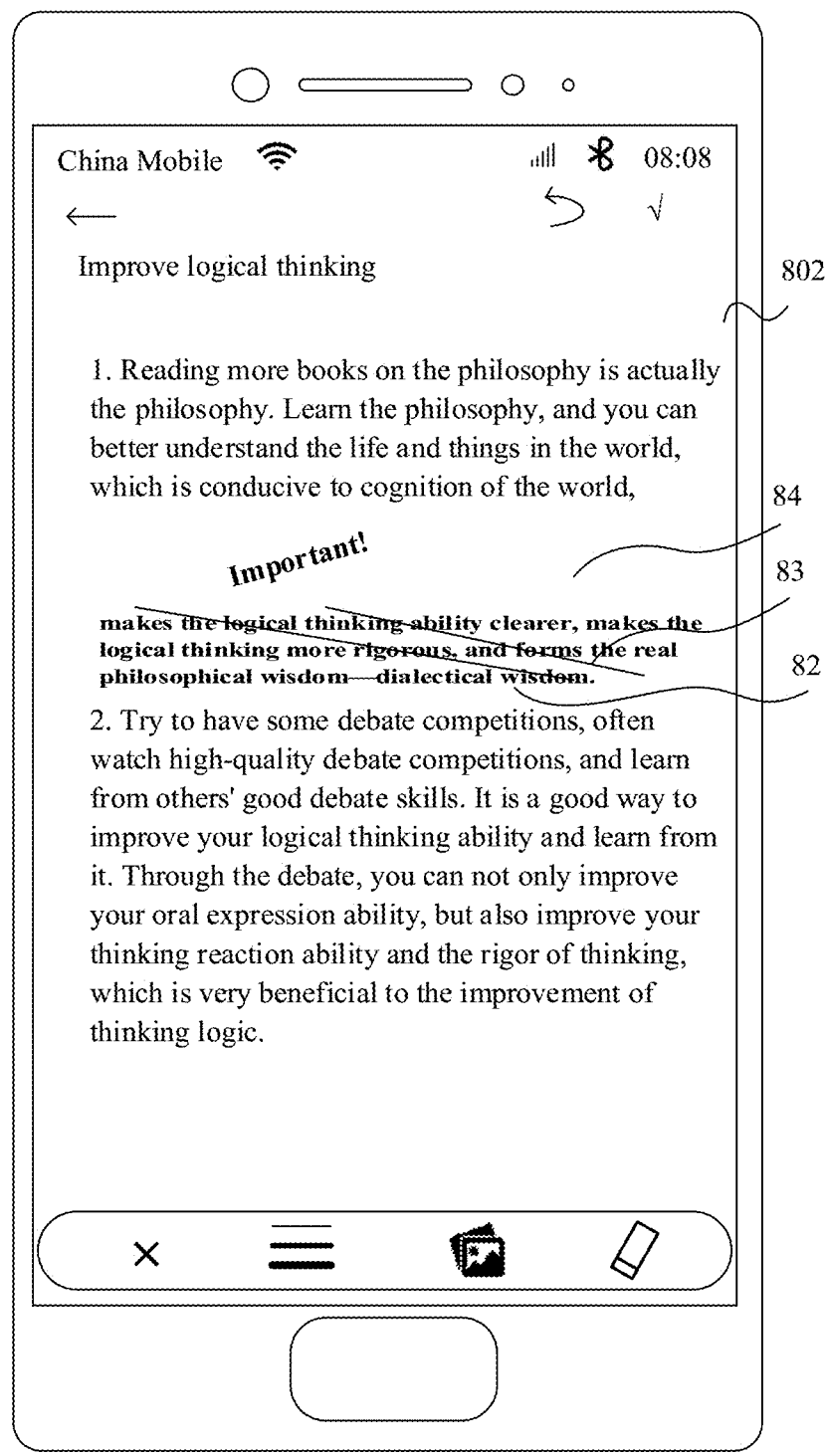

For example, if the user considers that an annotation region 62 in an interface 605 shown in FIG. 6(e) cannot meet an annotation requirement, the user may repeatedly perform the preset operation, to expand the annotation region. The mobile phone detects, in an interface 802 shown in FIG. 8(b), a preset operation repeatedly entered by the user. For example, a sliding track of an initially detected preset operation is a sliding track 82, a sliding track 83 is detected after a period of time, and both a preset operation corresponding to the sliding track 83 and a preset operation corresponding to the sliding track 82 are sliding operations of downward-inclined long oblique line segments. In this case, on the basis of the interface 605 shown in FIG. 6(e), the mobile phone continues to downward compress the to-be-compressed content to obtain an annotation region 84 greater than the annotation region 62, and does not compress the to-be-compressed content anymore after the compression upper limit is reached, thereby adding more annotation content.

In an embodiment, the mobile phone does not receive, in a first time period after receiving and displaying the annotation content, more annotation content that needs to be displayed in the current annotation region, that is, does not update the annotation content displayed in the annotation region. In addition, a corresponding blank region part further exists in the current annotation region, and an area of the blank region is greater than a first threshold. In this case, the mobile phone may narrow the current annotation region. The first threshold may be a preconfigured empirical value.

For example, in an interface 605 shown in FIG. 6(e), if the mobile phone does not receive, after the preset time period, annotation content that needs to be displayed in an annotation region 62, and a blank region exists below annotation content 63 in the current annotation region 62, the mobile phone may upward expand compressed to-be-compressed content, that is, increase a character height and/or a character spacing of the compressed to-be-compressed content, until the compressed to-be-compressed content matches the annotation content, thereby optimizing a page display layout.

In an embodiment, if the mobile phone detects that original annotation content increases or decreases because the saved annotation content is modified, the mobile phone correspondingly expands or narrows an original annotation region, to obtain an annotation region that matches current annotation content. Therefore, interface display is optimized, to further improve user experience.

In an embodiment, if the to-be-compressed content has been compressed to the compression upper limit, but the mobile phone still detects, in the second interface, annotation content that needs to be displayed in the current display region, the mobile phone may compress displayed content near the annotation region to expand the annotation region, to display more received annotation content.

In an embodiment, if the sliding track of the preset operation is an oblique line segment, after to-be-compressed content reaches a compression upper limit, the mobile phone may compress uncompressed displayed content in a preset region near the annotation region as the annotation content in the annotation region increases, until the displayed content in the near preset region is also compressed to the compression upper limit.

Figure 9C:
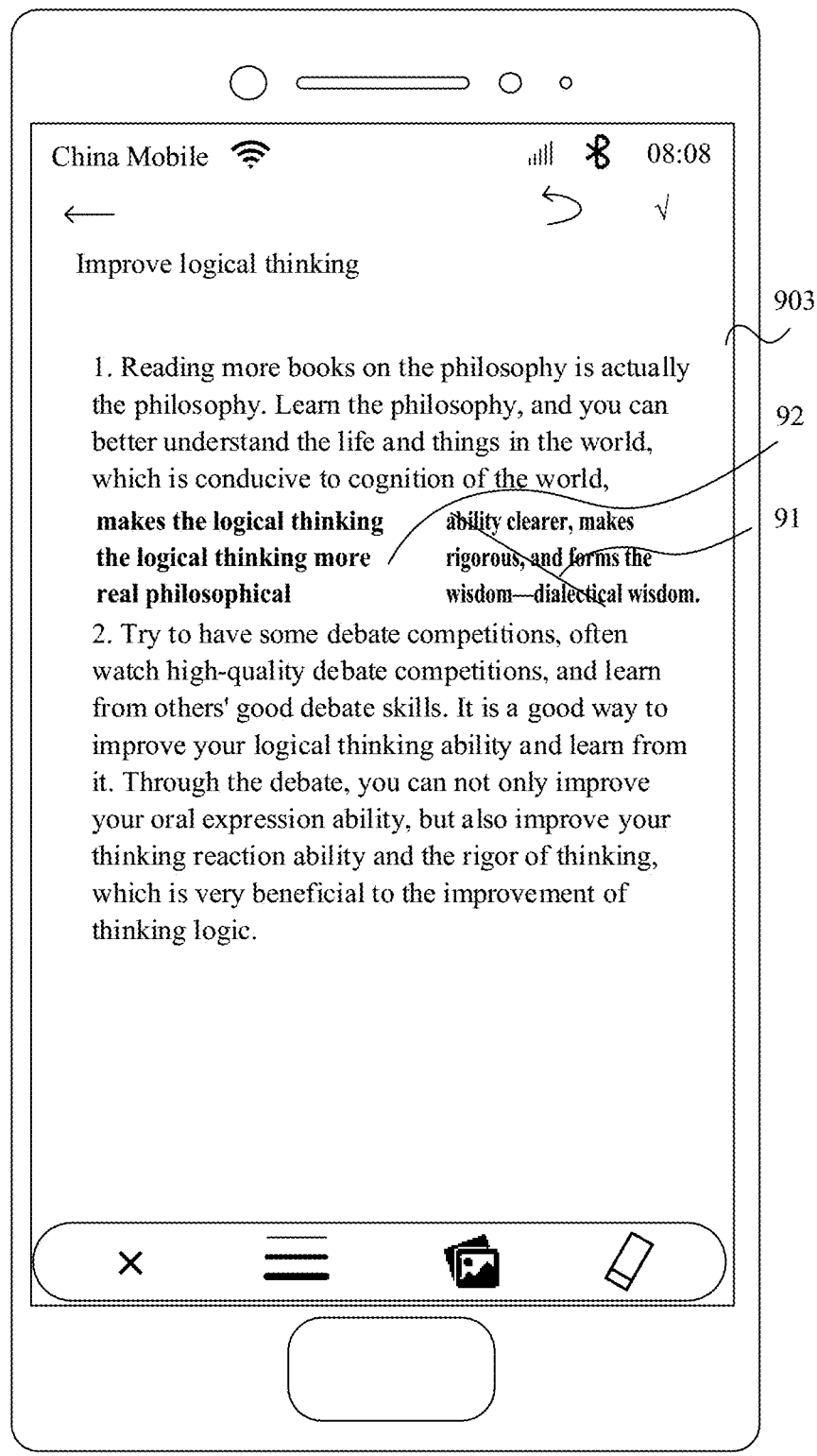
Figure 9D:
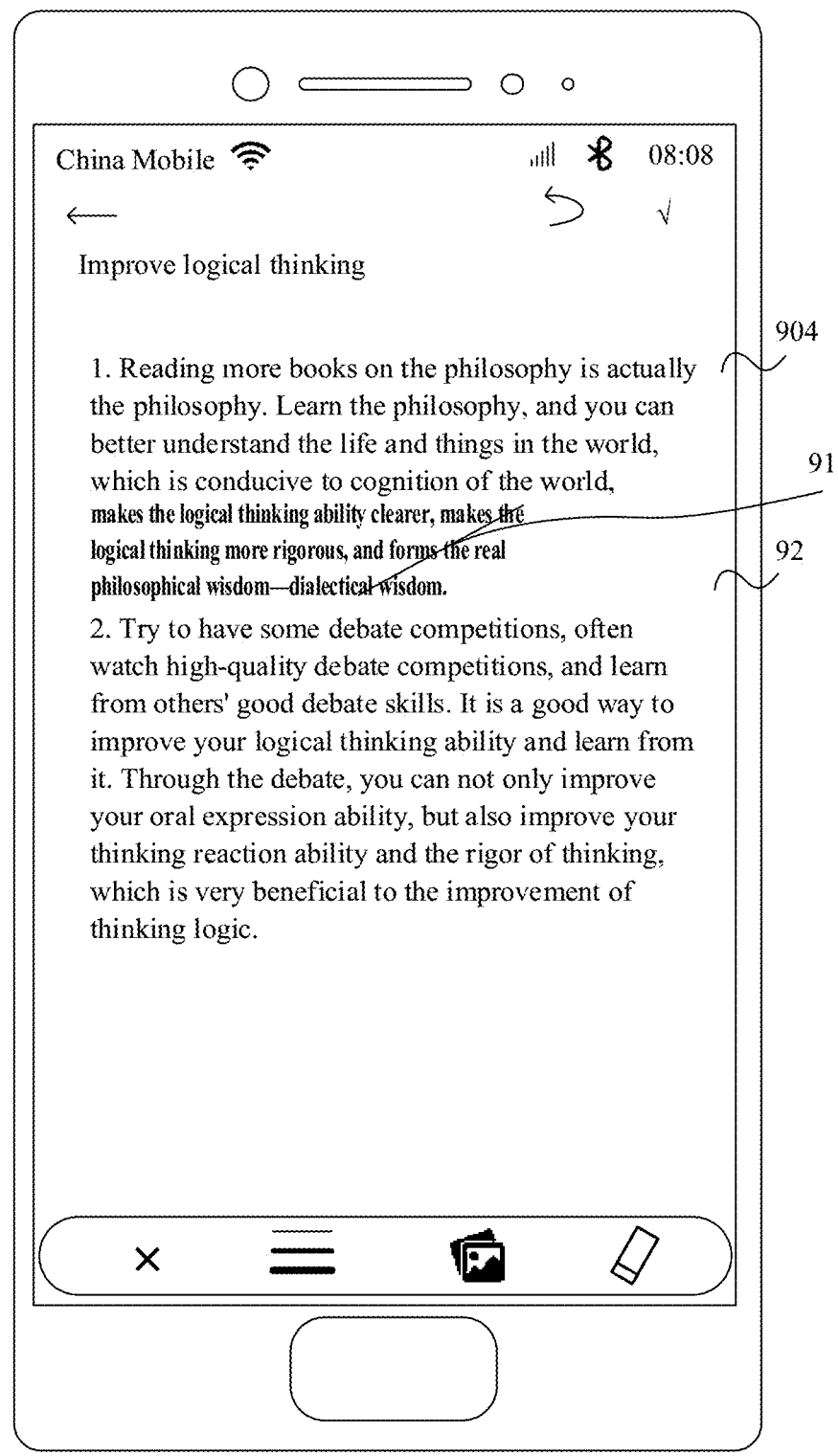
Figure 9E:
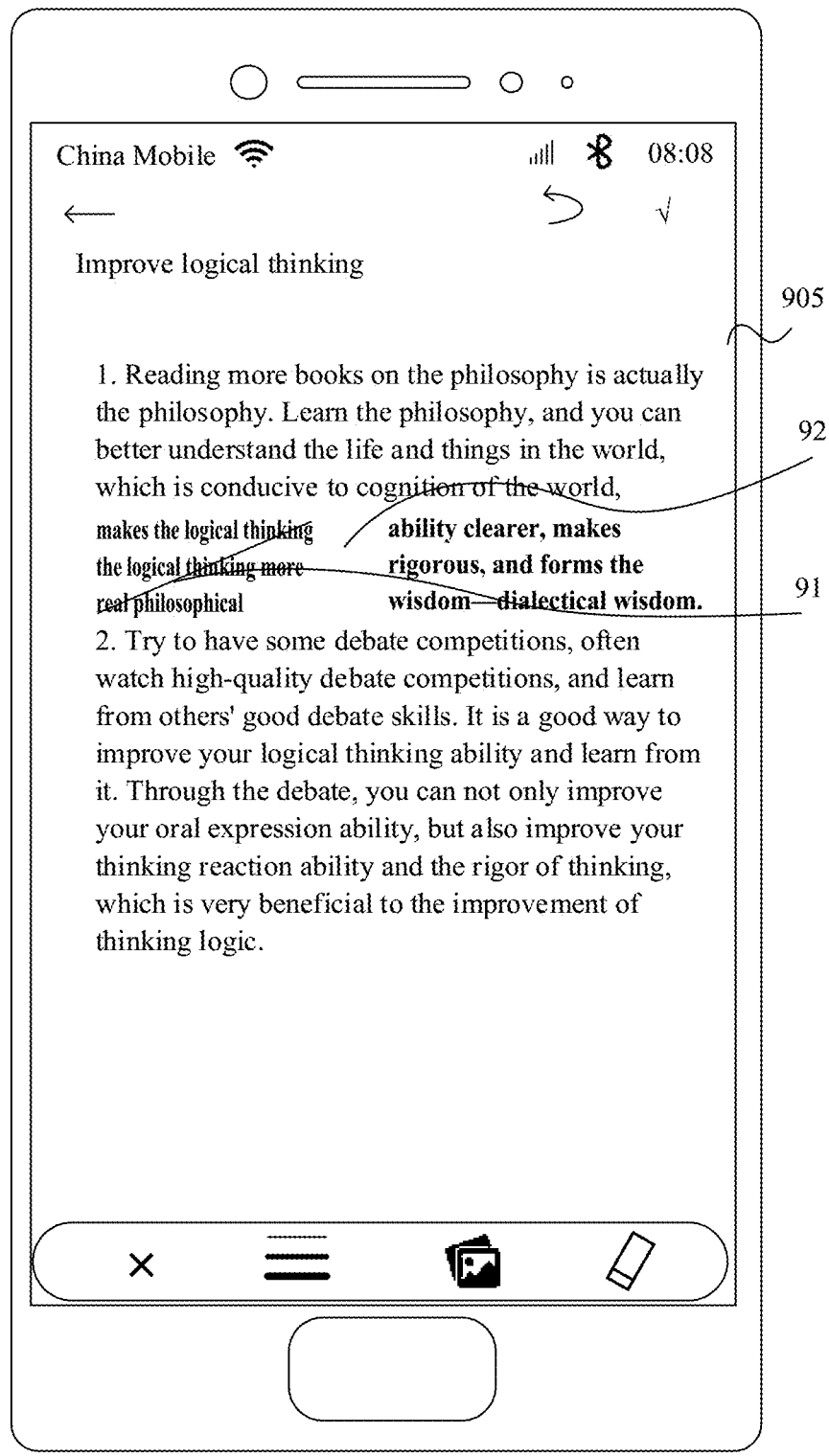
Figure 9F:
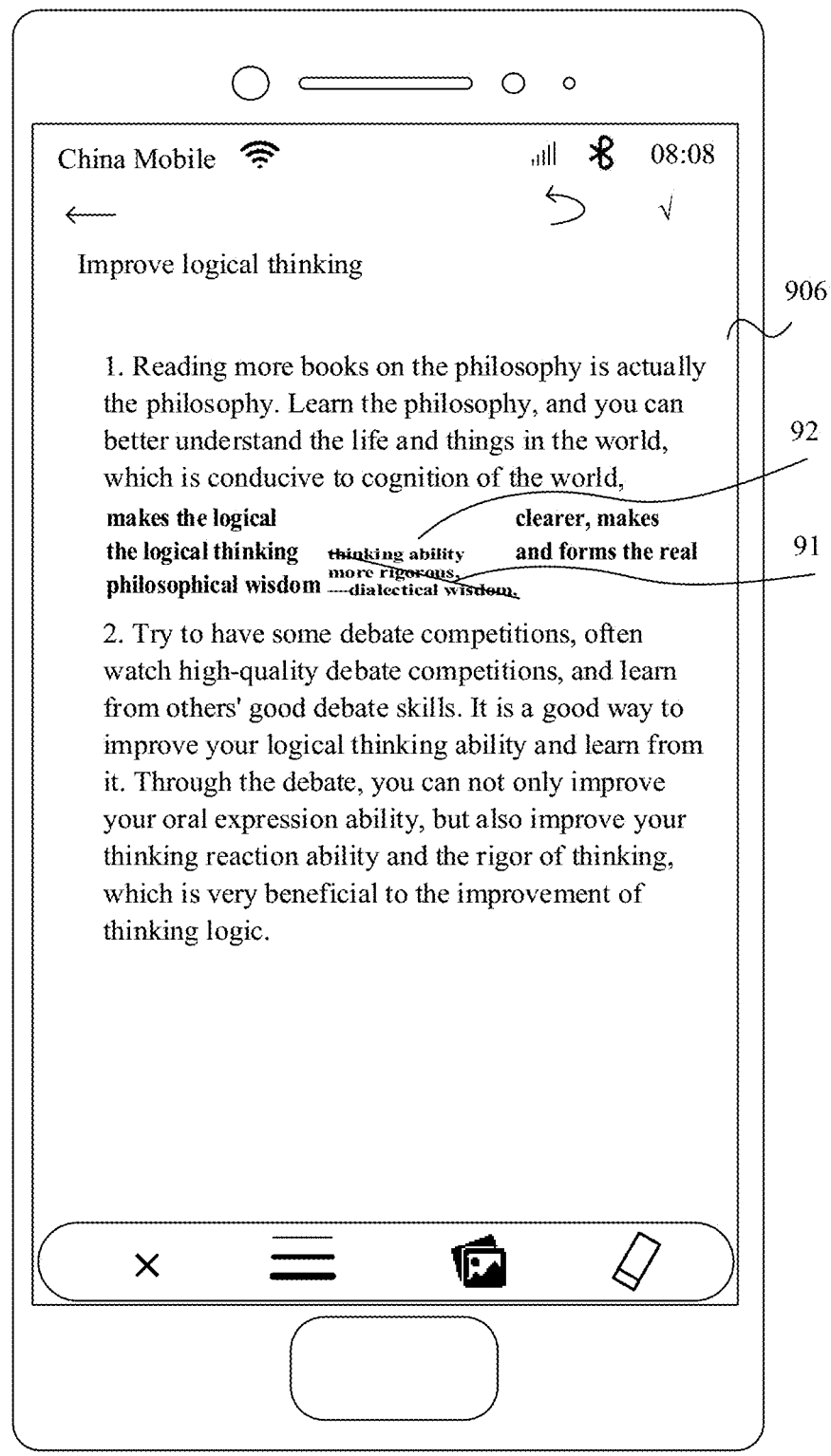

For example, in an interface 903 shown in FIG. 9(c), if to-be-compressed words on a right side of an annotation region 92 have reached a compression upper limit as annotation content increases, but the mobile phone still detects, in the interface 903, annotation content entered by the user, the mobile phone may compress displayed content on a left side of the annotation region 92, to expand the annotation region 92; and stop compression until the displayed content on the left side also reaches the compression upper limit.

In an embodiment, if the sliding track of the preset operation is a closed region operation, after to-be-compressed content is compressed to a compression upper limit, a part of the to-be-compressed content is displayed in a new line, to expand the annotation region. That is, one line of displayed content below the annotation region is compressed to obtain a first region. The first region is used to display a first part of the to-be-compressed content. The first region is located above the line of displayed content below the annotation region. That is, a character height and/or a line spacing of the line of displayed content below the annotation region is compressed, to obtain the first region. Alternatively, the first region is located on a left side of the line of displayed content below the annotation region. That is, a character width and/or a character spacing of the line of displayed content below the annotation region is compressed, to obtain the first region. The first part of the content is partial to-be-compressed content that cannot be displayed in the to-be-compressed content display region after the mobile phone expands the annotation region based on the annotation content.

Figure 11B:
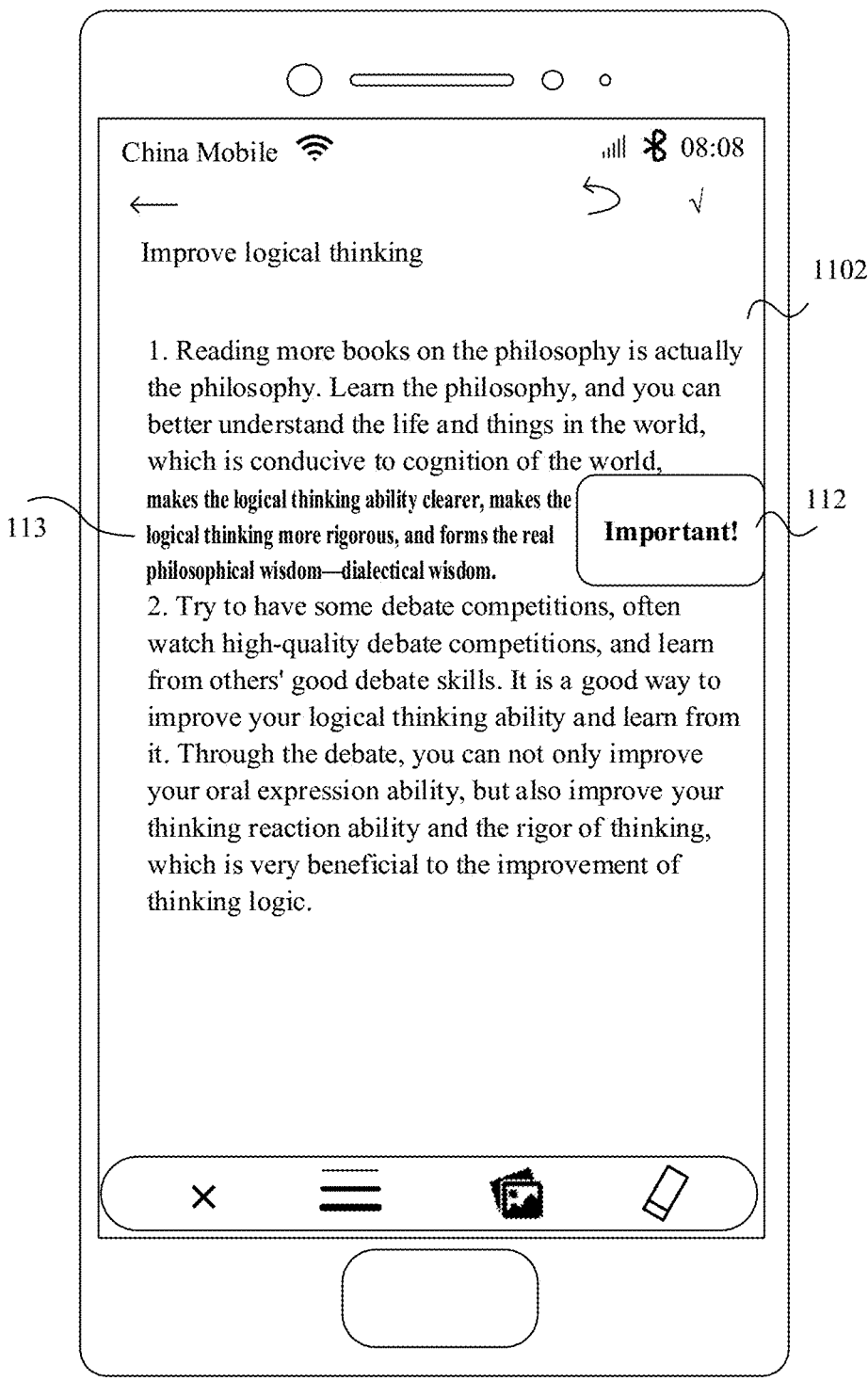

For example, it is assumed that no blank region for displaying annotation content exists in an annotation region 112 in an interface 1102 shown in FIG. 11(b), and to-be-compressed content 113 has been compressed to a compression upper limit and therefore cannot continue to be compressed. In this case, the mobile phone detects annotation content entered by the user in the interface 1102. The mobile phone may expand the annotation region 112 in the following two implementations.

Figure 11C:
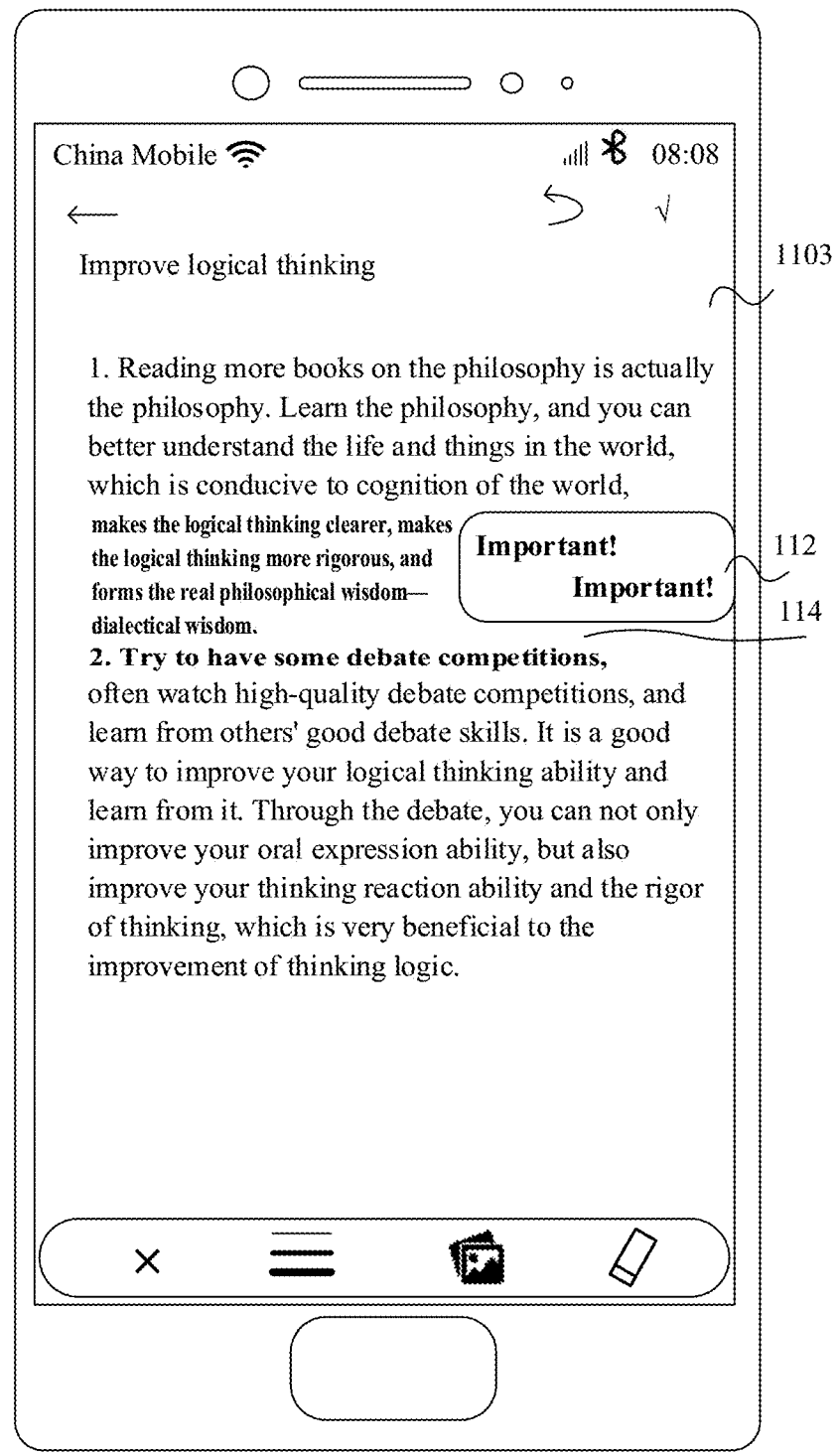

For example, in an interface 1103 shown in FIG. 11(c), the mobile phone downward compresses one line of displayed content below an annotation region 112, that is, reduces a character height and/or a line spacing of the line, to obtain some blank regions 114 above the line. Then, the mobile phone displays, in the blank region 114, a part of words in to-be-compressed content on a left side of the annotation region 112, to obtain more blank regions used to horizontally expand the annotation region 112. In addition, integrity of displayed content in the interface 1103 can be ensured.

Figure 11D:
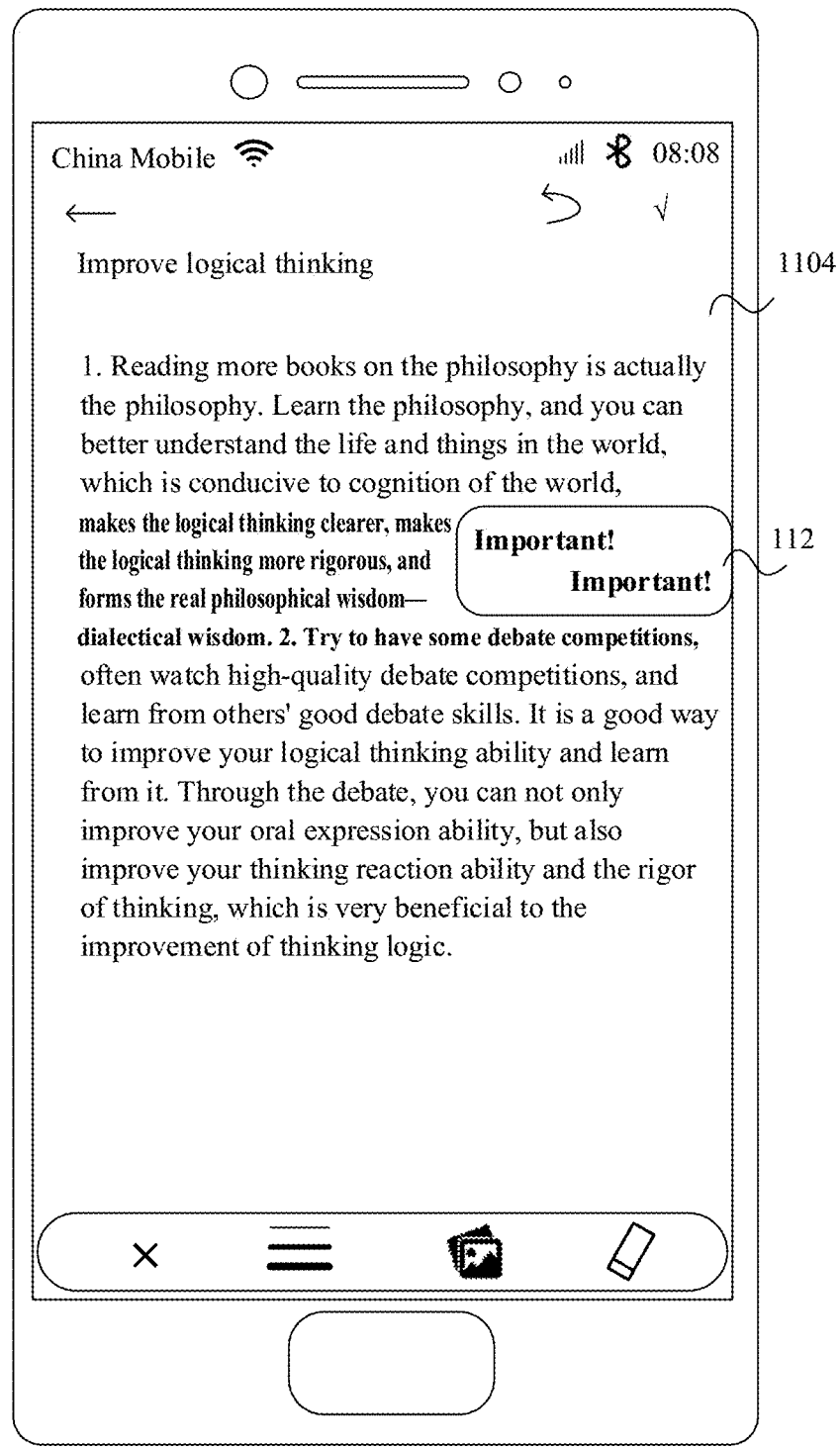

For another example, in an interface 1104 shown in FIG. 11(d), the mobile phone rightward compresses one line of displayed content below an annotation region 112, that is, reduces a character width and/or a character spacing of the line, to obtain some blank regions on a left side of the line. Then, the mobile phone displays, in the obtained blank regions, a part of words in to-be-compressed content on a left side of the annotation region 112, to obtain more blank regions used to horizontally expand the annotation region 112. In addition, integrity of displayed content in the interface 1104 can be ensured.

In an embodiment, if the sliding track of the preset operation is a preset symbol, after to-be-compressed content corresponding to the preset symbol is compressed to a compression upper limit, the mobile phone compresses uncompressed displayed content in a line in which the preset symbol is located. Alternatively, the mobile phone displays the to-be-compressed content in a new line, to expand the annotation region. Alternatively, if the current preset symbol is a preset symbol with a direction, displayed content in a neighboring line of the to-be-compressed content is compressed, to expand the annotation region. For example, if the direction is upward or downward, displayed content in M lines above the to-be-compressed content or N lines below the to-be-compressed content is compressed, to expand the annotation region. M and N are positive integers.

Figure 13A:
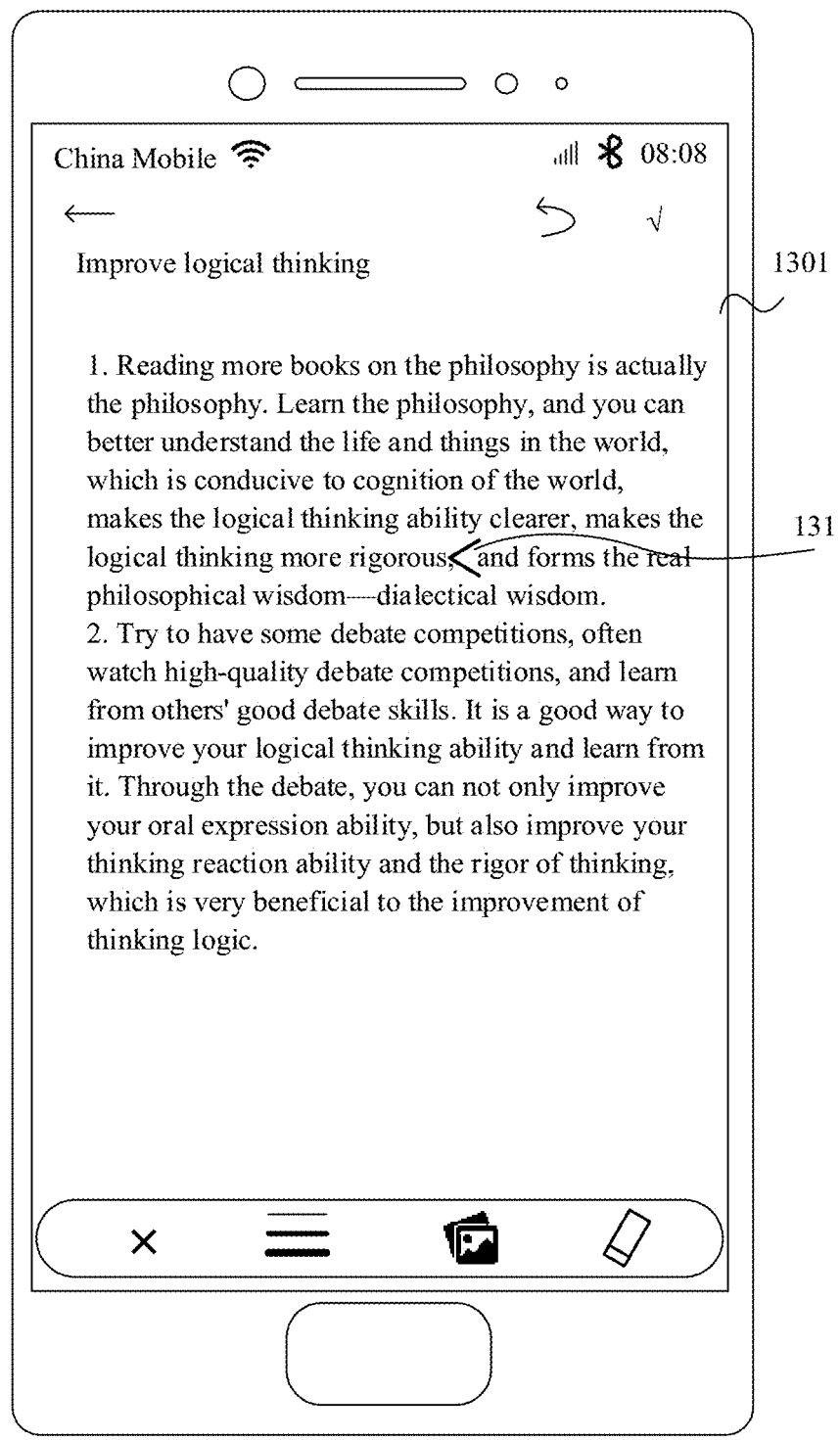
FIG. 13(a) to FIG. 13(d) are a schematic diagram 9 of an interface of an electronic device according to an embodiment of this application.
Figure 13B:
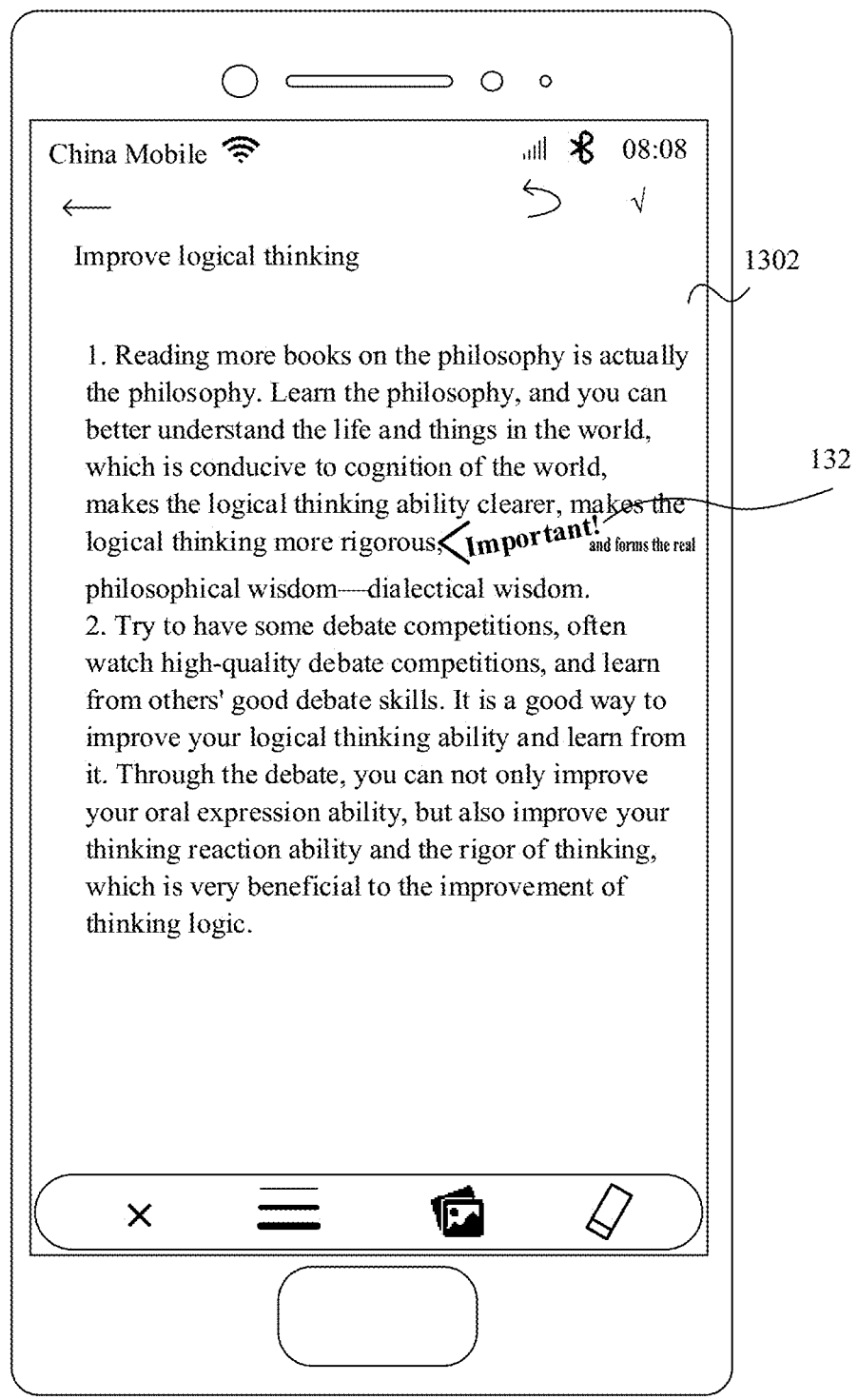

For example, in an interface 1302 shown in FIG. 13(b), a direction of a preset symbol is rightward. If to-be-compressed content on a right side has reached a compression upper limit as annotation content increases, the mobile phone may compress displayed content on a left side of the preset symbol, to expand an annotation region 132.

For another example, in an interface 1302 shown in FIG. 13(b), a direction of a preset symbol is rightward. If to-be-compressed content on a right side has reached a compression upper limit as annotation content increases, the mobile phone may compress one line of displayed content below the preset symbol, to obtain a blank region above or on a left side of the line of displayed content below the preset symbol, and display a part of the to-be-compressed content in the obtained blank region, to expand an annotation region 132.

Figure 13C:
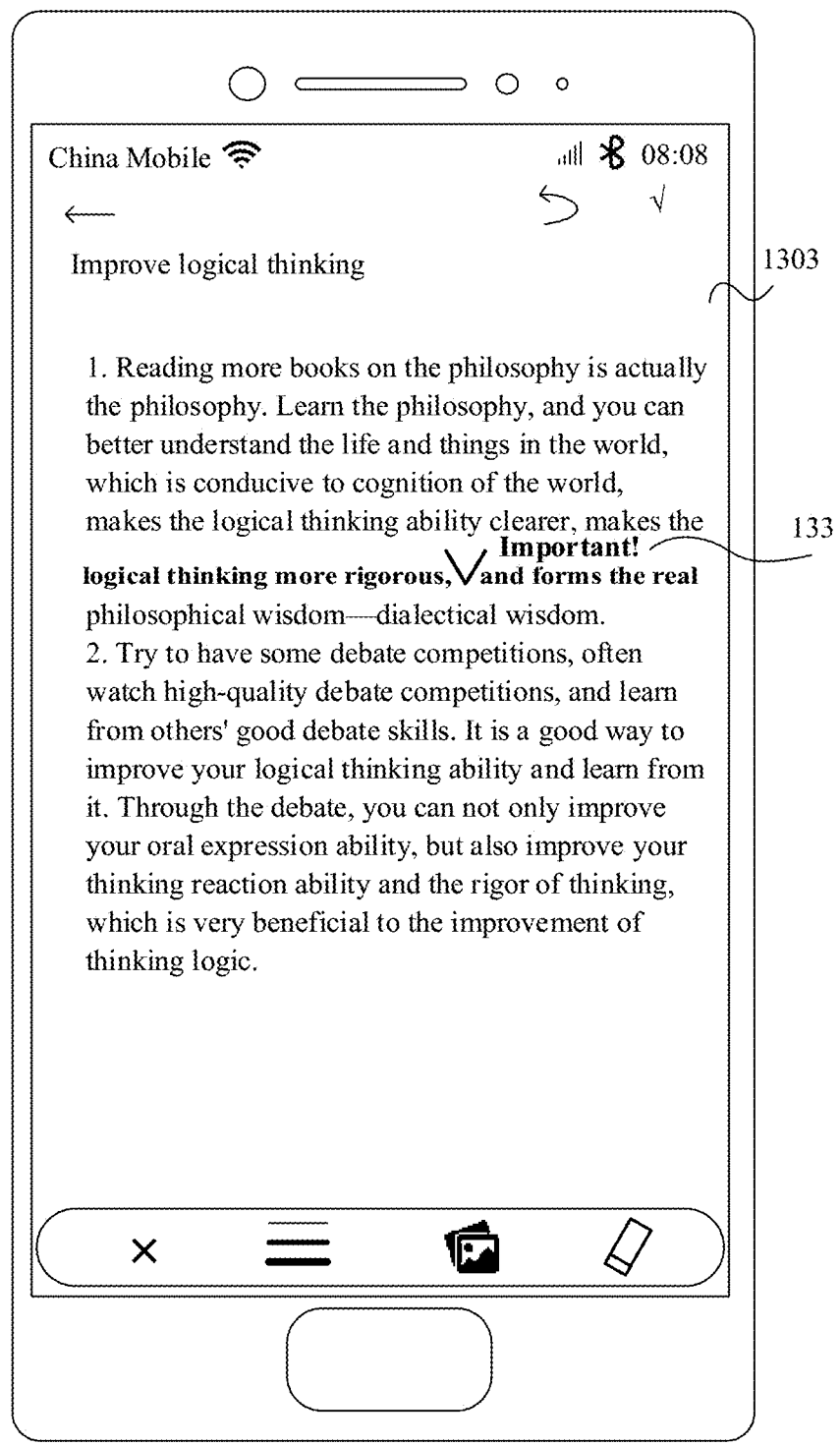
Figure 13D:
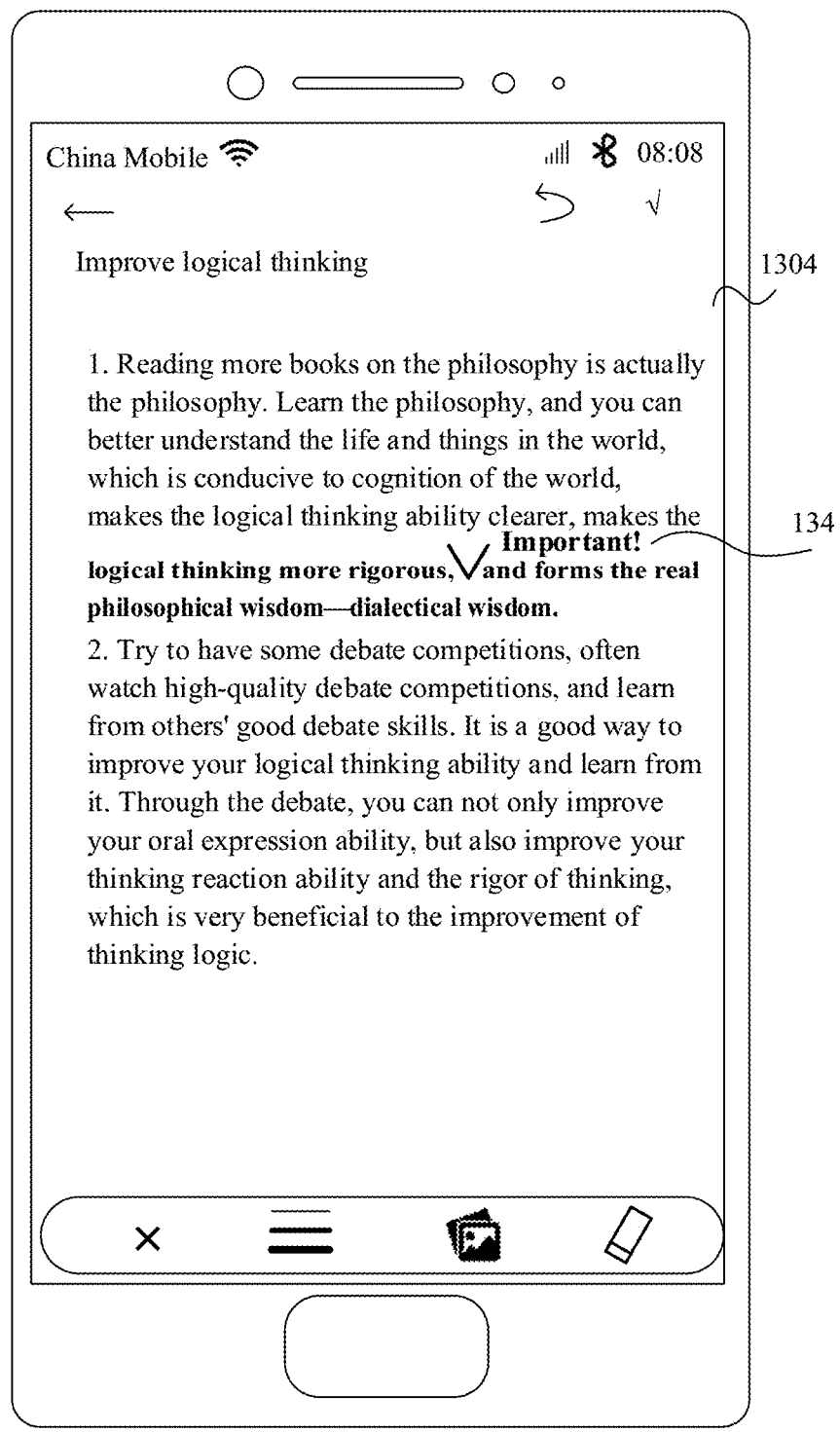

For another example, in an interface 1303 shown in FIG. 13(c), if a direction of a preset symbol is upward, the mobile phone obtains an annotation region 133 after compressing to-be-compressed content. The to-be-compressed content is compressed to a compression upper limit as annotation content in the annotation region 133 increases. In this case, if the mobile phone detects annotation content entered by the user in the interface 1303, the mobile phone determines, based on an operation direction of the preset symbol, that one line of displayed content below the to-be-compressed content needs to be compressed, and displays an interface 1304 shown in FIG. 13(d) after compressing the line of displayed content. The interface 1304 includes an annotation region 134 greater than the annotation region 133. As the annotation content persistently increases, displayed content that is in lines, that is below the to-be-compressed content, and that needs to be compressed may continue to be determined line by line, to persistently expand the annotation region.

In an embodiment, in response to an erase operation, the mobile phone does not display the annotation content and/or the sliding track of the preset operation. In an embodiment, if to-be-compressed content is covered because the mobile phone displays the sliding track of the preset operation, affecting the user in viewing the to-be-compressed content, the user may delete or hide the sliding track of the current preset operation by using an eraser option in a toolbar 64 in an interface 605 shown in FIG. 6(e). Alternatively, if the user does not want to retain the annotation content in the current annotation region, the user may also delete or hide the current annotation content by using the eraser option in the toolbar 64. Alternatively, the user deletes or hides the sliding track of the current preset operation and the annotation content by using the eraser option in the toolbar 64.

For example, after detecting, in the interface 605 shown in FIG. 6(e), that the user taps the eraser option in the toolbar 64, the mobile phone may detect the sliding track of the user in the interface 605, to determine content that needs to be erased. For example, a part of the annotation content, all the annotation content, or the sliding track of the preset operation is erased. Alternatively, after detecting an operation that the user erases all the annotation content, the mobile phone may simultaneously delete the sliding track. Alternatively, after detecting an operation that the user erases the sliding track, the mobile phone may simultaneously delete or hide the annotation content.

In an embodiment, if a stylus is attached onto the mobile phone, the mobile phone may detect a key sent after the user operates a button on the stylus, to determine to perform an erase operation.

In an embodiment, after completing annotation, the user may save current annotation content. If the mobile phone detects, in the interface 605 shown in FIG. 6(e), that the user taps an icon 65, it indicates that this time of annotation is completed. In response to the operation of operating the icon 65, the mobile phone displays an interface 606 shown in FIG. 6(f). The interface 606 includes the annotation content added by the user.

In an embodiment, if the mobile phone receives no annotation content in a second time period and/or detects a first operation, the mobile phone switches from the second interface to the first interface.

The second time period is a preconfigured time length, and the second time period may be configured based on an empirical value or a user habit, or the second time period is customized by the user. The first operation may include, for example, an interaction operation with the user other than an annotation operation. For example, a first operation that the user slides the display to view other content is detected, or a first operation that the user turns a page is detected.

In an embodiment, if the mobile phone displays the annotation region due to a misoperation of the user, the user currently has no annotation requirement. Alternatively, an action position of the preset operation of the user is wrong, and consequently the annotation region is a non-ideal annotation region. Alternatively, after performing the preset operation, the user has no annotation requirement. In this case, the mobile phone may receive no annotation content in the second time period and/or detect the first operation. Therefore, the mobile phone determines that the annotation region needs to be deleted, and automatically recovers compressed to-be-compressed content to an initial state, that is, displays a display interface that exists before the current preset operation is obtained, to ensure normal display of the mobile phone.

Therefore, it can be learned that, according to the annotation method provided in this application, a font format and/or a paragraph format of at least a part of the content in the document file is adjusted, to obtain more blank regions for annotation, so that annotation content can be prevented from covering the original text content of the document file. In addition, in this application, the size of the annotation region may be adaptively adjusted based on a requirement of the annotation content, so that the user is freer to perform annotation, thereby improving reading experience of the user.

In addition, in this application, because the font format and/or the paragraph format of at least the part of the content in the document file are/is adjusted to implement a larger annotation region, displayed content of the document file on a current page is not reduced, so that no inconvenience is caused for the user in reading the original document file although the annotation content is added.

Figure 14A:
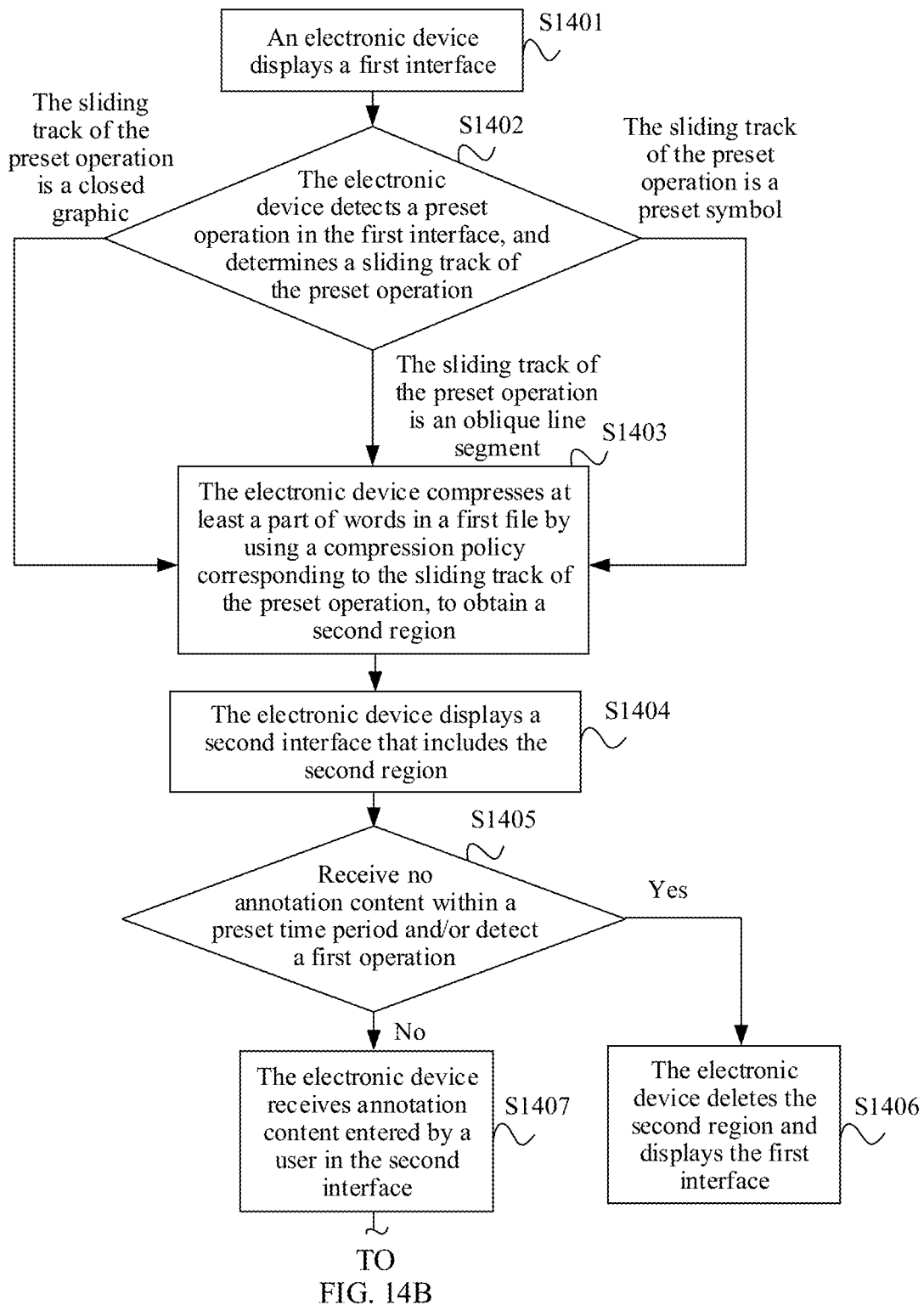
FIG. 14A and FIG. 14B are a schematic flowchart 2 of an annotation method according to an embodiment of this application.
Figure 14B:
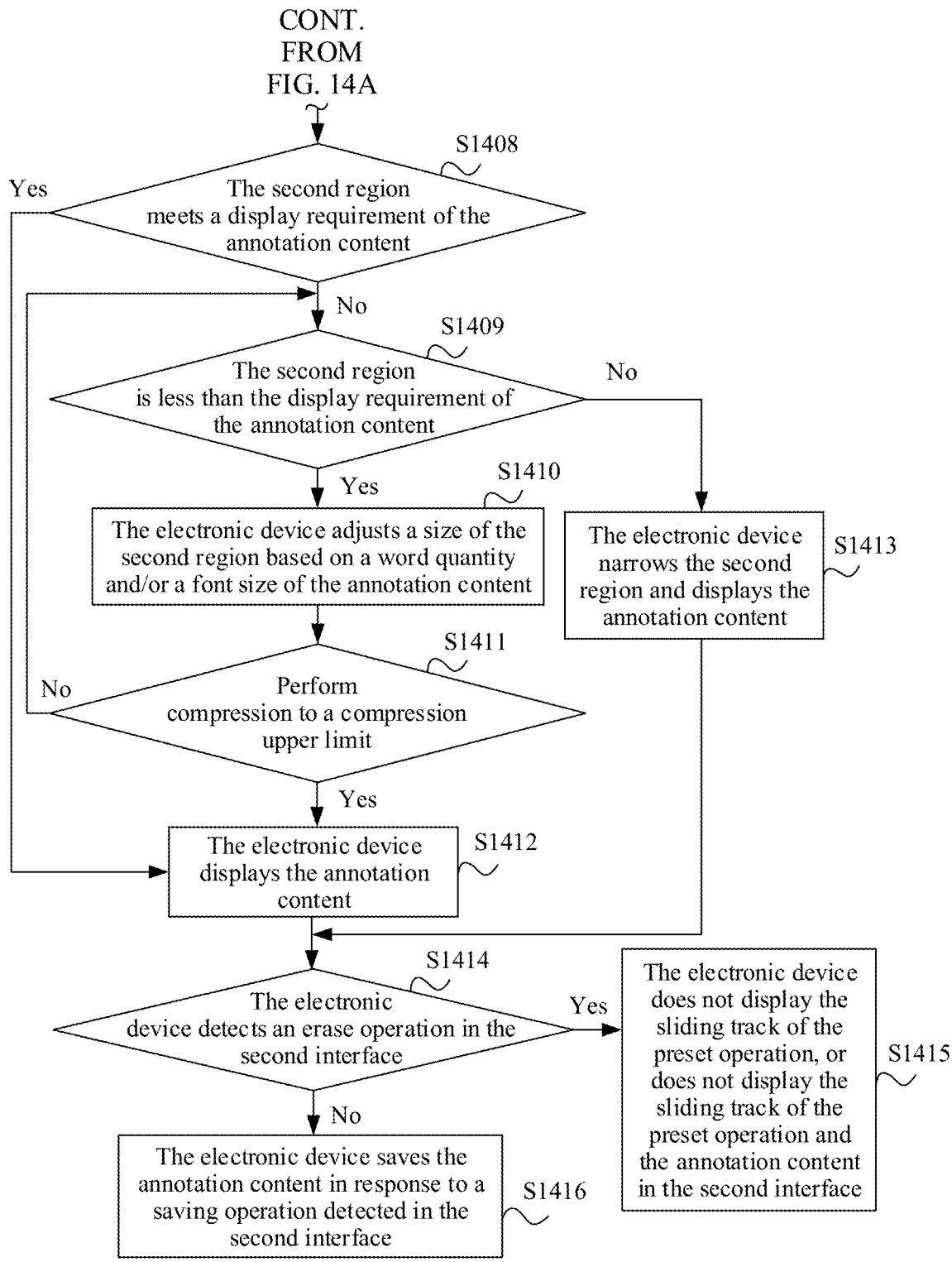

An embodiment of this application further provides an annotation method. FIG. 14A and FIG. 14B are a schematic flowchart of another annotation method according to an embodiment of this application. The method may include the following operations.

S1401: An electronic device displays a first interface.

The first interface is an interface of a first application, and the first application can be used to display content of a document file. For example, the first interface is an interface displayed after an operation that a user enters an annotation mode is detected, or the first interface is a read interface of the document file.

S1402: The electronic device detects a preset operation in the first interface, and determines a sliding track of the preset operation.

The preset operation is that the user performs a sliding operation of a preset track, and the sliding track of the preset operation may be an oblique line segment, a closed graphic, or a preset symbol.

S1403: The electronic device compresses at least a part of words in a first file by using a compression policy corresponding to the sliding track of the preset operation, to obtain a second region.

In an embodiment, the first file is a document file displayed by the first application. The electronic device may determine, based on different sliding tracks of detected preset operations, at least parts of the words in the first file and compression policies that correspond to the different sliding tracks.

The compression policy includes one or more of a compression manner, a compression direction, and a compression ratio. The compression manner includes one or several of the following: character height compression, character width compression, character weight compression, character spacing compression, and line spacing compression. The compression direction includes one or several of the following: upward, downward, leftward, and rightward. The compression ratio is determined by the electronic device based on a coverage width and/or length of the sliding track of the preset operation or based on execution time of the preset operation, or is a default value.

For example, when the sliding track of the preset operation is an oblique line segment and a width of the oblique line segment is greater than a first threshold, the electronic device compresses a character height and/or a line spacing of a line in which words covered by the oblique line segment are located, to obtain the second region; or when the sliding track of the preset operation is an oblique line segment and a width of the oblique line segment is less than or equal to the first threshold, the electronic device compresses a character width and/or a character spacing of a line in which words covered by the oblique line segment are located, or compresses a character width and/or a character spacing of the words covered by the oblique line segment, to obtain the second region.

For another example, when the width of the oblique line segment is greater than the first threshold and the oblique line segment is upward inclined, compressed words are located above or below the second region; when the width of the oblique line segment is greater than the first threshold and the oblique line segment is downward inclined, compressed words are located below or above the second region; when the width of the oblique line segment is less than or equal to the first threshold and the oblique line segment is upward inclined, compressed words are located on a left side or a right side of the second region; or when the width of the oblique line segment is less than or equal to the first threshold and the oblique line segment is downward inclined, compressed words are located on a right side or a left side of the second region.

For another example, when the sliding track of the preset operation is a closed graphic, the electronic device compresses a character width and/or a character spacing of a line in which words covered by the closed graphic are located, to obtain the second region.

For another example, when the sliding track of the preset operation is a preset symbol, the electronic device compresses a character height and/or a line spacing of a line in which words covered by the preset symbol are located and/or a character height and/or a line spacing of a neighboring line, to obtain the second region; or the electronic device compresses a character width and/or a character spacing of a line in which words covered by the preset symbol are located and/or a character width and/or a character spacing of a neighboring line, to obtain the second region.

In addition, for other implementations in which the electronic device determines at least parts of the words in the first file and compression policies that correspond to different sliding tracks, refer to the foregoing operations and functions performed by the mobile phone.

S1404: The electronic device displays a second interface that includes the second region.

The second interface is an interface displayed by the electronic device in the annotation mode. The second interface includes a first region and a second region, the first region is used to display the content of the document file, and the second region is used to display annotation content. After the electronic device compresses a compression object by using the compression policy, a font format and/or a paragraph format of at least a part of words in the first region are/is different from a font format and/or a paragraph format of words in the document file in the first interface. The font format of the word includes one or several of the following content: a character height, a character width, and a character weight; and the paragraph format of the word includes a character spacing and/or a line spacing.

S1405: Receive no annotation content within a preset time period and/or detect a first operation; and if yes, perform operation S1406; or if no, perform operation S1407.

The first operation is an operation other than adding annotation content, for example, page turning. The electronic device displays the first interface when receiving, within the preset time period after detecting the preset operation, no annotation content entered by the user, or when detecting that the user performs an annotation deletion operation or an annotation mode exit operation.

S1406: The electronic device deletes the second region and displays the first interface.

In an embodiment, if the electronic device displays the second region due to a misoperation of the user, the user currently has no annotation requirement. Alternatively, an action position of the preset operation of the user is wrong, and consequently the second region is a non-ideal annotation region. Alternatively, after performing the preset operation, the user has no annotation requirement. In this case, the electronic device may receive no annotation content within a second time period and/or detect the first operation. Therefore, the electronic device determines that the second region needs to be deleted, and automatically recovers compressed words to an initial state, that is, displays a display interface that exists before the current preset operation is obtained, to ensure normal display of the electronic device.

S1407: The electronic device receives annotation content entered by the user in the second interface.

S1408: The second region meets a display requirement of the annotation content; and if yes, perform operation S1412; or if no, perform operation S1409.

S1409: The second region is less than the display requirement of the annotation content; and if yes, perform operation S1410; or if no, perform operation S1413.

S1410: The electronic device adjusts a size of the second region based on a word quantity and/or a font size of the annotation content.

S1411: Perform compression to a compression upper limit; and if yes, perform operation S1412; or if no, cyclically perform operation S1409 to operation S1411.

S1412: The electronic device displays the annotation content.

S1413: The electronic device narrows the second region and displays the annotation content.

By using the foregoing operation S1407 to operation S1413, the electronic device adjusts the size of the second region based on the word quantity and/or the font size of the annotation content detected in the second interface, so that an annotation region matches the annotation content, to obtain a relatively good display effect, thereby improving user experience.

S1414: The electronic device detects an erase operation in the second interface; and if yes, perform operation S1415; or if no, perform operation S1416.

S1415: The electronic device does not display the sliding track of the preset operation, or does not display the sliding track of the preset operation and the annotation content in the second interface.

S1416: The electronic device saves the annotation content in response to a saving operation detected in the second interface.

In this way, the electronic device may adjust a font format and/or a paragraph format of at least a part of the content in the document file, to obtain more blank regions for annotation, so that annotation content can be prevented from covering the original text content of the document file. In addition, a size of the annotation region may be adaptively adjusted based on a requirement of the annotation content, so that the user is freer to perform annotation, thereby improving reading experience of the user.

In addition, because the electronic device adjusts the font format and/or the paragraph format of at least the part of the content in the document file to implement a larger annotation region, displayed content of the document file on a current page is not reduced, so that no inconvenience is caused for the user in reading the original document file although the annotation content is added.

In addition, the electronic device may further perform the operations and the functions performed by the mobile phone in the foregoing embodiment, to implement the annotation method provided in the foregoing embodiment.

Figure 15:
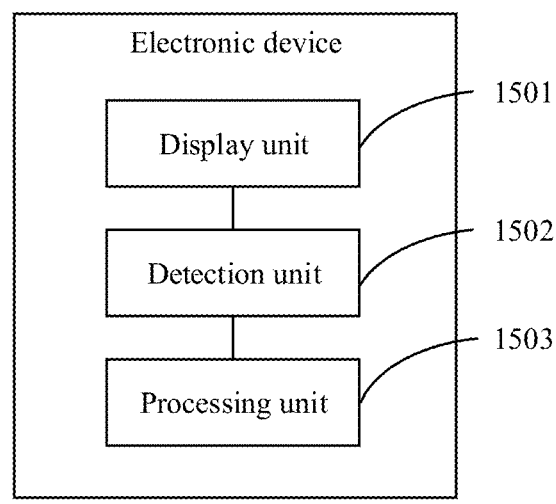
FIG. 15 is a schematic diagram 2 of a structure of an electronic device according to an embodiment of this application.

As shown in FIG. 15, an embodiment of this application discloses an electronic device. The electronic device may be configured to implement the methods described in the foregoing method embodiments. For example, the electronic device may include a display unit 1501, a detection unit 1502, and a processing unit 1503. The display unit 1501 is configured to support the electronic device in performing operation S501 and operation S502 in FIG. 5. The detection unit 1502 is configured to support the electronic device in performing operation S502 in FIG. 5. The processing unit 1503 is configured to support the electronic device in performing operation S503 in FIG. 5. All related content of the operations in the method embodiments may be cited in function descriptions of corresponding functional modules. Details are not described herein again.

Figure 16:
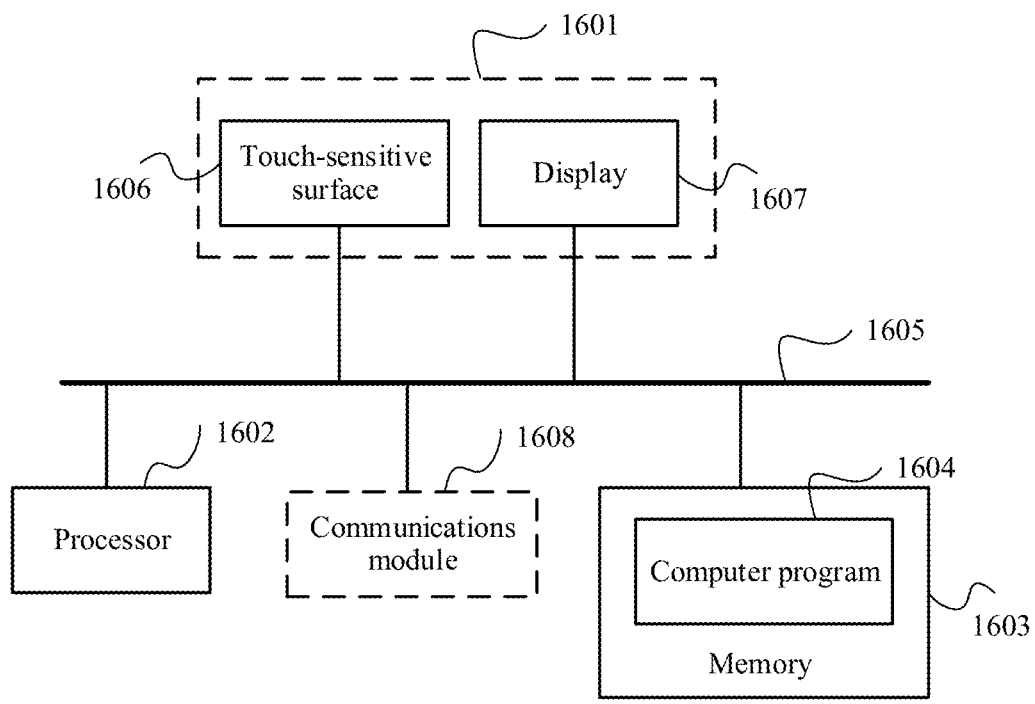
FIG. 16 is a schematic diagram 3 of a structure of an electronic device according to an embodiment of this application.

As shown in FIG. 16, an embodiment of this application discloses an electronic device, including: a touchscreen 1601, where the touchscreen 1601 includes a touch-sensitive surface 1606 and a display 1607; one or more processors 1602; a memory 1603; and one or more computer programs 1604. The foregoing components may be connected by using one or more communication buses 1605. The one or more computer programs 1604 are stored in the memory 1603 and configured to be executed by the one or more processors 1602. The one or more computer programs 1604 include instructions, and the instructions may be used to perform the operations in the foregoing embodiments.

In an embodiment, still as shown in FIG. 16, the electronic device may further include a communication module 1608. The communication module 1608 may be configured to interact with a stylus.

For example, the processor 1602 may be the processor 110 shown in FIG. 2A, the memory 1603 may be the internal memory 121 shown in FIG. 2A, the display 1607 may be the display 194 shown in FIG. 2A, the communication module 1608 may be the mobile communication module 150 and/or the wireless communication module 160 shown in FIG. 2A, and the touch-sensitive surface 1606 may be the touch sensor in the sensor module 180 shown in FIG. 2A. This is not limited in an embodiment of the application.

An embodiment of this application further provides a chip system. The chip system includes at least one processor and at least one interface circuit. The processor and the interface circuit may be interconnected by using a line. For example, the interface circuit may be configured to receive a signal from another apparatus. For another example, the interface circuit may be configured to send a signal to another apparatus. For example, the interface circuit may read instructions stored in the memory, and send the instructions to the processor. When the instructions are executed by the processor, an electronic device may be enabled to perform the operations performed by the mobile phone in the foregoing embodiment. Certainly, the chip system may further include another discrete component. This is not limited in an embodiment of the application.

An embodiment of this application further provides a computer storage medium. The computer storage medium stores computer instructions. When the computer instructions are run on a terminal device, the terminal device is enabled to perform the foregoing related method operations, to implement the annotation methods in the foregoing embodiments.

An embodiment of this application further provides a computer program product. When the computer program product is run on a computer, the computer is enabled to perform the foregoing relate operations, to implement the annotation methods in the foregoing embodiments.

In addition, an embodiment of this application further provides an apparatus. The apparatus may be a component or a module. The apparatus may include a processor and a memory that are connected. The memory is configured to store computer-executable instructions. When the apparatus runs, the processor may execute the computer-executable instructions stored in the memory, to enable the apparatus to perform the annotation methods in the foregoing method embodiments.

The terminal device, the computer storage medium, the computer program product, or the chip provided in embodiments of this application is configured to perform the corresponding methods provided above. Therefore, for beneficial effects that can be achieved by the terminal device, the computer storage medium, the computer program product, or the chip, refer to the beneficial effects in the corresponding methods provided above. Details are not described herein again.

Based on the foregoing descriptions of the implementations, one of ordinary skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above. For a working process of the foregoing system, apparatus, and unit, refer to a corresponding process in the foregoing method embodiments, and details are not described herein again.

In the several embodiments provided in this application, it should be understood that the disclosed apparatuses and methods may be implemented in other manners. For example, the described terminal device embodiment is merely an example. For example, division into the modules and the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the operations of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are only embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An annotation method, comprising:
  displaying, by an electronic device, a first interface displaying content of a first file; and
  displaying, by the electronic device, a second interface in response to detecting a preset operation in the first interface, wherein the second interface comprises a first region used to display the content of the first file and a second region used to display annotation content, wherein the second region is adaptively adjusted by changing a font format and/or a paragraph format of at least a part of words in the first region based on the annotation content, and wherein the font format and/or the paragraph format of the at least the part of words in the first region are/is different from a font format and/or a paragraph format of words in the first file in the first interface, wherein the displaying the second interface in response to detecting the preset operation in the first interface comprises:
  in response to detecting the preset operation in the first interface, compressing, by the electronic device, at least a part of the words in the first file by using a compression policy corresponding to a sliding track of the preset operation including a closed graphic, to obtain the second region, wherein when the sliding track of the preset operation is the closed graphic, a character width and/or a character spacing of a line, in which words covered by the closed graphic are located, are compressed by the electronic device, to obtain the second region; and displaying, by the electronic device, the second interface that comprises the second region.

2. The method according to claim 1, wherein the preset operation is that a user performs a sliding operation of a preset track, and wherein the preset track comprises one or more of: an oblique line segment, or a preset symbol.

3. The method according to claim 1, wherein the font format of the word comprises one or more of: a character height, a character width, or a character weight; and wherein the paragraph format of the word comprises a line spacing.

4. The method according to claim 1, further comprising:
receiving, by the electronic device, the annotation content entered by a user in the second interface, and
adjusting a size of the second region based on a word quantity and/or a font size of the annotation content.

5. The method according to claim 1, wherein after the displaying the second interface in response to detecting the preset operation in the first interface, the method further comprises:
displaying, by the electronic device, the first interface when receiving, within a preset time period after detecting the preset operation, no annotation content entered by a user, or when detecting that the user performs an annotation deletion operation or an annotation mode exit operation.

6. The method according to claim 1, wherein the compressing at least the part of the words in the first file by using the compression policy corresponding to the sliding track of the preset operation, to obtain the second region comprises:
when the sliding track of the preset operation is an oblique line segment and a width of the oblique line segment is greater than a first threshold, compressing, by the electronic device, a character height and/or a line spacing of a line in which words covered by the oblique line segment are located, to obtain the second region; or
when the sliding track of the preset operation is an oblique line segment and a width of the oblique line segment is less than or equal to the first threshold, compressing, by the electronic device, a character width and/or a character spacing of a line in which words covered by the oblique line segment are located, or compressing a character width and/or a character spacing of the words covered by the oblique line segment, to obtain the second region.

7. The method according to claim 6, further comprising:
when the width of the oblique line segment is greater than the first threshold and the oblique line segment is upward inclined, locating compressed words above or below the second region;
when the width of the oblique line segment is greater than the first threshold and the oblique line segment is downward inclined, locating compressed words below or above the second region;
when the width of the oblique line segment is less than or equal to the first threshold and the oblique line segment is upward inclined, locating compressed words on a left side or a right side of the second region; or
when the width of the oblique line segment is less than or equal to the first threshold and the oblique line segment is downward inclined, locating compressed words on a right side or a left side of the second region.

8. The method according to claim 1, wherein the compressing at least the part of the words in the first file by using the compression policy corresponding to the sliding track of the preset operation, to obtain the second region comprises:
when the sliding track of the preset operation is a preset symbol, compressing, by the electronic device, a character height and/or a line spacing of a line in which words covered by the preset symbol are located and/or a character height and/or a line spacing of a neighboring line, to obtain the second region; or compressing, by the electronic device, a character width and/or a character spacing of a line in which words covered by the preset symbol are located and/or a character width and/or a character spacing of a neighboring line, to obtain the second region.

9. The method according to claim 8, further comprising:
when the preset symbol is a preset symbol with a direction, compressing, the electronic device, a line in which words covered by the preset symbol with the direction are located, to obtain the second region, wherein the second region is located in a first direction of the preset symbol with the direction, and wherein the first direction is indicated by the preset symbol with the direction.

10. An electronic device, comprising:
a processor,
a memory, and
a touchscreen, wherein the memory and the touchscreen are coupled to the processor to store instructions, which when executed by the processor, cause the processor to perform operations, the operations comprising:
displaying a first interface displaying content of a first file; and
displaying a second interface in response to detecting a preset operation in the first interface, wherein the second interface comprises a first region used to display the content of the first file and a second region used to display annotation content, wherein the second region is adaptively adjusted by changing a font format and/or a paragraph format of at least a part of words in the first region based on the annotation content, and wherein the font format and/or the paragraph format of the at least the part of words in the first region are/is different from a font format and/or a paragraph format of words in the first file in the first interface, wherein the displaying the second interface in response to detecting the preset operation in the first interface comprises:
in response to detecting the preset operation in the first interface, compressing at least a part of the words in the first file by using a compression policy corresponding to a sliding track of the preset operation including a closed graphic, to obtain the second region, wherein when the sliding track of the preset operation is the closed graphic, a character width and/or a character spacing of a line, in which words covered by the closed graphic are located, are compressed by the electronic device, to obtain the second region; and
displaying the second interface that comprises the second region.

11. The electronic device according to claim 10, wherein the preset operation is that a user performs a sliding operation of a preset track, and wherein the preset track comprises one or more of: an oblique line segment, or a preset symbol.

12. The electronic device according to claim 10, wherein the font format of the word comprises one or more of: a character height, or a character weight; and wherein the paragraph format of the word comprises a line spacing.

13. The electronic device according to claim 10, wherein the compressing at least the part of the words in the first file by using the compression policy corresponding to the sliding track of the preset operation, to obtain the second region comprises:

when the sliding track of the preset operation is an oblique line segment and a width of the oblique line segment is greater than a first threshold, compressing a character height and/or a line spacing of a line in which words covered by the oblique line segment are located, to obtain the second region; or when the sliding track of the preset operation is an oblique line segment and a width of the oblique line segment is less than or equal to the first threshold, compressing a character width and/or a character spacing of a line in which words covered by the oblique line segment are located, or compressing a character width and/or a character spacing of the words covered by the oblique line segment, to obtain the second region.

14. The electronic device according to claim 10, wherein the compressing at least the part of the words in the first file by using the compression policy corresponding to the sliding track of the preset operation, to obtain the second region comprises:

when the sliding track of the preset operation is a preset symbol, compressing a character height and/or a line spacing of a line in which words covered by the preset symbol are located and/or a character height and/or a line spacing of a neighboring line, to obtain the second region; or compressing a character width and/or a character spacing of a line in which words covered by the preset symbol are located and/or a character width and/or a character spacing of a neighboring line, to obtain the second region.

15. The electronic device according to claim 10, wherein the operations further comprise:

receiving the annotation content entered by a user in the second interface, and adjusting a size of the second region based on a word quantity and/or a font size of the annotation content.

16. The electronic device according to claim 10, wherein after the displaying the second interface in response to detecting the preset operation in the first interface, the operations further comprise:

displaying the first interface when receiving, within a preset time period after detecting the preset operation, no annotation content entered by a user, or when detecting that the user performs an annotation deletion operation or an annotation mode exit operation.

* * * * *